United States Patent
Evans et al.

(10) Patent No.: US 8,046,309 B2
(45) Date of Patent: *Oct. 25, 2011

(54) COMMUNITY AWARENESS MANAGEMENT SYSTEMS AND METHODS

(75) Inventors: Scott A. Evans, Lenexa, KS (US); Robert L. Marshall, Stilwell, KS (US); Brett A. Lester, Overland Park, KS (US); Larry D. Miley, Kansas City, MO (US)

(73) Assignee: Celeritasworks, LLC, Overland Park, KS (US)

( * ) Notice: Subject to any disclaimer, the term of this patent is extended or adjusted under 35 U.S.C. 154(b) by 917 days.

This patent is subject to a terminal disclaimer.

(21) Appl. No.: 11/833,097

(22) Filed: Aug. 2, 2007

(65) Prior Publication Data

US 2008/0021726 A1    Jan. 24, 2008

Related U.S. Application Data

(63) Continuation of application No. 11/059,847, filed on Feb. 17, 2005, now Pat. No. 7,827,120.

(60) Provisional application No. 60/546,715, filed on Feb. 19, 2004.

(51) Int. Cl.
*G06Q 50/00* (2006.01)
(52) U.S. Cl. .................... 705/344; 707/756
(58) Field of Classification Search .......... 705/14, 705/344; 707/756
See application file for complete search history.

(56) References Cited

U.S. PATENT DOCUMENTS 5,032,989 A   7/1991   Tornetta
(Continued)

FOREIGN PATENT DOCUMENTS

CA       2433187      12/2004
(Continued)

OTHER PUBLICATIONS

American Petroleum Institute, Public Awareness Programs for Pipeline Operators, API Recommended Practice 1162, First Edition, Dec. 2003, p. 39.*

(Continued)

*Primary Examiner* — John Van Bramer
(74) *Attorney, Agent, or Firm* — Spencer Fane Britt & Browne LLP

(57) ABSTRACT

A system and method links one or more disparate community awareness management (CAM) datasets for a community awareness program (CAP) with one or more spatial layers to create linked CAM datasets. One or more data attributes common to a CAM dataset and a spatial layer are identified, and the link is defined between the CAM dataset and the spatial layer. The spatial layer and the linked CAM dataset then may be queried using a single input query. Features from the spatial layer and features from the linked CAM dataset that match the query are generated for display. In one embodiment, a system and method manage CAP assets, transactions, interest areas for the CAP, and buffer areas for the CAP. An audience utility enables entering and maintaining audience data for the CAP. A journal utility enables making journal entries for one or more audience members, CAP assets, transactions, and/or other CAM data. A link document utility enables linking one or more documents to CAM data.

4 Claims, 67 Drawing Sheets

U.S. PATENT DOCUMENTS

| | | | |
|---|---|---|---|
| 5,095,500 | A | 3/1992 | Tayloe et al. |
| 5,193,185 | A | 3/1993 | Lanter |
| 5,285,494 | A | 2/1994 | Sprecher et al. |
| 5,712,899 | A | 1/1998 | Pace, II |
| 5,848,373 | A | 12/1998 | DeLorme et al. |
| 5,870,558 | A | 2/1999 | Branton, Jr. et al. |
| 5,897,619 | A | 4/1999 | Hargrove, Jr. et al. |
| 5,907,848 | A | 5/1999 | Zaiken et al. |
| 5,930,474 | A | 7/1999 | Dunworth et al. |
| 5,946,687 | A | 8/1999 | Gehani et al. |
| 5,966,135 | A | 10/1999 | Roy et al. |
| 5,990,886 | A | 11/1999 | Serdy et al. |
| 5,991,690 | A | 11/1999 | Murphy |
| 6,006,161 | A | 12/1999 | Katou |
| 6,091,956 | A | 7/2000 | Hollenberg |
| 6,151,309 | A | 11/2000 | Busuioc et al. |
| 6,167,394 | A | 12/2000 | Leung et al. |
| 6,216,130 | B1 | 4/2001 | Hougaard et al. |
| 6,266,615 | B1 | 7/2001 | Jin |
| 6,278,994 | B1 | 8/2001 | Fuh et al. |
| 6,282,547 | B1 | 8/2001 | Hirsch |
| 6,343,290 | B1 | 1/2002 | Cossins et al. |
| 6,587,787 | B1 | 7/2003 | Yokota |
| 6,725,032 | B1 | 4/2004 | Sheridan et al. |
| 6,792,427 | B2 | 9/2004 | Jackson |
| 6,842,695 | B1 | 1/2005 | Tu |
| 6,873,991 | B2 | 3/2005 | Carroll et al. |
| 6,882,706 | B2 | 4/2005 | Andrew |
| 6,892,132 | B2 | 5/2005 | Nagamune |
| 6,892,196 | B1 | 5/2005 | Hughes |
| 2002/0091758 | A1 | 7/2002 | Singh et al. |
| 2002/0156917 | A1 | 10/2002 | Nye |
| 2003/0014395 | A1 | 1/2003 | Ruvolo et al. |
| 2003/0023475 | A1 | 1/2003 | Fergusson et al. |
| 2003/0061211 | A1 | 3/2003 | Shultz et al. |
| 2003/0069002 | A1 | 4/2003 | Hunter et al. |
| 2003/0142797 | A1 | 7/2003 | Troy et al. |
| 2003/0230523 | A1 | 12/2003 | Polizzotto et al. |
| 2004/0008125 | A1 | 1/2004 | Aratow et al. |
| 2004/0030706 | A1 | 2/2004 | Evans |
| 2004/0075697 | A1* | 4/2004 | Maudlin .................. 345/848 |
| 2004/0117358 | A1 | 6/2004 | von Kaenel et al. |
| 2004/0122803 | A1 | 6/2004 | Dom et al. |
| 2004/0264461 | A1 | 12/2004 | Janneteau et al. |
| 2005/0050097 | A1 | 3/2005 | Yeh et al. |
| 2005/0114789 | A1 | 5/2005 | Chang et al. |
| 2007/0016565 | A1 | 1/2007 | Evans et al. |
| 2007/0027903 | A1 | 2/2007 | Evans et al. |
| 2008/0027745 | A1 | 1/2008 | Evans et al. |
| 2008/0027975 | A1 | 1/2008 | Evans et al. |

FOREIGN PATENT DOCUMENTS

| | | |
|---|---|---|
| JP | 8087234 | 4/1996 |
| WO | WO0246868 | 6/2002 |
| WO | WO03053006 | 6/2003 |

OTHER PUBLICATIONS

Pipeline and Hazardous Materials Safety Administration and U.S. Dept. of Transportation, Pipeline Safety: Pipeline Operator Public Awareness Program, Federal Register, vol. 70, No. 96, May 19, 2005, Rules and Regulations, pp. 28833-28843.

U.S. Dept. of Transportation, Pipeline and Hazardous materials Safety Administration, Public Awareness Programs for Pipeline Operators, PHMSA Final Rule and Final Rule Correction, PHMSA Workshop, Nov. 9, 2005, Baltimore, MD, presented by Blaine Keener, 111 pages.

Tobin International, Ltd., Pipeline Facility Management Tool, 2001, 1 page.

Tobin International, Ltd., Tobin Pipeline Information Management Center, 2001, 1 page.

Tobin International, Ltd., Tobin Public Awareness, Aug. 18, 2003, 1 page.

Tobin International, Ltd., Tobin Pipeline Integrity Management System, Aug. 19, 2003, 1 page.

Tobin International, Ltd., Pipeline Products: Integrating All of Your Pipeline Information, Jun. 5, 2003, 1 page.

Tobin International, Ltd., Public Awareness Notification Program, 2002, 1 page.

City of Austin, Austin Pipeline Map 2002, Oct. 23, 2002, 1 page.

City of Austin, Austin Pipeline Map 2003, Mar. 17, 2003, 1 page.

National Pipeline Mapping System, Sample Pipeline Map of Austin, TX, 1975, 1 page.

Washington Citizen's Committee on Pipeline Safety, Promoting Public Awareness of Pipeline Safety, Dan Kirschner of Northwest Gas Association, Mar. 23, 2004, 19 pages.

U.S. Dept. of Transportation, Research and Special Programs Administration, Public Awareness Programs for Pipeline Operators, API RP 1162, Aug. 5, 2004, 41 pages.

Public Law 107-355, 116 Stat. 2985, Dec. 17, 2002, 28 pages.

Research and Special Programs Administration and U.S. Dept. of Transportation, Pipeline Safety: Public Education Programs for Hazardous Liquid and Gas Pipeline Operators, Federal Register, vol. 69, No. 121, Jun. 24, 2004, Proposed Rules, pp. 35279-35284.

Research and Special Programs Administration and U.S. Dept. of Transportation, Pipeline Safety: Pipeline Industry Implementation of Effective Public Awareness Programs, Federal Register, vol. 68, No. 157, Aug. 14, 2003, Notices, pp. 48659-48660.

*The Paradigm Alliance, Inc.*, vs. *CeleritasTechnologies, L.L.C. and CeleritasWorks, L.L.C.*, Verified Petition, Case No. 07CV1196, Mar. 29, 2007, 41 pages.

*The Paradigm Alliance, Inc.* vs. *CeleritasTechnologies, LLC and CeleritasWorks, LLC*, Answer and Counterclaims of *CeleritasTechnologies, LLC and CeleritasWorks, LLC*, Action No. 6:07-CV-1121, May 3, 2007, 19 pages.

*The Paradigm Alliance, Inc.* vs. *CeleritasTechnologies, L.L.C. and CeleritasWorks, L.L.C.*, Notice of Removal, Case No. 07CV1196, Apr. 27, 2007, 5 pages.

*The Paradigm Alliance, Inc.* vs. *CeleritasTechnologies, L.L.C. and CeleritasWorks, L.L.C.*, Notice of State Court Filing Completing Removal Under 28 U.S.C. Section 1446(d), Action No. 6:07-CV-1121, Apr. 30, 2007, 2 pages.

*The Paradigm Alliance, Inc.* vs. *CeleritasTechnologies, L.L.C. and CeleritasWorks, L.L.C.*, Notice of Removal of Case to Federal Court, Case No. 07CV1196, Apr. 27, 2007, 2 pages.

*The Paradigm Alliance, Inc.* vs. *CeleritasTechnologies, L.L.C. and CeleritasWorks, L.L.C.*, Plaintiff The Paradigm Alliance, Inc.'s Answer to Defendants' First Amended Counterclaims, Action No. 6:07-CV-1121, Jun. 26, 2007, 7 pages.

American Petroleum Institute, Public Awareness Programs for Pipeline Operators, Pipeline Segment, API Recommended Practice 1162, First Edition, Dec. 2003, 66 pages.

\* cited by examiner

COMMUNITY AWARENESS MANAGEMENT SYSTEMS AND METHODS

RELATED APPLICATIONS

The present application is a Continuation of U.S. patent application Ser. No. 11/059,847, entitled Community Awareness Management Systems and Methods, filed Feb. 17, 2005, which takes priority to U.S. Patent App. Ser. No. 60/546,718, entitled Community Awareness Management Systems and Methods, filed Feb. 19, 2004, and is related to U.S. patent application Ser. No. 11/467,159, entitled Community Awareness Management Systems and Methods, filed Aug. 24, 2006, Publication No. US2007/0016565, and U.S. patent application Ser. No. 11/467,161, entitled Community Awareness Management Systems and Methods, filed Aug. 24, 2006, Publication No. US2007/0027903, the entire contents of which are hereby incorporated herein by reference, and is related to Ser. No. 11/833,093, entitled Community Awareness Management Systems and Methods, and Ser. No. 11/833,108, entitled Community Awareness Management Systems and Methods, filed on the same date as this application, the entire contents of which are hereby incorporated herein by reference.

FEDERALLY SPONSORED RESEARCH OR DEVELOPMENT

Not Applicable

COMPACT DISK APPENDIX

Not Applicable

FIELD OF THE INVENTION

The present invention relates to the field of managing community or public awareness systems.

BACKGROUND OF THE INVENTION

Community awareness management companies (CAMCs) provide community awareness programs (CAPs) (also referred to as public awareness programs) for businesses and other entities, such as the pipeline industry. A CAMC manages various facets of CAPs, including, for example, direct mail campaigns designed to educate various audiences about the business or other entity, the environment, and other information. In an example of a pipeline company, the CAMC educates various audiences about the pipeline company and pipeline operations. The CAMC may include other or different information for other entities or other pipeline programs.

Audiences for a particular CAP may include residents, businesses, emergency management persons or groups, excavators, or other audiences. The CAMC generally identifies stakeholder audiences for a particular CAP and other contacts to which information will be sent. A stakeholder audience includes those audience members that have a stake in education or other awareness programs, such as residents and business that may be interested in a company's business, its operations, or other issues.

When managing a CAP for a pipeline company, for example, CAMCs may analyze pipeline data, identify the stakeholder audience for the pipeline CAP, establish mailing lists designed for the specific stakeholder audiences and/or specific companies or other contacts, and design, print, and execute mailings. One or more of the foregoing may be included in a package referred to as an audit package. Upon program completion, the CAMC may provide the client with, for example, an audit package having a map of a pipeline area in which areas of mailings are designated, paper and compact disk (CD) copies of the mailing lists, and a form documenting acceptance and delivery by the Post Office of a mailing and the number of pieces in the mailing. In other CAPs, other items may be included in an audit package. Since these audit packages generally are paper, they require a significant amount of storage.

The CAMC works with client companies to understand their centerline data. Centerline data generally identifies the centerline or physical location of a structural item of relevance to the CAP for a geographic area. In the pipeline CAP example, the centerline data is used to show the centerline of pipeline locations in one or more geographic areas.

Using the centerline data for one example, the CAMC generates a paper map and a paper report to identify data managed by the CAP, such as applicable pipelines or other data. The paper report may identify, for example, a table of audience members within a geographic location for the CAP.

The CAMC defines a buffer area, which generally is a number of feet or miles from the centerline data. Audiences within the buffer area are identified, and the buffer area and the audiences in the buffer area typically are identified in the audit package. In the pipeline CAP example, the buffer area is defined for a distance from the pipeline centerline data, and a pipeline analysis with the identifications of audiences within the buffer area is generated for an audit package.

The CAMC may generate one or more audit packages for a client in a program year. A program year is 365 days (not including a leap year) during which a CAP operates.

A dataset is a collection of data that relates to a topic or thing. Generally, the dataset has data attributes that describe the collection of data. The data attributes are related to each other and related to the topic or thing of the dataset. For example, a business dataset for a pipeline may contain a set of attributes for the land on which the pipeline is located or for pipeline statistics.

A company and/or a CAMC may have different datasets of information related to the CAP. However, the datasets are difficult to manage.

It would be helpful to have geographic information, such as maps, for the CAP. Geographic information system (GIS) products provide geographic information, such as maps or other geographic data, based on some input. With most GIS products, if you want to relate data from multiple disparate datasets to geographic data you must permanently merge the data from the disparate datasets with the geographic data. However, this generally requires that the data be replicated. In some cases, the data may require conversion prior to replication. Other GIS products provide the ability to join or associate one or more datasets with geographic data, but only as long as the datasets are in the same database in which the geographic data is housed.

Improved systems and methods are needed to geographically identify aspects of a CAP and to enable entry and management of audience data, including entering and identifying audience members geographically, throughout a program year. Thus, new systems and methods are needed to enable linking different datasets in a community awareness management system with spatial data without replicating the datasets and to enable a user to access the datasets spatially.

SUMMARY OF THE INVENTION

In one embodiment, systems and methods for a community awareness program (CAP) link one or more disparate community awareness management (CAM) datasets with one or more spatial layers to create linked CAM datasets. One or more data attributes common to a CAM dataset and a spatial layer are identified, and the link is defined between the CAM dataset and the spatial layer. The spatial layer and the linked CAM dataset may be queried using a single input query. Features from the spatial layer and features from the linked CAM dataset that match the query are generated for display.

In another embodiment, the systems and methods enable a user to access and manage geospatial data and CAM data, including CAP asset data, interest area data, buffer area data, audience data, program data, transaction data, and/or other CAM data. In one example of this embodiment, the systems and methods generate the geospatial data and the CAM data for display. In another example of this embodiment, the CAM data includes pipeline data, call center data, utility data, or data for another entity.

In another embodiment, the systems and methods enable one or more users to manage audience members. In one example, the systems and methods enable one or more users to locate one or more audience members by address, audience type, or another attribute. In another example, the systems and methods generate the audience data for display with map data of a geographic area. The map data includes, for example, data indicating a location of one or more audience members, CAP assets, interest areas, buffer areas, and/or other locations or points of interest.

In another embodiment, the systems and methods enable entry of one or more journal entries associated with one or more audience members, CAP assets, buffer areas, interest areas, transactions, documents, and/or other CAM data. In one example, a journal entry captures data when a change is made to an audience record for an audience member. In another example, a journal entry is automatically created when an audience record is inserted, edited, or deleted.

In another embodiment, the systems and methods enable linking one or more documents interactively to or with CAM data. In one example, a document is linked to audience data, CAP asset data, journal data, transaction data, and/or other CAM data. When the base data is displayed or otherwise retrieved, the linked document also is displayable. In another example, the document is displayable or otherwise retrieved and identified with a link, an icon, or another method. The link, icon, or other method is selected to display the linked document.

BRIEF DESCRIPTION OF THE DRAWINGS

FIGS. 37-69 are screen views of a user interface used to perform transactions in a CAM system in accordance with embodiments of the present invention.

DETAILED DESCRIPTION

Figure 1:
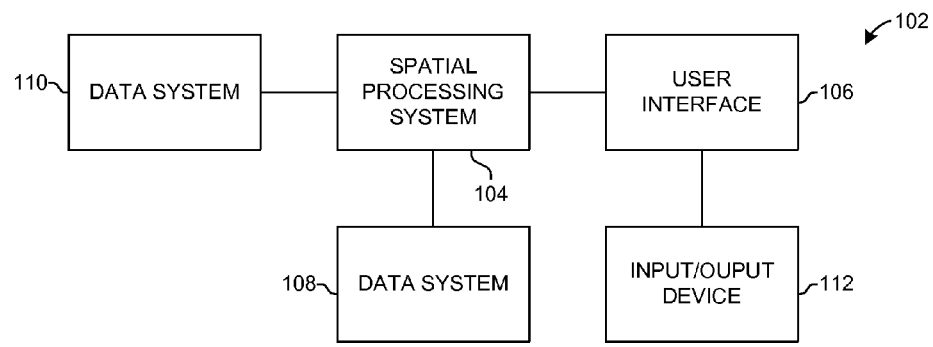
FIG. 1 is a diagram of a CAM system for linking one or more spatial layers with one or more datasets in accordance with an embodiment of the present invention.

The community awareness management (CAM) system of the present invention manages a community awareness program (CAP). The CAP (or a user of the CAM system operating under the CAP), identifies one or more CAP assets. An asset includes a physical or logical feature or entity, an environmental feature, a company feature, an equipment feature, a building feature, a device, a system, or an object associated with a CAP for which a person, other entity, and/or thing has an interest or otherwise affects the operation or management of the CAP or an audit or report of the CAM system. CAP asset data may include, for example, data identifying physical or logical features, company features, environmental features, equipment features, building features, device data, system data, data associated with an object, a person, or a thing, and/or other data for a CAP. Other examples exist.

The CAP generally identifies an item, a device, a system, a person, another entity, an event, a location, a point, or an area in which a person or entity has or may have an interest or that poses a potential risk or hazard to, or otherwise affects, a person, an entity, or a thing. The item, device, system, person, other entity, event, location, point, or area of interest often is identified geographically and is referred to herein as an interest area. In some instances, the interest area is identified geographically as a point. In other instances, the interest area is identified geographically as a centerline, which identifies a center linear portion of an object or other entity. In other instances, the interest area is identified as an area. In other instances, the interest area is identified as an area bounded by a perimeter, and the perimeter may be regularly or irregularly shaped. Moreover, an interest area may be contiguous or non-contiguous and of varying or non-varying shapes and/or distances, whether or not it is identified with a perimeter or other boundary. In other instances, the interest area is identified by an item of interest or an event, such as a person, a thing, an environmental event, a weather event, an accident, or another event. Other examples exist. In one example, the interest area is in relation to a CAP asset.

The CAP also may identify a limitation for an area around, from, or near or a distance from, through, or near the interest area and/or a CAP asset, such as a geographical limitation. This limitation is referred to as a buffer or a buffer area. The buffer area may be regularly or irregularly shaped. Moreover, the buffer area may be contiguous or non-contiguous and of varying or non-varying shapes and/or distances from one or more points or areas of the interest area and/or a CAP asset. The buffer area may be, for example, a first distance from the interest area and/or the CAP asset at a first point and a second distance from the interest area and/or the CAP asset at a second point. The first distance and the second distance may be the same or different. Where the interest area is other than a point, the first point and the second point may be on a same or different line, side, or area. In another example, the buffer area is an area from a centerline-type interest area, it may exist on one or both sides of the centerline, and it may be a varying distance or a same distance from one or more points along the centerline. In another example, the buffer area includes multiple arc-shaped areas from multiple points. In another example, the buffer area is a consistent or varying distance around an outer portion of the interest area and/or the CAP asset. In another example, the buffer area is a consistent or varying distance from, across, or around a CAP asset or a point at a CAP asset. In this example, the buffer area is in relation to the CAP asset, and no interest area is present. Other examples exist.

The CAP also identifies an audience that includes one or more people, other entities, such as businesses, and/or things within an area managed by the CAP, such as within the interest area and/or the buffer area. The audience includes contacts, which are people, other entities, and/or things, to or from which communications may be made, such as by mail, email, phone calls, training attendance, personal communication, or otherwise, for which one or more other transactions may be made, and/or for which an identification and/or a location may be known.

Audience data identifies different features or aspects of one or more audience members. In one example, audience data includes an audience member name, an audience type, such as an emergency official, police, a resident, an excavator, a business, or another audience type, an address, a city, a county, and/or a phone number. In another example, audience data is located in an audience record or data structure and is entered and managed with an audience utility.

Transactions include communications, such as communications made by mail, email, phone calls, training attendance, personal communication, or otherwise, including communications with attached electronic or paper documentation, business relations, and other actions taken with regard to an audience member. In one example, a transaction includes a mailing made by email or ground mail to a contact informing the contact about the existence of a pipeline and maintenance to be performed on the pipeline. In this example, the mailing includes a pamphlet about the company performing the maintenance and identifies community officials that may be contacted for further information. In another example, a transaction includes safety information provided to the general public. In another example, a transaction includes training materials supplied to emergency responders and excavators.

Transaction data identifies different features or aspects of one or more transactions with one or more audience members. In one example, transaction data includes an audience member name, an audience member type, an address, a city, a county, a phone number, a transaction type, a journal entry with a journal entry type (as described more completely below), and/or other details about the transaction. In another example, transaction data is located in a transaction record or data structure. The transaction type describes the type of transaction, such as email, ground mail, phone call, personal communication, business relations, training, and other types.

One or more of the contacts may be stakeholders. Stakeholders are people, entities, and/or things affected by, having an interest in, or that are to be informed of, aspects of the CAP. Stakeholders often have a level of interest in the CAP, an asset, or an action or transaction that is considered a "stake" in the CAP, the asset, or the action or transaction.

In one example, a pipeline CAP includes one or more pipeline assets. A pipeline asset is a physical or logical feature entity, an environmental feature, a company feature, an equipment feature, a building feature, a device, a system, or an object associated with a pipeline system for which a person, another entity, such as a company, or another audience member has an interest or otherwise affects the operation of the pipeline or the auditing or reporting of the pipeline CAM system. In one example, a pipeline asset includes a pipeline, a valve, a station, or another pipeline related device, system, or object. In this example, the CAP asset data includes pipeline data, such as a width, length, and material of a pipeline, structural aspects of the pipeline, valves, building locations, and other structural features of the pipeline. The CAP asset data for a pipeline also may include environmental and other features associated with the pipeline CAP. In this example, the interest area data identifies the centerline of a pipeline, and a buffer area is a selected constant or variable distance from or across the centerline. The audience in this example includes contacts within the buffer area.

In another example, a CAP asset for a power plant CAP includes a power plant, the interest area is the geographic area encompassing the power plant grounds, and a buffer area for the CAP includes a distance around the power plant grounds. In this example, the power plant CAP is related to security for the power plant and environmental impacts from the power plant, and the audience includes people and companies within the buffer area concerned with the security and/or environmental impacts of the power plant.

In another example, a CAP asset for an electrical power CAP includes a power transmission line, system, or substation, and a buffer area for the CAP includes an area around the power transmission line, system, or substation. In this example, the electrical power CAP is related to security for the electrical power transmission line, system, or substation and the safety of residents around the electrical power transmission line, system, or substation. In this example, the audience includes residents in the buffer area and other electrical power companies in the region. The residents in this example are stakeholders, and they have a level of interest in the safety issues related to the power line, system, or substation. The regional power companies are not stakeholders in this example. Since the CAP will attempt to send information to both the residents and the regional power companies, and the CAP has identified a location and/or identification for the residents and the regional power companies, both the residents and the regional power companies are contacts.

In another example, a CAP asset for a waterway CAP includes a ship or a chemical spill. The interest area is the area of the ship or the area encompassed by the, chemical spill, and the buffer area for the CAP includes an area around the ship or the chemical spill. In this example, the waterway CAP is related to the potential hazards of toxic spills.

In another example, a CAP asset for a transportation system CAP includes interstates, railroads, and rivers, the interest area is the centerline of the interstate, railroad, and river, and the buffer area for the CAP includes an area on each side of the interstates, railroads, and rivers. In this example, the transportation system CAP is related to the transportation of hazardous material.

In another example, a CAP asset for an airport system CAP includes a runway. The interest area is the runway and the airspace above the runway. The buffer area for the CAP includes an area on each side of the runway and on each side of the airspace above the runway. The audience for this CAP includes airport officials, emergency officials, and repair crews. In this example, the airport system CAP is related to sound and flight path hazards.

In another example, a CAP asset for a coastal area CAP includes a coast line, the interest area is the area encompassed by the coastline, and the buffer area for the CAP includes an area on the land side of the coast line. In this example, the coastal area CAP is related to a natural disaster, such as a hurricane.

In another example, a CAP asset for a communication system CAP includes a fiber optic line or another communication line. The interest area is the centerline of the fiber optic line or other communication line, and the buffer area for the CAP includes an area around the circumference of the fiber optic line or other communication line. In this example, the communication system CAP is related to the security of the fiber optic line or other communication line, including damage caused by digging or trenching.

In another example, a CAP asset for a factory CAP includes a factory, an emission control system, or a waste disposal system. The interest area includes the grounds of the factory, emission control system, or waste disposal system, and the buffer area for the CAP includes an environmental impact area around the factory, emission control system, or waste disposal system. In this example, the factory CAP is related to emissions and waste hazards.

In another example, a CAP asset for a utility network system CAP includes a gas pipe, an electric power line, a water pipe or valve, a phone line, or a cable. The interest area includes the diameter and area of the pipe, the electric power line, the water pipe or valve, the phone line, or the cable. The buffer area for the CAP includes an area around the gas pipe, the electric power line, the water pipe or valve, the phone line, or the cable. In this example, the network system CAP is related to the security of the network system, including damage caused by digging or trenching.

In another example, a CAP asset includes a geospatial feature that is critical to the successful management of the CAP. In this example, stakeholders, the interest area or areas, and the buffer area or areas are assets. Stakeholders, interest areas, buffer areas, and the data associated with stakeholders, interest areas, and buffers are all critical components of the CAP in this example. The CAP exists to catalog and communicate data that is directly associated with the stakeholders and that is associated with something that affects the stakeholder community.

In another example, a CAP is used to communicate to the public regarding bio-hazards or infectious diseases. For example, a CAP may manage influenza related communications and the management of influenza related education programs and inoculations. In this example, the stakeholders are defined by a proximity to a statistically "hot" area. In this example, the "hot" area is the interest area, and the buffer area is a distance around the "hot" area. Alternately, a person infected with the influenza may be the interest area.

A CAP may be required to comply with certain federal, state, and/or local regulations for an industry or a system and to prove that it complied with the regulations. A CAP may have different regulatory compliance requirements for different audience types or CAP types. For example, a CAP may have to perform a first set of actions for emergency officials, a second set of actions for general public officials, a third set of actions for other special contacts, and a fourth set of actions for general business people and home owners.

Moreover, a CAP may have to perform different actions for different assets within its system. For example, a CAP may have to perform a first set of actions for a large pipeline installation and a second set of actions for a small pipeline maintenance project. For each audience type or transaction, the CAP has to prove to an auditor the steps taken to comply with the regulations, including transactions attempted and completed for each audience type, documents sent to each audience type, and internal actions and communications taken within the CAP.

In prior systems, users maintained paper lists and spreadsheets with the names of the audience members and copies of documents provided to the audience. One mailing to the audience may have required thirty 3-ring binders for a portion of a geographic area. A complete mailing to the entire geographic area or a complete set of documents for an audit may have required a truckload of documents. Information within these sets of documents was not readily locatable.

However, the CAM system of the present invention easily and intuitively enables a CAM system user to identify, track, and search all audience members within a CAP area, including an interest area and/or a buffer area, and all transactions for or with the audience members without maintaining a bulky paper storage facility. The CAM system enables one or multiple users to track any number of members for an audience. In some examples, the audience may include 500,000 members within an interest area and/or a buffer area. In other examples, the audience may include greater or fewer members within an interest area and/or a buffer area. The user can identify an audience type for each audience member and can maintain current, up-to-date information for the audience members. The CAM system enables one or multiple users with real time program updates and status information so that the users managing the CAP have access to current information and can input information.

The CAM system enables a user to track each transaction and audience member associated with each CAP asset, interest area, and/or buffer area, including each audience type for each audience member. The CAM system enables a user to create a transaction record for each audience member, transaction, CAP asset, journal entry, journal entry type, interest area, and/or buffer area in which data for a transaction is stored.

The transaction record can prove, for example, when each transaction occurred with each audience member, the audience type for each audience member, what was communicated to each audience member, including through verbal communications, mailed communications, emailed communications, phone calls, personal communications, or otherwise, data for other types of transactions, and each document associated with a transaction, such as training or education materials or other documents. The transaction record is one mechanism with which the CAM system enables a user to easily determine whether or not it has complied with a set of regulations and easily identify the compliance for an audit.

In one example, the CAM system of the present invention enables a user to identify, for example, that training was offered to emergency officials, identify the specific emergency officials that attended a particular training event, and link training videos and certification tests for a particular certification. The CAM system further enables a user to identify that a particular emergency official had been contacted multiple times about attending the training, identify and link specific documents that had been transmitted to the emergency official, and identify other aspects of the regulations for which compliance is required.

In another example, the user produces a transaction record from the CAM system that proves it performed a selected test, identified an audience in a buffer area, identified each audience type for the audience, sent letters to each contact in the audience, and sent reminder letters to each contact in the audience. If a selected contact responds with a letter or a call, the user is able to identify records showing that the user called the contact in response to the letter or call and complied with other regulatory issues associated with that contact.

In one embodiment, the CAM system includes a browser-based dynamic global information system (GIS) functionality used to manage relationships with one or more audience members and to track and document each transaction with each audience member, including each communication. With the GIS functionality, a user can quickly and geographically identify CAP assets, audience members, interest areas, and/or buffer areas and audience members within the interest areas and/or the buffer areas.

In one example, audience members within an interest area and/or a buffer area are color coded for a GIS-based display to identify selected designations for the audience members. For example, audience members within an interest area and/or a buffer area that have received safety training for a particular event and that have been certified for that safety training are color coded as red. Audience members that have not received the safety training and have not been certified are color coded as blue. If an accident occurs, the user may easily determine all audience members within a geographic area, geographically select an audience member, and review the transaction record for the selected audience member to determine if the safety training and certification had been offered to the selected audience member and subsequent events associated with that selected audience member. Thus, the user can geographically determine whether or not it complied with regulations associated with offering safety training to the selected group of audience members and certifying the selected group of audience members in that safety training.

In one embodiment, the CAM system includes a journal utility that enables a CAM system user to make one or more journal entries. A journal entry has journal data with one or more descriptions, comments, user information, audience information, transaction information, and other information for one or more audience members, transactions, CAP assets, and/or other CAM data. In one example, the journal entry is used to document a name and address for an audience member, when a CAM system user sends correspondence to an audience member, when an audience member calls the CAM system user to request information and the content of the call, when the CAM system user mails a disclosure document to an audience member and the content of the document, when the CAM system user follows up with the audience member with a phone call and the content of the phone call, and other instances and information. The journal entry can be used to identify documents transmitted to an audience member, such as training or certification materials or other documents. In some instances, the training or certification materials or other documents are linked to or attached to the journal entry. In another example, journal data is stored in one or more journal records. In another example, each journal entry and the journal data associated with the journal entry is stored in a journal record.

In another example, a journal entry captures data when a change is made to an audience member or an audience record, identifies the user that made the change, and enables the user to add a comment indicating why the change was made. In another example, the CAM system automatically creates a journal entry when an audience record is inserted, edited, or deleted. In this example, the journal entry contains a CAM system user identifier, the action taken, such as insertion, edit, or deletion, the date the action is taken, and a user comment.

In one embodiment, the journal utility maintains journal data in a journal log file for each audience member, transaction, CAP asset, and/or other CAM data. The journal log file can contain, for example, a series of transactions for a single audience member, including a date and description of each communication with the audience member, how each communication was made, who made the communication, the content of the communication, and an identification of each document for a transaction. In one example, each journal record associated with an audience member is identified in a journal log file. In another example, each journal record associated with a transaction or a CAP asset is identified in a journal log file.

In another example, an audience member calls the user and tells the user the audience member's grass is dying. The user determines that the audience member lives near a pipeline, determines that an information pamphlet previously was mailed to the audience member, and provides the information again to the audience member. The user adds a journal entry in the CAM system documenting all of the foregoing. A journal log file for this audience member identifies journal records for both of the mailings and the call.

In another example, a user communicates with public emergency officials, sends the emergency officials information regarding safety training, and calls the emergency officials to attempt to set up a training session with the emergency officials. Some emergency officials attend the training session, and others do not respond to the communication or the phone call. The user documents each instance in which it attempted to communicate with the emergency officials using the journal utility, including the initial mailing and the follow up phone call, to demonstrate that the user complied with applicable regulations and/or internal guidelines for communicating with the emergency officials. The user further documents additional information using the journal utility for each additional communication, including the particulars of the training sessions for the safety training, certifications issued for the safety training, and particulars about each audience member, such as where that audience member lives and works, professional organizations to which the audience member belongs, specific days the audience member works and can be contacted by the user, and other information. All of the journal entries are identified in a journal log file in this example.

In another embodiment, the CAM system has a link documents utility that enables a user to link one or more documents to one or more audience members, transactions, journal entries, CAP assets, and/or other CAM data. In one embodiment, a document is linked to audience member data for an audience member when the document is transmitted to the audience member. For example, when a user sends a document to an audience member in a mailing with a letter, the user may link the letter and the document to the audience member data in the CAM system for that audience member.

By using the journal utility and/or the link documents utility, a user can manage a dialog and rapport with an audience member and document each transaction, including each communication, with the audience member. By using the journal utility and/or the link documents utility, the user can track each communication or other transaction with or for an audience member or a particular project or system and create records that are easily auditable by the user or a third party. Moreover, the auditor, whether it be the user or a third party, can easily identify the documents that were transmitted in a communication since the documents are attached to the audience member data and/or correspond to journal entries.

In another embodiment, the CAM system has a bulk journal utility that enables a bulk journal entry and/or a bulk link documents utility that enables a bulk document link through which a user can document a transaction with multiple audience members using a single journal entry and/or a single document link. For example, if a user mails a public service announcement to 100,000 people, such as all people within an interest area and/or a buffer area, the user can select all 100,000 people from an audience member list in the CAM system and add a journal entry for each audience member at the same time. The journal entry can identify that the public service announcement was mailed on the specified date and identify the content of the service announcement. If the user follows up with all or a portion of the audience members in the interest area and/or the buffer area, the user can document the follow-up with another journal entry and indicate the type of communication, the date, and the content of the communication.

The CAM system, including the GIS function, the audience utility, the journal utility, and/or the link documents utility, can be used for multiple industries or systems. For example, an asset managed by the CAM system can include a movie theater, a bank, or a school. A user can use the CAM system to document attempts to contact the manager of the movie theater, communicate the user's company information to the theater manager, communicate environmental issues to the theater manager, and communicate other issues. Other examples exist.

FIG. 1 depicts an exemplary embodiment of a community awareness management (CAM) system 102 for managing a community awareness program (CAP). The CAM system 102 manages CAM data and geospatial data for a CAP.

The CAM system 102 links one or more CAM datasets with one or more spatial layers. The spatial layers and the CAM datasets include features, and features include spatial attributes and/or CAM data attributes. CAM data comprises data managed by the CAM system 102 for the CAP, and includes audience data, asset data, program data, audit data, interest area data, buffer area data, journal data, document data, user data, and other data used in the management of the CAP. CAM data also includes geospatial data in some instances. However, for simplicity the' geospatial data will be referred to separately in many references herein.

Geospatial data comprises geographic data and/or spatial data. Geographic data comprises data identifying a geography, such as a terrain, streets or highways, streams, lakes, other bodies of water, parks, mountains, land marks, structures, and/or other geographic data, including graphic data, image data, text data, and/or other data. Spatial data comprises data of or representing geographic elements or data, including graphic data, image data, text data, and/or other data, and representing a position or location, such as a position or location in space. Spatial data includes location data or position data, such as a latitude, a longitude, an address, a city, a state, a county, streets, street crossings, and/or other data.

A spatial attribute is one or more points, lines, and/or polygons that represent a geographic element, a spatial element, and/or another physical or logical element. A geographic element includes a pipeline, an audience area, a CAM structure or system, a building, a city, a county, a selected area, a state, a country, an address, a zip code, a location, a point in space, or another element. Generally, a geographic element has a position, such as a position in space. Likewise, a physical element generally has a position, such as a position in space. A geospatial element comprises a spatial element, a geographic element, or both. Geospatial attributes, geospatial data, and geospatial layers may simply be referred to herein as spatial attributes, spatial data, and spatial layers.

A geocode identifies a geographic location of a place or a thing. A geocode may be, for example, a latitude and a longitude of a location. However, other location identifiers may be used to designate a geographic location. Examples of location identifiers are latitude and longitude coordinates, north, south, east, west, up, down, left, right, vertical and horizontal coordinates, North America Data (NAD) 27, NAD 83, axial coordinates, other ordinate systems, positioning indicators, and mark identifiers.

A data attribute is a member of a collection of data that has a relationship to an element, either directly or indirectly. For example, when grouping audience data for a CAM system, the audience is a data attribute that has a relationship to the CAM system. In another example, when grouping finance information for leases of land for pipelines, the finance information is a data attribute that has a relationship to a lease for land. Data for a data attribute may simply be referred to as attribute data.

A feature is an element that has one or more feature attributes, including one or more CAM data attributes and/or one or more spatial attributes. The CAM data attributes and/or spatial attributes have a relationship to each other because of the relationship to the element. For example, a pipeline is a feature that has a width/diameter data attribute and a location spatial attribute. A second pipeline is another feature that has a width/diameter data attribute and a different location spatial attribute. Each pipeline is a different feature because each pipeline can be separately identified with its data attributes and/or spatial attributes.

In another example, a first audience statistic is a data attribute of a first zip code feature, and a second audience statistic is a data attribute of a second zip code feature. In this example, the zip code is a spatial element because it has at least one spatial attribute, such as a position and boundaries.

Data for a feature may be referred to simply as feature data. Data for a feature attribute, including data for one or more data attributes and/or one or more spatial attributes, may be referred to simply as feature attribute data or more simply as feature data. Non-geospatial feature data may be referred to as program feature data or CAM feature data. Geospatial feature data may be referred to simply as geospatial data or spatial data.

Natural attributes of a feature are those attributes that are inherent to the feature. In one example, a natural attribute of an audience is a resident, a business, or another attribute. In another example, a natural attribute of a pipeline is a centerline.

Each data attribute and each spatial attribute has a data value. In the above example, the width attribute and the location attribute of the first pipeline each are populated with a data value. These data values are collected in datasets. The datasets may be in one or more databases, in discrete data sources, or in other locations. In some instances herein and dependent on usage, the data value for the data attribute is referred to simply as the data attribute.

A layer is a collection of similar features that have common types of CAM data attributes and/or spatial attributes. Using the examples above, a pipeline layer includes the first pipeline as a first feature and the second pipeline as a second feature. The features are grouped in the pipeline layer because they have similar data attributes of pipeline data.

Layers include a spatial data layer, a CAM data layer, and/or other layers. A spatial layer contains or identifies some spatial information, such as a city, county, state, region, address, zip code, SIC code, FIPS code, or another spatial element. Typically, spatial layers are a set of one or more features that have a set of one or more spatial data attributes. For example, a layer of United States counties might have data for a resident, a business, emergency responders, or other emergency officials and related audience data, in addition to the spatial information that describes the shape of each county. A CAM data layer often contains or identifies CAM data, such as audience members. In other example, CAM data layers contain or identify an interest area or a buffer area. CAM data layers, such as an audience layer, an interest area layer, and/or a buffer area layer refer to displayable or displayed data in some instances.

A dataset, such as a data table, a data file, a data structure, or another dataset, may be located in a database or a location other than a database. The database or other location may contain spatial information for the spatial layer or other information for other layers. The dataset may be in a different location than other datasets. A non-geospatial dataset for the CAP maybe referred to as a program dataset or a CAM dataset. A geospatial dataset is referred to as a spatial dataset. Datasets have the same relation to features and attributes as layers in one embodiment.

A disparate CAM dataset refers to a CAM dataset that is not co-located with another dataset or is not in a same data system, database, or data structure as the other dataset. Disparate CAM datasets may be located, for example, in different storage areas, such as different databases, different relational database management system (RDMS) database tables, or other different data structures. However, some disparate datasets may be located in the same storage area, such as a same database, but organized as different data tables or structures.

Figure 2:
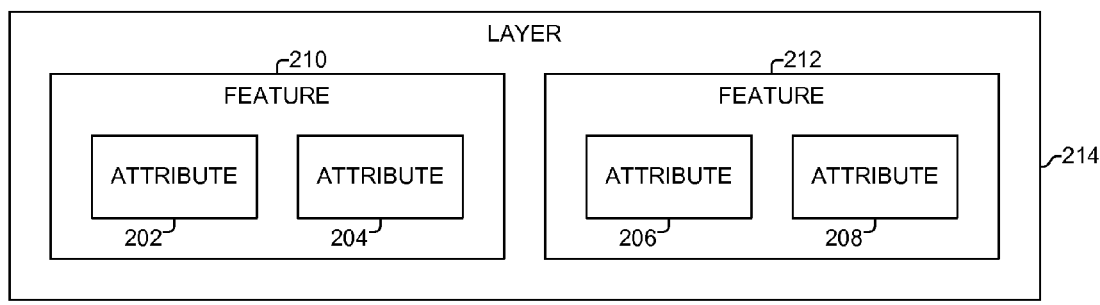
FIG. 2 is a block diagram of a layer in a CAM system in accordance with an embodiment of the present invention.

FIG. 2 depicts an example of the above referenced relationship between attributes 202-208, features 210-212, and a layer 214. In the example of FIG. 2, a first feature 210 has a first attribute 202 to an Nth attribute 204. A second feature 212 has a first attribute 206 to an Nth attribute 208. The two features 210 and 212 are part of a layer 214.

Referring again to FIG. 1, the CAM system 102 includes a spatial processing system 104, a user interface 106, and a data system 108. The CAM system 102 optionally may include another data system 110 and/or an input/output device 112 associated with the user interface 106. The CAM system 102 manages data for a CAP, including geospatial data and CAM data. In one embodiment, the CAM data includes CAP asset data. In one embodiment, the CAM system 102 manages data for a pipeline CAP, and the CAP asset data includes pipeline asset data.

The spatial processing system 104 processes geospatial data and CAM data from one or more CAM datasets related to a CAM system and spatially links the geospatial data and the CAM data to create one or more spatially linked CAM datasets. The spatial processing system 104 then enables performing queries of the linked CAM data and geospatial data. The spatial processing system 104 renders geospatial data and CAM data to the user interface for display, including map data, asset data, interest area data, buffer area data, audience data, journal data, document data, and other CAM data. In some instances herein, geospatial data is referred to simply as spatial data.

The spatial processing system 104 includes one or more processors to process the spatial data and the CAM data, to link the spatial data and the CAM data, and to perform queries. Memory is used to store data.

In one embodiment, the spatial processing system 104 enables linking one or more sets of spatial data to one or more sets of CAM data. The spatial processing system 104 has a configuration element, such as a configuration file. In one example, the configuration element is an extensible markup language (XML) configuration file residing in the spatial processing system 104. The link or links between the spatial data and the CAM data is defined in the configuration file.

In one example, the spatial data is organized as spatial data layers, and the CAM data is organized in CAM datasets. A configuration file contains a definition of all spatial data layers and CAM datasets that can be accessed by the spatial processing system 104. Each spatial data layer and CAM dataset has a configuration section, and each configuration section has a link section. If a CAM dataset is to be linked to a spatial data layer, the CAM dataset's link section identifies each data attribute that is linked to the corresponding data attribute in the spatial data layer. The spatial data layer's link section has a similar identification. In one example, the spatial processing system 104 links a journal entries CAM dataset from a table in one database and a contacts CAM dataset from a table in another database with a spatial layer. The link is defined based on common attributes or fields, which are attributes or fields that the journal entries CAM dataset and the contacts CAM dataset have in common with the spatial layer. These common attributes or fields are sometimes referred to as natural keys herein.

In one embodiment, a link configuration enables the spatial processing system 104 to construct a series of nested queries at runtime to obtain journal entries that have a natural relationship to audience members, such as feature data attributes common to both the journal entries and the audience members. In this embodiment, the queries are referred to as being nested because the spatial layer is queried first to get a collection of feature data that matches the search criteria from a spatial aspect. Then, for each set of feature data that resulted from the spatial query of the spatial layer, the spatial processing system 104 executes one or more queries against the CAM datasets to obtain the associated linked data.

In one example, the spatial processing system 104 enables creation of a query tool, such as a search tool or a filter tool, to perform nested queries. A query tool, for example, identifies contacts having a certain audience type that have received, or responded to, a selected mailing. In this example, a contacts CAM dataset contains names, addresses, and audience types of contacts, and a journal entries CAM dataset contains an indication of the contacts that have received, or responded to, the selected mailing. A link is configured between the contacts CAM dataset and the journal entries CAM dataset using a spatial layer. The query tool queries the contacts CAM dataset to identify the contacts having the selected audience type. For each set of contact feature data returned in the first query, the query tool then queries the journal entries CAM dataset to identify entries that identify the selected mailing. The link configuration also facilitates the display of journal entries when a contact is selected.

In another example, the contacts data is organized as the spatial layer, and the journal entries data is organized as the CAM dataset. In this example, the query tool is used to identify a collection of feature data from the contacts spatial layer that matches the search criteria from a spatial aspect, such as all contact's within a certain zip code. Then, for each set of feature data that resulted from the query of the spatial layer, the spatial processing system 104 executes a query against the journal entries CAM dataset to obtain the associated linked data, which in this instance are the journal entries.

In one embodiment, the spatial processing system 104 enables dynamically linking documents to spatial data or CAM data. Linking documents in this way enables organizing documents and navigating to documents spatially, effectively building a run-time relationship between individual spatial data and/or CAM data and one or more documents. For example, a document containing the name, address, contact person, and audience type for a city or county can be linked to a company/contact feature of an audience layer.

In one example, a user interface is used to insert a new document into a document index database and bind the index entry to a selected spatial layer. The user interface queries the user for the document location and the specific spatial layer feature data to which the document will be linked. The document is then "bound" to the feature data of the spatial layer in the document index table. In one embodiment, a structured query language (SQL) is used to insert document index relationship entries to specify documents that are associated with specific feature data. Alternately, a GUI wizard can facilitate this process.

In one embodiment, the spatial processing system 104 generates spatial data and CAM data for display. The spatial data and some CAM data are generated for display as a map. Other CAM data is generated for display as text and/or graphics. The spatial processing system 104 enables a user to access linked documents by selecting spatial data on the map or by selecting CAM data. If linked documents exist for the selected data, references identifying the document titles are displayed. The user can then display these linked documents by selecting the respective document reference. Other examples exist.

The user interface 106 presents spatial data and/or CAM data for display to a user. The spatial data and/or CAM data is received at the user interface 106 from the spatial processing system 104. The user interface 106 also enables a user to enter input data to be used for queries, linking CAM data and spatial data, otherwise building an application, and other purposes. The queries are sent to, and processed by, the spatial processing system 106.

The data systems 108 and 110 store and/or retrieve spatial data, CAM data, and/or other data related to the CAM system. The data systems 108 and 110 communicate with the spatial processing system 104 to transmit data to, and/or receive data from, the spatial processing system. Although one data system 108 and one other optional data system 110 are depicted in FIG. 1, the data systems each or together represent one or multiple data systems.

In one embodiment, the data system 108 and/or the data system 110 is a data system internal to the spatial processing system 104. In this embodiment, the data system 108 and/or 110 can be accessed via an Intranet connection, another Internet protocol (IP) connection, or another network connection. Alternately, the data system 108 and/or 110 can be connected directly to, or be a sub-component of, the spatial processing system 104. Other data systems may be used.

In another embodiment, the data system 108 and/or the data system 110 is an external data system. In this embodiment, the data system 108 and/or 110 communicates with the spatial processing system 104, such as over a connection, to transmit data to, and receive data from, the spatial processing system. In another embodiment, the external data system 108 and/or 110 is accessed via an internet connection, another connection, or another network connection. In this embodiment, the spatial processing system 104 processes a universal resource locator (URL) or another designation to connect to the external data system 108 and/or 110 and to communicate with the external data system for retrieving and/or sending data.

The input/output device 112 includes a monitor, a processor, a computer, a printer, another data output device, a mouse, a trackball, a touch pad, or other pointer, a keyboard, another data entry device, other input or output devices, and/or a combination of the foregoing. In one embodiment, the user interface 106 is generated for display to the input/output device 112. In another embodiment, the user interface 106 receives input data from the input/output device 112. In one embodiment, the input/output device 112 is a user computer for which the user interface 106 is generated. In one example of this embodiment, the user computer communicates with the spatial processing system 104 via an internet connection, an intranet connection, another IP connection, another network, and/or another connection.

The spatial processing system 104 may operate with one or multiple users on a one-to-one basis, a one-to-many basis, or a many-to-one basis. In one example, the spatial processing system 104 communicates with multiple users for multiple input/output devices. In another embodiment, the spatial processing system 104 operates as a service bureau and communicates with one or more input/output devices and/or data systems, In another embodiment, the spatial processing system 104 operates as a web hosting system and communicates with one or more input/output devices and/or data systems. In another embodiment, the spatial processing system 104 operates as an internal system for a company to manage assets for the company.

Figure 3:
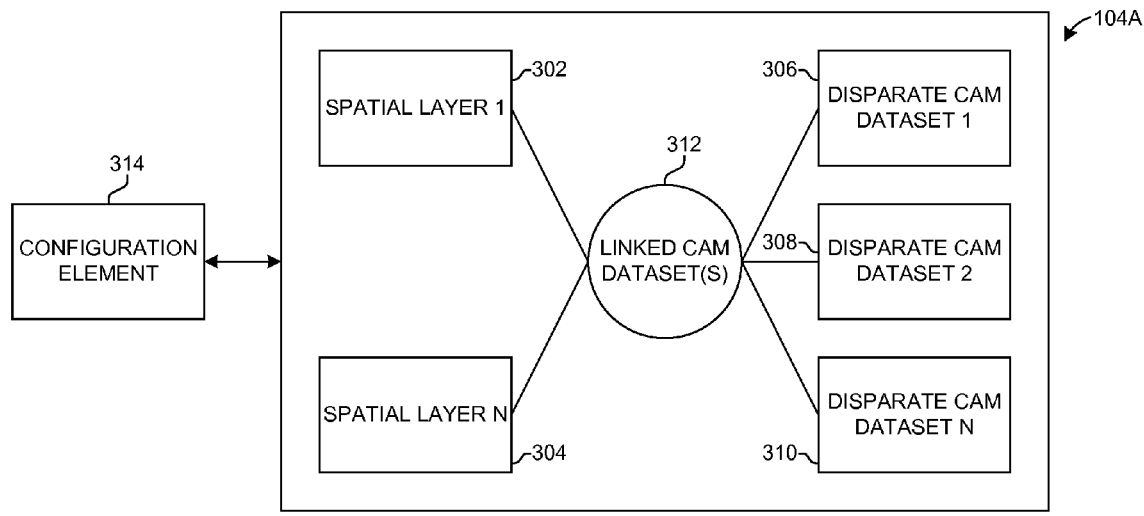
FIG. 3 is a block diagram of a linked datasets in a CAM system in accordance with an embodiment of the present invention.

FIG. 3 depicts an embodiment of a spatial processing system 104A process for spatially linking spatial data and CAM data. In this embodiment, the spatial data is configured in spatial layers, and the CAM data is configured in disparate CAM datasets. The spatial processing system 104A spatially links one or more spatial layers 302-304 with one or more disparate CAM datasets 306-310 to create one or more spatially linked CAM datasets 312. In one embodiment, the spatial link configuration is saved in a configuration element 314, such as a configuration file or another configuration element.

Spatial layers have data attributes that are native to the spatial features. For example, a county has a shape. But, it also has other attributes, such as audiences and other attributes. These natural data attributes are the data attributes that are part of the spatial layer.

While the disparate CAM datasets are not a part of the features of the spatial layer in one embodiment, the CAM datasets can be linked to the spatial layer using data attributes from the CAM dataset that are related to the spatial layer to create linked datasets, such as from a common data attribute. A user then can access the disparate datasets spatially.

Accessing a dataset spatially refers to querying a linked CAM dataset that has a relationship to spatial data in a spatial layer and selecting data from the linked CAM dataset and/or the spatial layer based on the selected spatial data or the selected CAM data. As an illustration, a pipeline spatial layer has a pipeline audience feature that has a first dataset with audience attributes. An audience identification (ID) statistic could be added to the data attributes of the pipeline audience feature. However, the specific attribute for the audience ID statistic would only represent one moment in time, which is the audience at the time of creation of the pipeline spatial layer. If the audience ID statistics are left in a second dataset that is disparate from the first dataset, but both are linked with a pipeline spatial layer, audience ID statistics representing different points in time may be accessed without having to change the spatial layer representing pipelines for each point in time that is of interest.

The linked datasets in this example may be accessed spatially, for example, by querying the pipeline spatial layer for pipelines in a region that have residents within a specified area. The resident data from the resulting pipeline area query at various points in time will be produced. In this example, the resident data is spatially accessed via the spatial attributes of the pipeline spatial layer, i.e., the pipelines in an area, and the data attributes for the pipelines, i.e., the residents within the specified area.

In one embodiment, disparate CAM datasets are dynamically linked at run time with a spatial layer to create a linked CAM dataset, thereby extending the natural data attributes of the spatial layer with those from the linked dataset. The datasets are linked using an attribute common to both CAM datasets and the spatial layer and are linked without copying data from one CAM dataset to the other.

The spatial system 102 links the disparate CAM datasets so that the CAM datasets may remain in their respective original data location, file, table, database, structure, or other location. Thus, the need to replicate the data to get it into the same (non-disparate) CAM dataset as the spatial data or the same dataset as another dataset is eliminated. This combination of one or more disparate CAM datasets and one or more spatial layers (or other spatial data) is referred to as a linked dataset.

In one embodiment, multiple CAM datasets are identified from a query, and the CAM databases are merged at run time using a data attribute common to a spatial layer and to the multiple CAM datasets. In this embodiment, the CAM datasets and the spatial layer are linked dynamically at run time, not permanently. As a result, any number of linked CAM datasets can be established for a spatial layer without altering the spatial and data attributes of the spatial layer or requiring any alterations of the disparate CAM datasets. The spatial processing system 104A enables linking CAM. datasets from different databases, structures, and database and structure types.

In one embodiment, a CAM dataset is spatially linked with a spatial layer by identifying an attribute common to the spatial layer and to the CAM dataset and defining a link between the spatial layer and the CAM dataset for that attribute. The link instructs the spatial processing system 104 where to find the CAM dataset and how to relate it to the spatial layer. In one example, a common attribute is identified between the spatial layer and the CAM dataset, the locations of the data attribute for the CAM dataset and the spatial layer are identified, and the data attribute is linked between the CAM dataset and the same attribute of the spatial layer.

In another embodiment, a spatial layer is linked using a data attribute that is present in both the spatial layer and the CAM dataset. In another embodiment, a spatial layer is linked to a first CAM dataset by linking a data attribute that is present in both the spatial layer and the first CAM dataset, and the spatial layer is linked to a second CAM dataset by linking another data attribute that is present in both the spatial layer and the second CAM dataset. In this embodiment, the spatial layer is spatially linked to the first CAM dataset and the second CAM dataset, and the first CAM dataset and the second CAM dataset are indirectly linked to each other via the spatial layer. In this embodiment, the first data attribute is different from the second data attribute.

In still another embodiment, the spatial layer is linked to a first CAM dataset by linking a data attribute that is present in both the spatial layer and the first CAM dataset. The spatial layer is linked to a second CAM dataset by linking the same data attribute, which also is present in the second CAM dataset.

In one embodiment, the CAM system 102 has a graphical user interface (GUI) with a configuration manager that is used to define the relationships between one or more CAM datasets and one or more spatial layers. This may be, for example, a textual definition of the relationship that one or more spatial layers will have at run-time to one or more disparate CAM datasets. The linking relationships, for example, may be defined via XML entries within the CAM system 102. The linked CAM dataset configuration definitions then are stored by the configuration manager in XML for use by the CAM system 102. Thus, a user does not have to write code to link the datasets.

Figure 4:
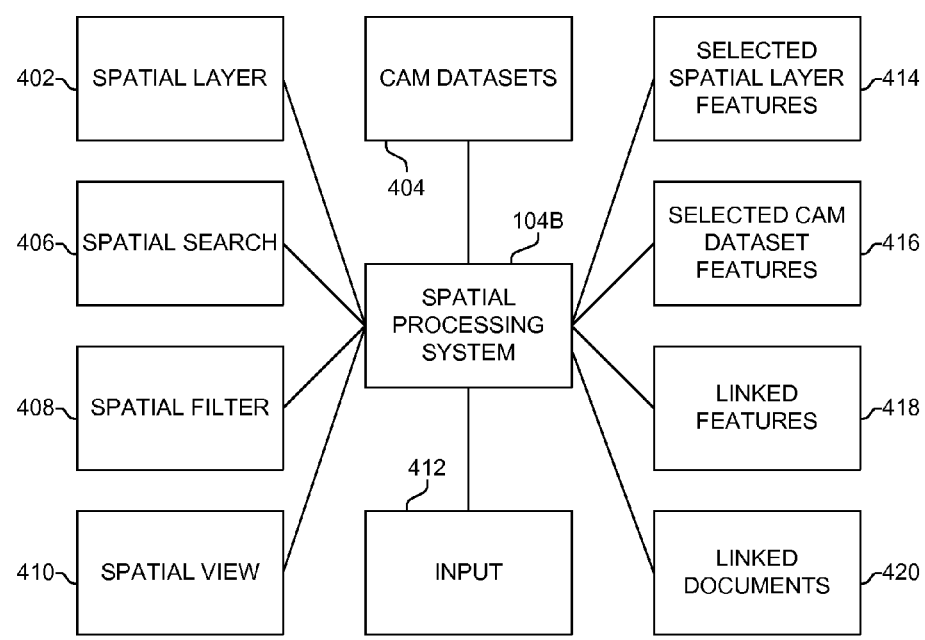
FIG. 4 is a block diagram of inputs and outputs for a CAM system in accordance with an embodiment of the present invention.

FIG. 4 depicts an exemplary embodiment of selectable options and outputs of a spatial processing system 104B, including defined tool sets. The selectable options and outputs are exemplary. Other examples exist.

One or more spatial layers 402 are defined for an application of the spatial processing system 104B. The particular application, such as a pipeline application, an oil well application, a population statistics application, or a cell tower application, determine the particular spatial layers that are defined. In one example for a pipeline application, spatial layers are defined for pipeline assets, audience layers, buffer areas, interest areas, journal entries, counties, zip codes, cities and other layers. The spatial layers that are defined and selected for processing may be queried, and the corresponding spatial data may be generated to a map image or other image as spatial features.

One or more CAM datasets 404 are defined for an application of the spatial processing system 104B. The particular application, such as a pipeline application, an oil well application, a population statistics application, or a cell tower application, determine the particular CAM datasets that are defined. In one example for a pipeline application, CAM datasets are defined for pipeline asset data, audience data, buffer area data, interest area data, journal entries data, and other CAM datasets. The CAM datasets that are defined and selected for processing may be queried, and the corresponding CAM data may be generated as feature data for display as an image, in a table, as text, as a graphic, or in another manner.

A set of tools is defined for the particular application of the spatial processing system 104B. Multiple types of tools maybe available. In the embodiment of FIG. 4, the tools include a search tool 406, a filter tool 408, and a view tool 410. The tools may be used to query one or more spatial layers and/or linked CAM datasets or view data of one or more spatial layers and/or linked CAM datasets. Other tools may be used.

The search tool 406 enables a query. When the search tool 406 is selected, a corresponding input is used to search the selected spatial layer or layers and the linked CAM dataset or datasets. In one example, the input is entered via a user interface.

The filter tool 408 also enables a query. When the filter tool 408 is selected, a corresponding input is used to search the selected spatial layer or layers and the linked CAM dataset or datasets. In one embodiment, the input is entered via a user interface. The filter tool 408 is similar to the search tool 406. However, the filter tool 408 is enabled once selected and stays enabled until de-selected. The search tool 406 is enabled only for a single search and is selected again for a next search.

The view tool 410 enables viewing an item selected from the viewed tool. In one embodiment, the selected item is viewed via a user interface.

One or more outputs are generated if a match between an input and one or more spatial layers and/or one or more linked CAM datasets is identified for a query. If a query match is identified for one or more spatial layers, the selected spatial layer features 414 resulting from the match, including the attributes for each of the features, are generated for display, such as in a map image. If a query match is identified for one or more CAM datasets on which the query is performed, the selected CAM dataset features 416 resulting from the match, including the attributes for each of the features, are generated for display, such as in a list specifying each selected feature and its corresponding data attributes. In some instances, CAM data also is generated for display in the map, such as audience location data, interest area data, buffer data, and CAP asset data.

If a query match is identified for one or more CAM datasets that are linked to the spatial layer, the corresponding linked features 418 resulting from the match are generated for display, such as each with a linked feature reference in a list. In one embodiment, each linked feature reference can be selected to display a list specifying the corresponding dataset features and their data attributes. In one example, if multiple linked CAM datasets have features that match a query, the features from a first CAM dataset are generated for display, such as in a list. In this example, linked feature references for the other CAM datasets are displayed as hyperlinks. The user may select the hyperlink for the corresponding CAM dataset to display the features for that CAM dataset.

If a query match is identified for one or more documents that are linked to the spatial layer or the linked CAM datasets, the corresponding linked documents 420 resulting from the match are generated for display. In one example, the linked documents are displayed in a display frame. In another example, each document is displayed with a linked document reference in a list. In this example, each linked document reference can be selected to display the corresponding document.

A user also may use the linked CAM datasets within the definitions of user tools. The tools may include search, filter, view, or other tools that are published for use by a CAM system 102 application. The CAM system 102 application then can use these published tools to obtain information from spatial layers and linked CAM datasets.

For example, a query is performed for the spatially linked data. Both the spatial layer and the linked CAM dataset are queried with an input. The spatial layer is queried to identify spatial data that match the input, if any. The linked CAM dataset is queried to identify data from the linked CAM dataset that matches the input, if any. In one embodiment, the spatial layer is queried first, and the linked CAM dataset is queried next. In another embodiment, the linked CAM dataset is queried first, and the spatial layer is queried next. In one embodiment, an SQL query is performed on the linked CAM data. In another embodiment, an SQL query is performed on the spatial layer. Other queries may be used in other embodiments.

If a query match is identified for the spatial layer, the feature data associated with the match is generated for display, such as with a map image. If a query match is identified for the linked CAM dataset, the feature data associated with the match is generated for display. The matching feature data may be referred to herein as selected features. The selected features from the linked CAM dataset are generated for display in one embodiment as a tabular list. In another embodiment, a query match also identifies linked features, linked documents, and/or other cross reference data. The linked features, linked documents, and/or other cross reference data are generated for display in one embodiment. Cross reference data is document data, linked feature data, and other data associated with specific feature data returned in response to a query.

Linked CAM datasets can be used within tools as if the attributes of the linked CAM dataset were natural data attributes of a spatial layer. For example, a filter tool might be created that highlights audiences having a selected SIC code. In this example, the filter tool uses a linked CAM dataset on the audience spatial layer to provide audiences having a selected SIC code and audience type because the SIC code is not present in the data attributes of the audience spatial layer. The tool actually uses data attributes of the linked CAM dataset to narrow the set of spatial data that result from the tool's query operation. Thus, the data attributes of the linked CAM dataset appear to the rest of the CAM system 102 as if they were just part of the native attributes of the spatial layer.

In one embodiment, when a published query tool is used, such as a filter tool or a search tool, a map image illustrating the results of the query is generated for display. Optionally, a list of data attributes that resulted from the query operation also is generated for display, such as in a tabular list. These data attributes include attributes from the spatial layer and/or attributes from the CAM datasets.

In one example of a tabular display, each row of the table is a different feature, and each column depicts a different attribute of the feature. The table may include column headings to identify the feature attributes. A list of the linked CAM datasets associated with the feature's parent layer that have available data also is generated. The user can select any of the available linked CAM datasets to display a list of records from the selected linked CAM dataset.

Figure 5:
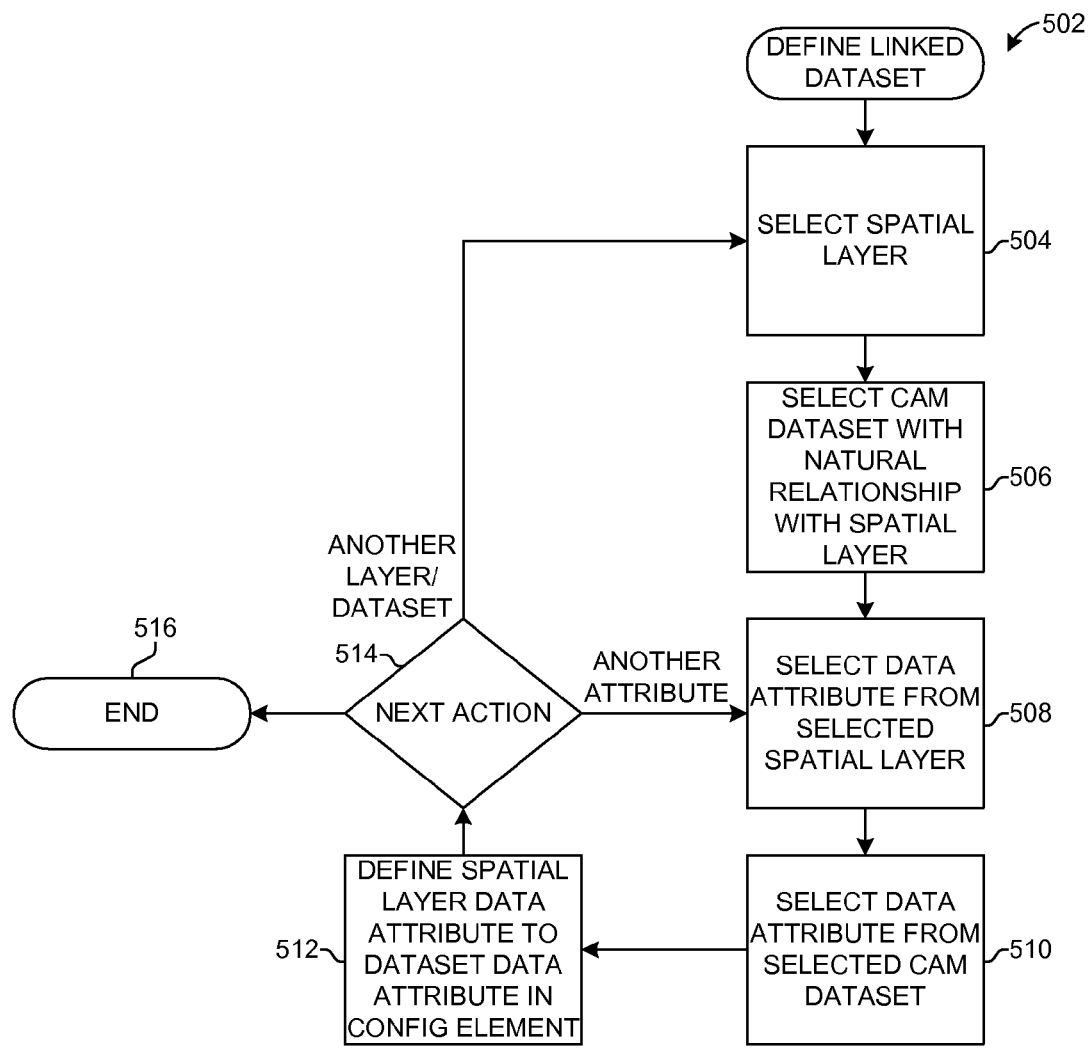
FIG. 5 is a flow diagram of a process for linking a spatial layer with a dataset in accordance with an embodiment of the present invention.

FIG. 5 depicts an exemplary embodiment of a linked CAM dataset definition process 502. A spatial layer is selected at step 504. A CAM dataset having a natural relationship with the selected spatial layer is selected at step 506. As used herein, datasets and/or spatial layers have a natural relationship when they have one or more common data attributes. A common data attribute is selected from the selected spatial layer at step 508. The common data attribute is selected from the selected CAM dataset at step 510. The selected spatial layer data attribute is defined to the selected CAM data attribute in a configuration file or other configuration element at step 512.

The next step is determined at step 514. Steps 508-512 may be repeated to define another common data attribute for the selected spatial layer and the selected CAM dataset. Steps 504-512 may be repeated to define a common data attribute for another spatial layer and/or another CAM dataset. The process ends at step 516.

In one embodiment, after one or more linked CAM datasets are defined, SQL type statements are used to describe a query that spans the spatial layers and the linked datasets. The query is used to match an input for a query to the spatial layers and the linked datasets. In one example of this embodiment, SQL type statements describe multiple transactions used to query the spatial layers and the linked datasets. The statements use XML to describe how to select data fields for the query. The statements include a selection clause to identify elements that are wanted, a from clause to identify from what spatial layers and/or datasets the data is to be queried, a where clause to identify what criteria is used to select data, an order clause to identify the order used to present data that matches the query, and a group clause to identify how common/like data is to be grouped, such as by rows. The statements are presented with database/data system neutral definitions and vendor neutral definitions.

In one embodiment, the base SQL statements for the queries, including queries for the filter tools and the search tools, are templates defined in the configuration files. However, the SQL statements may be modified at runtime to account for optional user inputs that were not supplied in the configuration file. For example, if an SQL statement for a query is defined to expect three arguments from the user, but only two are supplied, the third argument is removed from the SQL statement at runtime, providing the third argument was defined as being optional.

Figure 6:
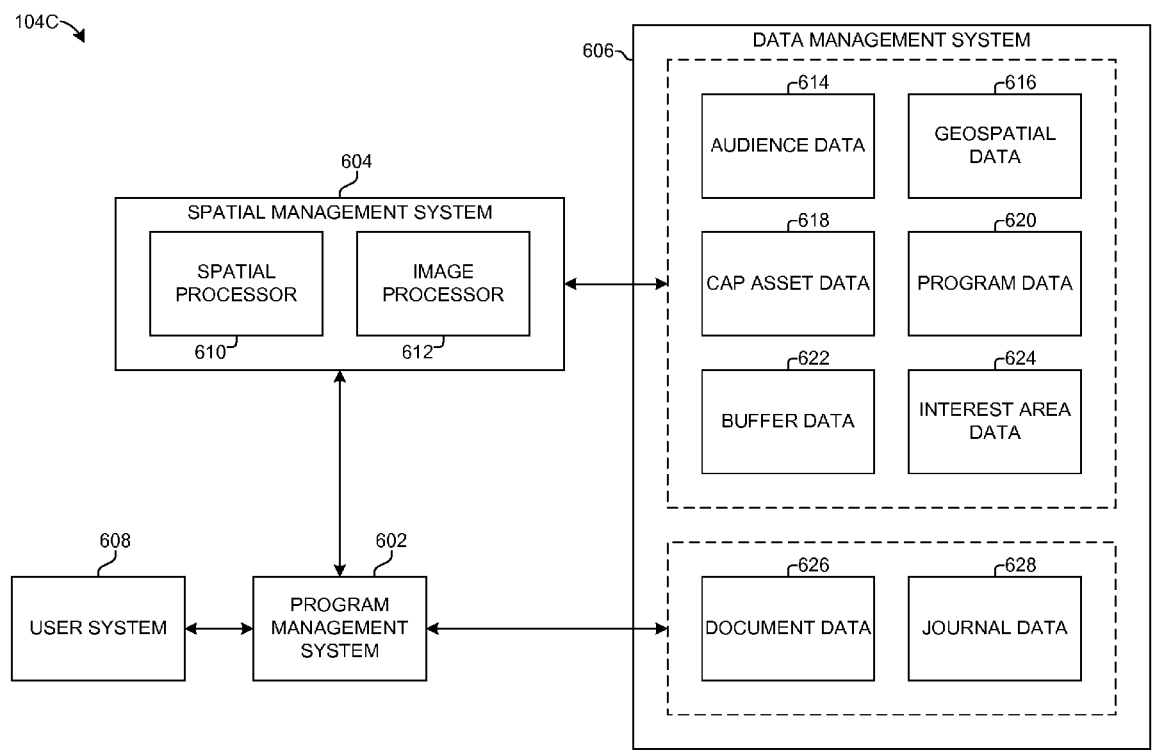
FIG. 6 is a block diagram of a spatial processing system in accordance with an embodiment of the present invention.

FIG. 6 depicts an exemplary embodiment of a spatial processing system 104C. In the embodiment of FIG. 6, the spatial processing system 104C includes a program management system 602, a spatial management system 604, and a data management system 606. The program management system 602 communicates with a user system 608 via a connection, such as a wireless or wireline connection, including an internet connection, an intranet connection, another internet protocol connection, another network connection, or another connection.

The spatial processing system 104C may operate with one or multiple users on a one-to-one basis, a one-to-many basis, or a many-to-one basis. In one example, the spatial processing system 104C communicates with multiple user systems. In another embodiment, the spatial processing system 104C operates as a service bureau and communicates with one or more user systems and/or data systems. In another embodiment, the spatial processing system 104C operates as a web hosting system and communicates with one or more user systems and/or data systems. In another embodiment, the spatial processing system 104C operates as an internal system for a company to manage assets for the company.

The program management system 602 receives communications from, and transmits communications to, the spatial management system 604 and the data management system 606 and processes the communications. The communications may be queries, data, signaling, or other communications. The program management system 602 receives, transmits, and processes geospatial data for one or more spatial layers and/or CAM data for one or more CAM datasets.

The program management system 602 communicates with the spatial management system 604 and/or the data management system 606 to obtain geospatial data and/or CAM data. In one example, the program management system 602 queries the spatial management system 604 and/or the data management system for features that match selected criteria, such as for geospatial data and/or CAM data. The query may be for a search, a filter, or another query meeting selected criteria. In this example, the program management system 602 receives from the spatial management system 604 and/or the data management system feature data that matches the query, including geospatial data and/or CAM data.

The program management system 602 receives communications from the user system 608, transmits communications to the user system, and manages the communications. The communications may be, for example, queries, data, signaling, and/or other communications. The communications also may be responses or requests, such as requests for audience data, program data, spatial data, asset data, buffer data, interest area data, document data, journal data, and/or other data. Other communications may include, for example, static content, such as hyper text markup language (HTML) communications, images, JavaScript communications, and data identifying styles. Still other communications may include non-static content, such as Java server pages (JSPs), Servlets, flash content, and other content. The signaling may include, for example, instructions to render communications, instructions to query or transmit data, instructions in response to a query or to transmit data, instructions to obtain access-to the spatial processing system 104C, or other instructions. In one embodiment, the program management system 602 communicates with the user system 608 via hyper text transfer protocol (HTTP).

The program management system 602 renders one or more images, feature data, and/or other data, such as for a user interface, in some embodiments. The program management system 602 formats the images and/or feature data in a form receivable by the user system 608. In one embodiment, the program management system 602 renders the images and/or feature data into an HTML communication in a format receivable by the user system 608. In some examples, the rendered communications to the user system 608 include links for documents and/or the documents themselves and/or other data.

The spatial management system 604 receives queries from the program management system 602 and, if a match is identified, returns results matching the queries to the program management system. The results may include one or more images and/or feature data. The spatial management system 604 also queries the data management system 606 and receives results from the data management system if a match is identified. The spatial management system 604 often passes the results to the program management system 602, including the feature data and/or one or more images.

The feature data may include audience data, CAP asset data, geospatial data, interest area data, journal data, document data, and/or other data. In one embodiment, the CAP is a pipeline CAP, and the CAP asset data includes pipeline asset data.

In one embodiment, the spatial management system 604 includes a spatial processor 610 and an image processor 612. In other embodiments, a single processor may process spatial queries, data, and/or images. In still other embodiments, the functions of spatial management system 604 may be included in one processor or multiple processors.

The spatial processor 610 receives and processes communications, such as queries and data, from the program management system 602 and the data management system 606. The spatial processor 610 transmits communications, such as queries and data, to the program management system 602 and the data management system 606.

In one embodiment, the spatial processor 610 receives spatial queries and responds with feature data matching the query. If no feature data matching the query is identified, the spatial processor 610 indicates that there is no matching data. In one example, when the spatial processor 610 receives a query from the program management system 602, the spatial processor queries the data management system 606 to obtain the requested spatial data and feature data. The spatial processor 610 receives a response from the data management system 606 with the requested spatial data and feature data or an indication that the feature data does not exist. The spatial processor 610 processes the spatial data and the feature data and transmits the processed data to the program management system 602.

The spatial processor 610 identifies and generates one or more geocodes based upon a query, such as a search criteria. The geocodes may include a latitude and a longitude or other location identifiers that designate a geographic location.

The spatial processor 610 geocodes data submitted by the user system 608. In one embodiment, the user system 608 transmits data for a contact, including an address. The spatial processor 610 receives the contact data from the program management system 602 and geocodes the contact data using the address data. The spatial processor 610 transmits the geocode for the contact data to the program management system 602.

The image processor 612 receives queries from the program management system 602. The image processor 612 transmits a response to the program management system 602 with the match to the query or an indication that the requested data does not exist. In one example, the response includes one or more images identifying geospatial data for an area corresponding to the query. The one or more images also may identify CAM data, such as one or more CAP assets, interest areas, buffer areas, audience members, or other CAM data.

The image processor 612 receives requests from the program management system 602 for images or other image data, and the image processor responds to the program management system with the corresponding images or other image data or an indication that the requested images or other image data do not exist. The image processor 612 generates images or other image data for geographic areas and/or feature data. The images may identify geospatial data, including map data identifying geographic areas for the CAP, and other geospatial data. The images also may identify CAM data, such as one or more interest areas, buffer areas, point features, contacts, other audience members, other locations of interest, such as buildings and CAP assets, other program data, and other feature data. A point feature is a geocoded location that indicates a location of a person, place, or thing, such as a CAP asset, a contact or other audience member, and other features. A point feature may be identified on a map image or other map data.

The image processor 612 queries the data management system 606 to obtain feature data, including spatial data, point feature data, contact data, other audience member data, CAP asset data, program data, interest area data, buffer data, and other CAM data. The image processor 612 receives a response with the match to the query or an indication that the requested data does not exist.

In one embodiment, the queries transmitted from the program management system 602 to the spatial processor 610 and/or the image processor 612 are SQL queries. In this embodiment, the responses transmitted from the spatial processor 610 and/or the image processor 612 to the program management system 602 are SQL responses.

In another embodiment, the queries transmitted from the spatial processor 610 and/or the image processor 612 to the data management system 606 are SQL queries. In this embodiment, the responses transmitted from the data management system 606 to the spatial processor 610 and/or the image processor 612 are SQL responses.

In one embodiment, the image processor 612 identifies CAM feature data and spatial data located within a search range of a geocode and generates one or more images, text, and/or other data representing the identified CAM feature data and/or spatial data. In one example, the image processor 612 generates one or more maps identifying a geographic area within a range of a query, such as a search, and transmits the maps to the program management system 602. The maps may include multiple layers of CAM feature data, including audience data, spatial data, CAP asset data, program data, buffer data, interest area data, document data, and/or journal data. Feature data in this example refers to data selected for display. In one example, the map may identify contacts, other audience members, a pipeline or other pipeline asset or CAP asset, a centerline for a pipeline or an interest area for another CAP asset, and a buffer area for a pipeline or other CAP asset. In this example, layers of data may be selected so they are displayed on the map. The layers include both spatial data and CAM data. If the audience layer is not selected, the audience data from the CAM datasets is not generated for display. Similarly, if a roads spatial layer is not selected, the spatial data identifying roads is not generated for display. The image processor 612 also generates images based on navigation criteria, such as a selection of a pan, zoom, a drag pan, or movement of a map in a direction.

The data management system 606 receives and processes communications, such as queries and data, from the program management system 602 and the spatial management system 604. The data management system 606 transmits communications, including spatial data and CAM data, to the program management system 602 and the spatial management system 604. The data management system 606 stores and retrieves spatial data and CAM data.

The data management system 606 may include one or more data storage systems, databases, data structures, and/or volatile and/or nonvolatile memory. The data management system 606 manages contact data and other audience data 614, geospatial data 616, CAP asset data 618, program data 620, buffer data 622, interest area data 624, document data 626, and/or journal data 628.

The audience data 614 may include a contact or audience name, an audience type, a company or city name, an address, a phone number, a fax number, an email address, a region, a SIC code, a FIPS code, statistical information, journal entry data, document data, or other information. The audience data 614 may include one or more contacts or other audience members.

The geospatial data 616 may include geographic data, spatial data, point data, or other spatial data. The geospatial data 616 also may include geocoded or geocoding data, other geocode data, and image data.

The CAP asset data 618 may include data identifying one or more physical or logical features or entities, environmental features, company features, equipment features, building features, devices, systems, and/or objects associated with a CAP for which a company, entity, and/or audience has an interest and/or otherwise affects the operation of the system management by the CAP and/or the auditing and/or reporting of the CAM system and/or other CAP features for a CAP. In one embodiment of a pipeline CAP, the CAP asset data 618 includes pipeline data, such as a width, length, and material of a pipeline, structural aspects of the pipeline, valves, building locations, and other structural features of the pipeline. The CAP asset data 618 for a pipeline also may include environmental and other features associated with a pipeline CAP.

The program data 620 may include audit information, post office data related to the audit program, program specifications, including regulations and legal information, identifications of users, associated parties, and other program data used to manage the CAP. In one embodiment, the program data 620 includes audit data for a pipeline CAP.

The buffer data 622 includes data identifying one or more buffer areas for one or more CAP assets, interest areas, other CAM data, or otherwise for the CAP. The buffer data 622 may include buffer area data that is a selected distance from an interest area or a CAP asset, varied or non-varied selected distances from different points of an interest area or a CAP asset, a varied or non-varied area from one or more selected locations or points, or other data identifying the buffer area. In one embodiment, the buffer data 622 identifies a buffer area for a pipeline.

The interest area data 624 identifies one or more interest areas for one or more CAP assets, point features, environmental points of interest, or other identifiers. In one embodiment, the interest area data 624 identifies the centerline of a CAP asset. In one example, the centerline is the centerline of a pipeline.

The document data 626 identifies data of one or more documents. The document data 626 may include documents, such as word processing documents, spreadsheet documents, images, HTML documents, portable document format (PDF) documents, images, email, regulatory documents, or other documents, data from any of the foregoing, and other document data. The document data 626 may identify links to documents or provide other location identifiers to documents.

The journal data 628 includes journal entries, contact identifiers, CAP asset identifiers, and/or other data for a journal. The journal data 628 may relate to spatial data and/or CAM data, including data for CAP assets, contacts, other audience members, buffer areas, and interest areas, program data, and/or other relevant data for the CAP.

Any of the data 614-628 in the data management system 606 may include geocode information. For example, the CAP asset data 618 may include a point feature or other geocoded location to identify the location of the CAP asset.

The user system 608 includes a processor configured to communicate with the program management system 602 over a connection. The user system 608 receives communications, including data and signaling, and transmits communications, including data and signaling. In one embodiment, the user system 608 includes a browser that displays feature data and images received from the project management system 602 and that enables the user to enter input data. Although, other tools may be used to enter data and display data.

In one embodiment, the spatial processing system 104C operates as follows. The user system 608 transmits a request to the program management system 602 for audience data identifying public officials within a selected zip code. The public officials are a type of audience member. The program management system 602 processes the communication and determines that a request should be made to the spatial management system 604.

The project management system 602 transmits a request to the spatial processor 610 to locate the specific type of audience members within the selected zip code. In this example, the zip code is a spatial layer, and the audience members are in a CAM dataset.

The spatial processor 610 processes the request and geocodes the search criteria. The search criteria in this example is the zip code. The spatial processor 610 transmits a request with the geocode data to the data management system 606 to locate the feature data meeting the selected criteria. In this example, the selected criteria include contacts having a type of public official and a spatial property within the selected zip code.

The database management system 606 responds to the spatial processor 610 with the requested feature data. The spatial processor 610 in turn responds to the project management system 602 with the feature data that matches the request. In this example, the feature data includes a list of contacts that are public officials within the selected zip code.

The project management system 602 processes the response from the spatial processor 610 and determines that a match for the feature data was located. The program management system 602 transmits a request to the image processor 612 for the image data that corresponds to the feature data. The image processor 612 queries the data management system 606 for the requested image data.

The data management system 606 processes the request, and transmits a response to the image processor 612 with the image data that matches the request. The image processor 612 processes the image data, and generates one or more map images to the program management system 602. In this example, the map images include a map image depicting the geographic area identified by the selected zip code and identifying the point features for the contacts within the zip code, an overview map image identifying the selected zip code and the surrounding zip codes within the selected range, and a map legend identifying the feature data on the map image.

The program management system 602 transmits a query to the data management system 606 to obtain cross reference data associated with the contacts. The cross reference data is document data and other data associated with specific feature data returned from the spatial processor 610 and/or the image processor 612 in response to the queries. In this example, the cross reference data includes documents that are linked to the contacts and/or the other feature data returned in the response. The data management system 606 transmits a response to the query, which includes links to documents associated with the contacts. In other examples, the data management system 606 transmits the actual documents to the program management system 602 in the response.

The program management system 602 also transmits a query to the data management system 606 for associated journal data. In this example, the data management system 606 responds with journal data, including specific journal entries and data identifying the users that added the journal entries. This query may be within the same query as the cross reference data query or a separate query.

The program management system 602 processes the data received in the responses from the spatial management system 604 and the data management system 606. The program management system 602 generates a communication to the user system 608. The program management system 602 renders the images received from the image processor 612, the feature data received from the spatial processor 610, and the cross reference data and journal data received from the data management system 606 for display by the user system 608. In this example, the cross reference data includes hyper links to linked document data. In one example, the program management system 602 renders the data as a user interface displayable by the user system 608.

In another example, the user system 608 transmits a communication to the program management system 602 requesting all contacts at a selected address. In this example, the program management system 602 is configured to return results within a selected range or distance of the address. The program management system 602 queries the spatial management system 604 to identify feature data within the selected range of the address.

The spatial management system 604 geocodes the address and queries the data management system 606 to identify feature data within the selected range of the geocode. The data management system 606 returns the feature data matching the query to the spatial management system 604. The spatial management system 604 formats the matching feature data, if necessary, and transmits the feature data and the geocode for the address to the program management system 602.

The program management system 602 transmits another query to the spatial management system 604 requesting image data corresponding to the geocode. The spatial management system 604 transmits a response to the program management system 602 with the requested image data.

The program management system 602 transmits a request to the data management system 606 to obtain cross reference data. The data management system 606 responds to the program management system 602 with the cross reference data, including document data and journal data.

The program management system 602 renders the feature data, the image data, and the cross reference data to the user system 608. In this example, a user interface is rendered with a map identifying a geographic area for the selected range around the address. In this example, the feature data includes pipeline data, interest area data, and buffer area data. The interest area data includes centerline data for the pipeline. The pipeline is indicated on the map by a selected color, symbol, and/or shading. The centerline of the pipeline is indicated by another selected color, symbol, and/or shading. The centerline indicates the location of the pipeline in the geographic area identified by the map. A buffer area also is indicated on the map. The buffer area is indicated by another selected color, shading, and/or symbol. In this example, the buffer data indicates an area on each side of the pipeline centerline. Feature data includes spatial data in other examples.

The contacts and other audience members are indicated on the map as point features. At least some of the point features are displayed in the geographic area of the map relative to the buffer area. As used herein, the team "relative" means within, next to, or a distance from the associated object or area, but displayable within a selected range of the area or object. In the present example, the point features are displayed within or next to the buffer area so that the user can identify where the contacts and other audience members are in the selected geographic area and where the buffer area is in the selected geographic area.

Figure 7:
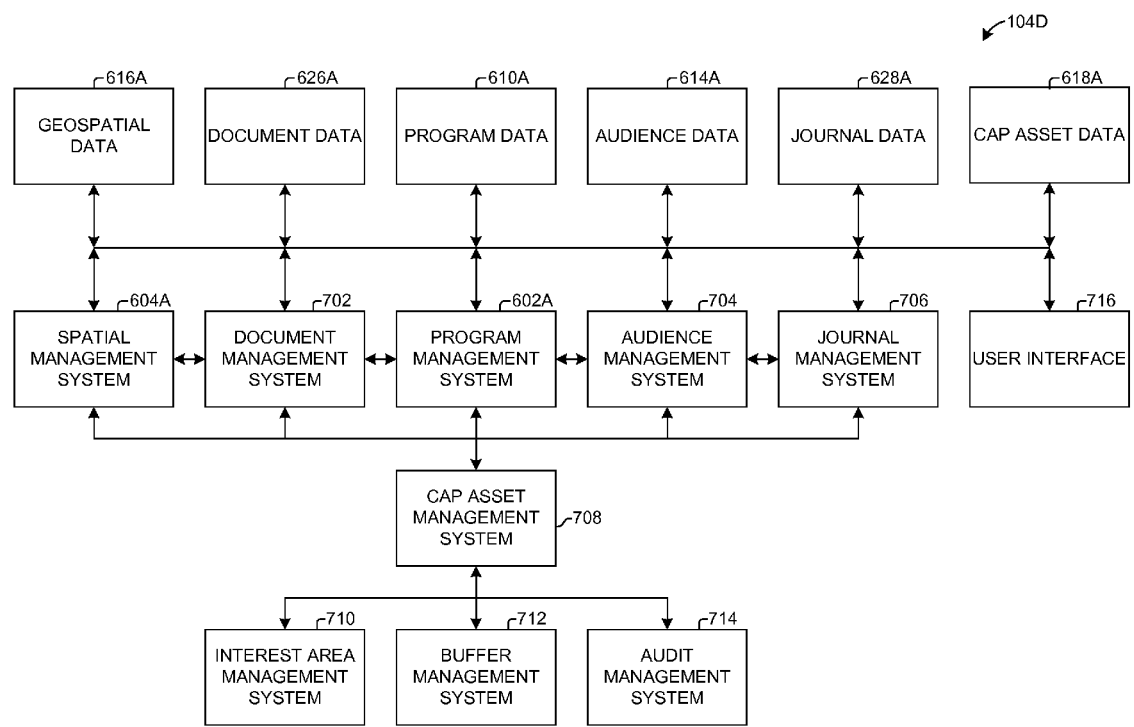
FIG. 7 is a block diagram of another spatial processing system in accordance with an embodiment of the present invention.

FIG. 7 depicts another exemplary embodiment of a spatial processing system 104D. The spatial processing system 104D includes a program management system 602A, a spatial management system 604A, a document management system 702, an audience management system 704, a journal management system 706, a CAP asset management system 708, an interest area management system 710, a buffer management system 712, an audit management system 714, and a user interface 716. The spatial processing system 104D also includes audience data 614A, geospatial data 616A, CAP asset data 618A, program data 620A, document data 626A, and journal data 628A. The CAP asset data 618A of FIG. 7 also includes interest area data and buffer area data.

The program management system 602A manages the program data 620A, including storage and retrieval of the program data, and communications to and from the user interface 716. The communications maybe queries, data, signaling, or other communications. For example, the program management system 602A receives queries for data from the user interface 716 and transmits responses to the user interface. The responses may include feature data and image data, including map data.

The program management system 602A manages communications to and from the other components of the spatial processing system 104D. The communications may be queries, data, signaling, or other communications. For example, the program management system 602A initiates queries for feature data and image data, including map data, to other components of the spatial processing system 104D, and the program management system receives responses from the other components of the spatial processing system. The program management system 602A performs other functions similar to the program management system 602 of FIG. 6.

The program management system 602 renders one or more images and/or feature data, such as for the user interface 716. The program management system 602A formats the feature data and/or image data, including map data, in a form receivable and processable by the user interface 716. In some examples, the rendered communications to the user interface 716 include links for documents, the documents themselves, and/or other data.

The spatial management system 604A manages the spatial data 616A, including storage and retrieval of the geospatial data and querying the spatial data. The spatial management system 604A receives and processes communications, such as queries and data, from the program management system 602A and other components in the spatial processing system 104D. The spatial management system 604A transmits communications, such as query results and data, to the program management system 602A. The data may include feature data and/or image data.

The spatial management system 604A receives queries from the program management system 602A and, if a match is identified, returns results matching the queries to the program management system. The results may include one or more images and/or feature data. In some instances, the spatial management system 604A queries the other components of the spatial processing system 104D and retrieves data from the other components. This data may include audience data, CAP asset data, geospatial data, interest area data, journal data, and/or document data. In one embodiment, the CAP is a pipeline CAP, and the CAP asset data includes pipeline asset data.

The spatial management system 604A geocodes data received from the program management system 602A or otherwise received via the user interface 716, including contact data, other audience data, queries, and other data. The spatial management system 604A also retrieves image data corresponding to feature data and/or geocoded data.

The image data may include map data identifying geographic areas managed by the CAP and the spatial processing system 104D. The image data also may include a map image, an overview map image, a legend, a buffer area, a CAP asset, an interest area, an audience member, and/or other spatial data and/or feature data. The image data also may include point features for contacts or other audience members, CAP assets, buffer areas, interest areas, and other locations or points of interest. The spatial management system 604A also performs functions similar to the spatial management system 604 of FIG. 6.

The document management system 702 manages document data 626A. The document management system 702 enables a user to associate documents to contacts, other audience members, CAP assets, journal entries, or other feature or attribute data so that an associated document or other associated document data will be generated for display upon selection or display of selected data or upon selection of a link or other identifier of a document or document data.

In one example, a user uses the user interface 716 to link a document to selected feature data or an attribute of the feature data, such as to a contact or an asset. When the contact or asset data is generated for display, a link for the document also is generated for display. A user may select the link, and, in response, the document will be generated for display by the program management system 602A. Alternately, a user may link a document to selected feature data. When the feature data is generated for display, the document also will be generated for display.

In another example, document data from a document is linked to feature data. When the feature data is generated for display, the document data, not the document itself, is generated for display with the feature data.

The audience management system 704 manages contact data and other audience data 614A. The audience management system 704 receives and stores audience data 614A and retrieves audience data for display. In one example, the audience data 614A is entered using the user interface 716. In another example, the audience data 614A is generated for display to the user interface 716.

In some instances, the audience management system 704 manages only contact data. The audience management system 704 enables a user to enter new audience data, edit existing audience data, or delete audience data. The audience management system 704 also enables a user to link audience data to other feature data.

The journal management system 706 manages journal data 628A. The journal management system 706 enables a user to enter new journal data, edit existing journal data, delete journal data, or link journal data to other feature data. In one example, journal data is received from or transmitted to the user interface 716. Journal data includes, for example, journal entries identifying an audience member, including a contact, a selected aspect of the CAP, a location or other spatial data, a CAP asset, program data, feature data, or other data. The journal data may include a user making an entry, an action taken, a user taking the action, a date the action was taken, other transaction data, and/or other data. An action may include, for example, generating or transmitting an audit package, performing a regulatory action under the CAP, identifying or complying with regulatory or CAP program specifications, or another action relevant to the CAP.

The journal management system 706 also tracks communications with, and information related to, a contact or other audience member or a specific user. In one embodiment, if a communication is sent to a contact, the journal management system 706 automatically generates a journal entry identifying the communication transmitted to the contact, the contact, the date and time the transmission was sent, and a comment or other entry identifying the context of the communication. In another embodiment, if an action is taken related to a contact, the journal management system 706 automatically generates a journal entry identifying the action taken for the contact, the user taking the action, and the time and date the action was taken.

In one embodiment, the journal management system 706 attaches one or more journal entries to feature data, including spatial features. For example, the journal management system 706 may attach a journal entry to a contact point feature, a CAP asset, or a location identified by a spatial feature. Other examples exist.

The CAP asset management system 708 manages CAP asset data 618A. In the embodiment of FIG. 7, the CAP asset data 618A includes interest area data and buffer area data. In one example, the CAP asset data includes pipeline asset data, including pipeline data. CAP asset data may be transmitted to and received from the user interface 716.

The CAP asset management system 708 manages the retrieval and storage of CAP asset data 618A. The CAP asset management system 708 identifies specific CAP assets for a specific CAP and records features and specifications for the CAP asset.

The interest area management system 710 manages interest area data for the CAP assets. The interest area management system 710 controls retrieval and storage of the interest area data. The interest area management system 710 identifies and records specifications and features for the interest areas of CAP assets. In one example, the interest area data identifies centerlines for one or more pipelines. Interest area data may be received from and transmitted to the user interface 716.

The buffer management system 712 manages retrieval and storage of buffer area data and other buffer data for the CAP. The buffer management system 712 controls identification and recordation of buffer area features and specifications. Buffer area data may be received from and transmitted to the user interface 716.

The audit management system 714 manages audit information. The audit information may be included in the program data 620A. The audit management system 714 controls retrieval and storage of audit data, such as information included in an audit package, links between audit data and contacts, links between audit data and other feature data, and other aspects associated with audit data. Audit data may be received from or transmitted to the user interface 716.

The user interface 716 generates data for display to a user, including feature data and image data. The image data may include a map image, an overview map image, a map legend, a CAP asset, a buffer area, an interest area, an audience point feature, and/or other spatial data and/or feature data.

The user interface 716 also enables a user to enter data, including feature data and queries. A query is transmitted to the program management system 602A to locate a selected type of audience member. The query may include, for example, a request to locate a contact by address, zip code, county, company, contact name, phone number, journal entry, or another query type.

One or more tools may be generated for display to the user. The user may select one or more of the tools to control the type of query that will be made. In one embodiment, queries are preconfigured and published in the form of a search tool and a filter tool. One or more SQL queries may be tied to the search or filter tools in one or more formats. For example, if the user selects a first search and a first filter, an SQL query may be made to a database to search for feature data and image data matching the query input by the user, the selected search toot, and the selected filter tool. In other examples, only a search tool, only a filter tool, or multiple search and/or filter tools may be selected.

The user interface 716 also enables a user to select spatial layers and other layers for display. The other layers may include CAM data layers that are generated for display, such as an audience layer that generates point features identifying the location and/or features of one or more audience members, an interest area layer identifying the location and/or features of one or more interest areas, and a buffer area layer identifying the location and/or features of one or more buffer areas.

The user interface 716 enables a user to link one or more sets of feature data to one or more spatial layers and/or other layers and/or to one or more other sets of CAM data, such as linking document data to feature data. The user interface 716 also enables a user to configure the spatial data system 104D, such as configure display aspects or data processing aspects, and configure and control user access to the feature data and image data.

In some embodiments, the program management system 602A controls access to the user interface 716 or other components of the spatial management system 104D through one or more security features. The security features may include requiring a user to enter a valid user name and password and providing access to selected tools, feature data, spatial data, and data layers based on a user's security access level. The security access level may be controlled, for example, using a user identification and/or a user password.

In one example, a user enters its user identification and password and is able to access a selected set of spatial data and CAM data for a company. Another user enters its user identification and password and is able to access a different selected set of spatial data and CAM data for the same company. Still another user enters its user identification and password and is able to access still another selected set of spatial data and CAM data, but for a different company. In one embodiment, the program management system 602A is configured in a service bureau-type system, and all of the users are able to access their selected sets of data through the program management system 602A by using their user identifications and passwords. In another embodiment, the program management system 602A is configured in two internal systems, one for each company. In this embodiment, the first and second users access the selected data from one internal system, and the third user accesses the selected data from a second internal system. In another embodiment, the program management system 602A is configured as a web hosting system or another system.

Figure 8:
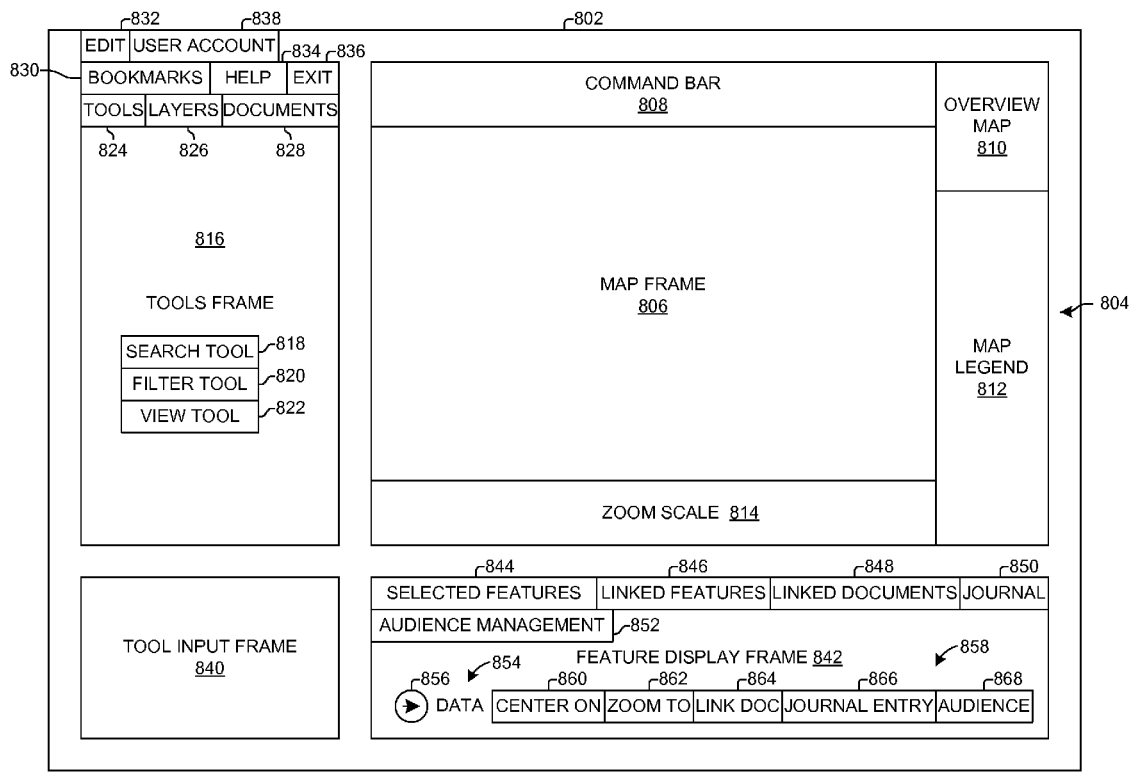
FIG. 8 is a diagram of a user interface for a CAM system in accordance with an embodiment of the present invention.

FIG. 8 illustrates an exemplary embodiment of a user interface used to enter query criteria, select tools for queries, and generate spatial data and CAM data for display. The user interface may be used to configure tools, define linked datasets, and perform other operations.

The user interface 802 has a browser frame 804. The browser frame 804 in the example of FIG. 8 includes a map frame 806, a command bar 808, a thumbnail overview map 810, a map legend 812, and a zoom scale 814. In other examples, the browser frame 804 includes the map frame 806. In still other examples, the browser frame 804 includes the map frame 806 and a combination of one or more of the command bar 808, the thumbnail overview map 810, the map legend 812, and the zoom scale 814.

The map frame 806 displays a map image. The map image may include spatial data and/or CAM data, such as feature data. One or more point features may be selected within the map frame 806 to cause generation of additional map displays or generation of other feature data. The map frame 806 provides image display and navigation capabilities for a map image, such as pan and zoom, based on input commands from an input device, such as a keyboard, a mouse, a touch pad, a pointer, or another device.

The command bar 808 includes function buttons that control the behavior of the map image display generated to the map frame 806 and what other components of the browser frame 804 are available. In one embodiment, the command bar 808 includes buttons for turning the map legend on and off, turning the overview map on and off, turning the layer list on or off, changing the unit of measurement for representing distance between miles and kilometers, and measuring distance on the map image display by selecting a point on a map and moving to another point on the map so that the distance measurement tool generates a straight line distance representation. The command bar 808 in this embodiment also includes a refresh button, a center map button to center the map where selected, a drag pan button, a zoom in button, a zoom out button, a print button, and a lasso button.

The drag pan button enables a user to drag the map in the map frame in a selected direction, such as such as left, right, up, down, or diagonally, to scroll the visible map in the map frame in the selected direction. In one example, a user may use a mouse or other input device to select the map, drag the map in a desired direction, and release the map upon reaching a desired location. The map then will regenerate with new spatial data and CAM data for the selected geographic area. The drag pan button may be used with an input device, such as a mouse, a pointer, a touch pad, a keyboard, or another input device.

The lasso button enables a user to draw a circle, a square, or another shape or designation around an area or to otherwise mark a location on the map using a mouse, a touch pad, another pointer, or another input device. In one embodiment, the lasso button enables a user to select an area using a circle or square. The selected area may be used for another operation or further action, such as a search, a zoom, identifying feature data within the selected lasso area for a query or report, or another operation.

The thumbnail overview map 810 displays a smaller version of the map image display zoomed out so that the user can visually identify the approximate location of the map image display relative to other spatial features. In one example, the overview map 810 displays a map area of a selected county relative to several surrounding counties.

The map legend 812 identifies the spatial layers that currently are visible on the map image display. The map legend 812 also may depict colors, shading, symbols, or other feature designations for selected layers, features, or other data that is displayed.

The zoom scale 814 enables a user to zoom the map image display area in or out relative to the current map image display area. The current relative zoom level may be indicated by a color or shape, such as an arrow, a square, a dot, or a circle, on the zoom scale or in another manner. The user may select a location on the zoom scale 814 to zoom in or out.

The user interface 802 also includes a tools frame 816. In one embodiment, the tools frame 816 includes a search tool 818 to enable an input for a query for a search, a filter tool 820 to enable an input for a query for a filter, and a view tool 822 to view an item selected from the viewed tool.

One or more search tools and one or more filter tools may be used for a single query. A search is a query that is executed each time a user selects a search tool and selects a "Search." This results in the execution of the search tool's query with the results being displayed as map data, such as a map image, and as other feature data, such as in tabular form. A filter tool 820 operates similar to a search tool 818 when it is applied. However, unlike the search tool 818, a filter stays in force during the execution of other operations until it is removed. In one example, a search tool 818 and a filter tool 820 both locate audience members of a specific type, such as public officials. In this example, when either the search tool 818 or the filter tool 820 is used, a map identifying a set of audience members that match the search criteria is generated for display in the map frame 806. Also, a list of the feature data associated with the located audience members is displayed. However, when the filter is enabled, the user can pan the map or perform other search operations or other filter operations, and a map image and feature data corresponding to the filter limitation still is generated.

The tools frame 816 also may include a tools utility 824 and a layers utility 826 to enable toggling between selections of tools and layers. Layers may be selected for spatial data and CAM data.

The tools frame 816 also may include a documents utility 828 that enables a user to display documents that are associated to feature data or spatial data. In one example, when the documents utility 828 is selected, a screen is displayed that enables the user to select an audience member and/or one or more CAM or spatial feature data attributes or other audience feature data to which the document will be associated, including other document data, map data, or other data, and to associate the document to the selected feature. Once associated, the document can be displayed with the feature data and displayed when the feature data is selected, displayed when a link, icon, or other selection is selected, or displayed in another fashion.

In one example, the user also may select whether a link, icon, or other display method will be used to display the document to the user. In another example, the user may associate the document directly to a feature or a feature attribute, such as a contact name displayed in a table, so that when the user selects that displayed feature or feature attribute, the document is displayed. In another example, linked documents are indexed so that they may be searched using a search query.

In one embodiment, when the documents utility 828 is selected, a document tree structure is displayed that enables a user to access and view CAP document data, including copies of documents. In one example, document identifiers, such as document names, are generated for display. A user may select the document identifier, and in response, the document is generated for display. In one example, the documents utility 828 enables a user to view program summary and audit documents.

The tools frame 816 also may include a bookmarks utility 830 that enables a user to bookmark a favorite map location. In one example, when the bookmarks utility 830 is selected, a dialogue box is presented that enables the user to enter a desired name for the location identified by a map image in the map frame 806 and to save the map image as a favorite for future reference.

The tools frame 816 also may include an edit utility 832 that enables a user to edit audience data. In one example, when the edit utility 832 is selected, a screen is displayed that enables the user to edit contact information for the CAM system 102. In another example, when the edit utility 832 is selected and the user enters address or other location data for a contact, the CAM system 102 geocodes the location data for the audience member and associates the geocoded location data to a map image or other geographic data. The geocoded location data for a map image or other spatial data may be referred to herein as a point feature. In another example, when the edit utility 832 is selected, a screen is displayed that enables the user to edit other audience data.

The tools frame 816 also may include a help utility 834 that presents the user with on-line help. In one example, when the help utility 834 is selected, a user is presented with a content help screen from which the user can select help topics of choice.

An exit utility 836 enables the user to exit a particular screen or tab, such as a journal entry or contact screen. Alternately, the exit utility 836 enables a user to exit the application.

A user account utility 838 enables the user to modify user contact information or to change user password information. When the user account utility 838 is selected, the user is prompted to modify or add entries to audience information, journal information, password information, or other user information. The user account utility 838 is optional.

The tool input frame 840 enables a user to input query data. The query may be performed on spatial data and/or CAM data. The spatial data may be organized in a spatial layer and include, for example, an address, a street, a county, a city, a state, or another spatial identification or designation. The data for the query may include, for example, a SIC code, an audience type, a FIPS code, a journal type entry, statistical selection data, an audience member, a phone number, an address, a county, a city, a state, a zip code, a cross street, or other data applicable to the application in which the tool input frame 840 is located.

The user interface 802 also includes a feature display frame 842 in which the feature data is provided. Data may be displayed in the feature display frame 842 as feature attribute data, such as tabular information, text data, document data, image data, or other data. The feature data generally is displayed in the feature display frame 842 in response to a query or a selection of spatial data or CAM data in the map frame 806.

The feature display frame 842 of FIG. 8 includes utilities for selected features 844, linked features 846, and linked documents 848. The selected features utility 844 displays the attribute data of features that match queries. The linked features utility 846 displays the attribute data for the linked features of linked datasets. The linked documents utility 848 enables selection of documents that are linked to selected features, including word processing documents, spreadsheet documents, images, HTML documents, PDF documents, images, email, regulatory documents, and other documents. In one embodiment, the linked features utility 846 and the linked documents utility 848 are not present because all linked data, including linked features and linked documents, is displayed in the selected features utility 844.

The feature display frame 842 also may include a journal management utility 850 that enables a user to insert, edit, or otherwise manage journal data. In one example, when the journal management utility 850 is selected, a screen is displayed that enables the user to insert new journal data for the CAM system 102. In another example, when the journal management utility 850 is selected and the user enters an address or other location data for an audience member, a CAP asset, or other location of interest, the CAM system 102 geocodes the location data and associates the geocoded location data to a map image or other spatial data. In another example, when the journal management utility 850 is selected, a screen is displayed that enables the user to insert other journal data.

The feature display frame 842 also may include an audience management utility 852 that enables a user to insert, edit, or otherwise manage audience data. In one example, when the audience management utility 852 is selected, a screen is displayed that enables the user to insert new audience information for the CAM system 102. In another example, when the audience management utility 852 is selected and the user enters an address or other location data, the CAM system 102 geocodes the location data and associates the geocoded location data to a map image or other spatial data. In another example, when the audience management utility 852 is selected, a screen is displayed that enables the user to insert other audience data.

In one embodiment, feature data 854 along with a menu icon 856 is generated for display in the feature display frame 842. One or more features, each with a menu icon 856, may be displayed to a user in response to a query or other operation. Each feature and menu icon 856 returned from the query or other operation can have a context sensitive menu associated with it. The context of the menu is based on the configuration of the tool or layer for which the operation is performed. The menu is context sensitive because the operations within the menu apply to the feature that is represented by the row of data.

In one embodiment, a features menu 858 in the feature display frame 842 includes a center on option 860, a zoom to option 862, a link document utility 864, a journal entry utility 866, and an audience utility 868. With the center on option 860, the user can center on an audience member within the map. With the zoom to option 862, the user can zoom the map into a close area around an audience member's address or other data. With the link document utility 864, a user can link a document to an audience member, a journal entry, or other data or otherwise manage document data. With the journal entry utility 866, a user can add, edit, or otherwise manage a journal entry for an audience member or other data. With the audience utility 864, a user can edit, add, or otherwise manage data for an audience member.

The CAM system 102 may be configured to limit access to any of the features, utilities, tabs, buttons, and/or menus based upon security settings for a particular user. The security settings may be controlled, for example, by a user's identification and password. In one embodiment, if a user is not authorized to perform a certain operation, such as edit audience members, the menu option or utility for that operation is not displayed to the user.

In one embodiment, the user interface 802 enables a user to geographically manage audience members. In one example, the user interface 802 includes a map or map data of a geographic area. The map or map data may include, for example, data indicating a location of a pipeline or other point of interest. In this example, a user enters a contact name and/or address or other location, and the spatial processing system 104 identifies a geocode for the location, such as by identifying the latitude and longitude of the location. The spatial processing system 104 associates the geocoded location to a map. As a result, the audience member is identified on the map of the geographic area or is otherwise associated with the map data for that geographic area. In this example, the audience data is displayed on a map of a geographic area within a buffer area of a pipeline and other audience data within the geographic area also is displayed. A centerline-type interest area, a buffer area, a point feature for the selected audience member, and point features for other audience members within the geographic area are all displayed on the map.

The user may search information for the audience member and display that information or other information for the audience member on the map. The user also may search the audience information in the database, such as related documents, spreadsheet information, or other information and identify and display the resulting information.

The user interface 802 and the spatial processing system 104 also can be configured to identify and generate other geocodes based on a search criteria, such as a location identifier that designates a geographic location. Examples of other location identifiers are latitude and longitude coordinates, north, south, east, west, up, down, left, right, vertical and horizontal coordinates, North American data (NAD) 27, NAD 83, axial coordinates, other ordinate systems, positioning indicators, and mark identifiers.

In another example, the user enters data for a contact. This may be done when the contact is entered or when editing the contact data. Contact data is data identifying different features or aspects of the contact and may be stored in a contact record. In this example, contact data includes a company name, a contact name, a contact type, such as an emergency official, a public official, police, a resident, an excavator, a business, an affected public, or other, an address, a city, a county, a phone number, a fax number, a region, a line identification (ID), one or more SIC codes, and one or more journal entries.

In another embodiment, the user links documents interactively to or with audience data. The audience data is in one or more audience records. In one example, the spatial processing system 104 renders a map and the audience data. The user sends a letter to the audience. The user links the letter to the audience record. When the audience record is displayed or otherwise retrieved, the linked document also is retrieved and identified with a link, an icon, or another method. The user can select the link, icon, or other method to display the linked document. In another example, the user links other audience data to the audience record. The link to the other audience data is displayed when the audience record is displayed. In another example, the user links the document directly to feature data. When the feature data is displayed, the user selects the feature data, and the document is displayed.

In another embodiment, the system includes a journal utility. The journal utility is used to enter or edit a journal entry. In one example, a journal entry includes data from a journal log file. In another example, a journal entry identifies when a change is made to a contact or contact record and which user made the change and enables the user to add a comment specifying why the change was made. A comment can be any note, remark, or other statement the user enters. In another example, the spatial processing system 104 automatically creates a journal entry when an audience record is inserted, edited, or deleted. In this example, the journal entry contains a user identifier, the action taken (i.e. insertion, edit, or deletion), the date the action is taken, and a user comment. In another example, a user selects a new journal entry and adds comments for the new journal entry. In another example, a user selects an existing journal entry and edits the existing journal entry. In another example, a user deletes a journal entry.

In one embodiment, a user interface 802 enables users to insert new contacts or other audience data. In one example, new contact data is entered, including an address or other location data. The spatial processing system 104 interactively and automatically geocodes the address or other location information for the new contact before saving the data. In another example, the spatial processing system 104 saves the geocode with the contact data in a contact record.

In another embodiment, the user interface 802 enables users to edit or otherwise modify the audience data. In one example, a table, a graphic, or another interface of audience data is displayed to the user. The table or graphic has an "edit" button or other selection. The user selects the edit button from the table or graphic. An audience maintenance screen then is displayed to the user and enables the user to modify the audience data. In another example, after the user edits the audience data for an audience record, and the audience record contains an address or other location data, the spatial processing system 104 automatically re-geocodes the address or other location data before saving the audience record with the geocode.

FIGS. 9-36 illustrate exemplary embodiments of user screen views for a user interface in accordance with an embodiment of the present invention. The exemplary screen views depict a user interface for an application used with a CAM system. Other screens or user interfaces may be used.

In the embodiment of FIGS. 9-36, the user screens include a browser frame in which a map frame is generated. The map frame optionally may include a command bar, overview map, a map legend, and a zoom scale. The user screens also may include a tools frame that enables a user to select one or more search tools, filter tools, and/or view tools. A tool input frame also may be provided. In some examples of the user screens, the tool input frame or the map frame is collapsed.

The user screens also may include a feature display frame. The feature display frame displays, and enables selection of, selected features, linked features, and linked documents. In some embodiments, the feature display frame is collapsed. Other features are depicted by the examples and the user interface screens in FIGS. 9-36.

Figure 9:
FIGS. 9-36 are screen views of a user interface used with a CAM system in accordance with an embodiment of the present invention.

FIG. 9 depicts an exemplary embodiment of the login screen. A user enters a user name and password to gain access to the CAP data.

Figure 10:
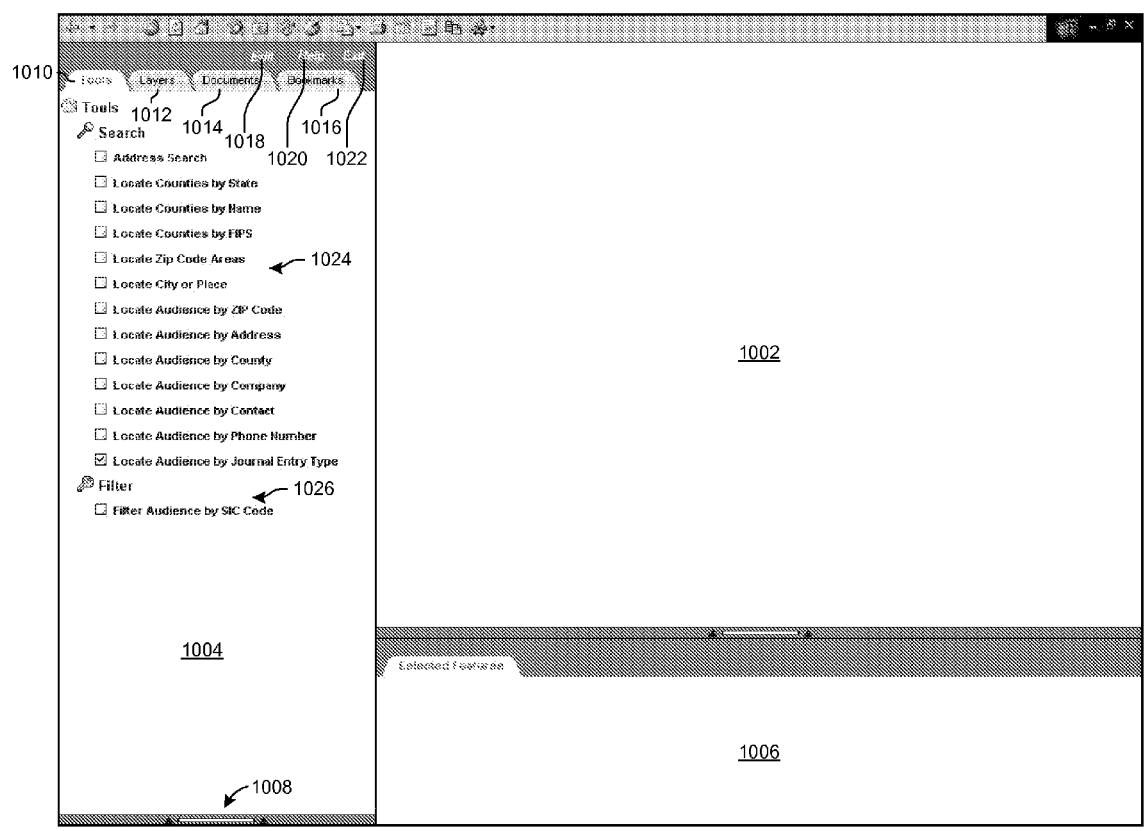

FIG. 10 depicts an exemplary embodiment of a user screen generated for display after a user logs into the login screen. In this embodiment, the CAP is a pipeline CAP, and the spatial processing system manages pipeline related CAP data, including asset data, audience data, journal data, and document data. In one embodiment, each user has access to pipeline related data based on the user's security profile.

The user screen of FIG. 10 includes a map frame 1002, a tools frame 1004, and a feature display frame 1006. The tool input frame 1008 is collapsed in this view.

The tools frame 1004 includes a tools utility 1010, a layers utility 1012, a documents utility 1014, and a bookmarks utility 1016. The tools frame also includes an edit utility 1018, a help utility 1020, and an exit utility 1022.

The feature display frame 1006 displays feature data, including attributes, from one or more layers. The feature data can be displayed in the form of text, images, graphics, documents, linked data, and/or other data.

The tools utility 1010 includes one or more search tools 1024 and one or more filter tools 1026. Greater or fewer search tools 1024 may be included, and greater or fewer filter tools 1026 maybe included.

It will be appreciated that feature data is generated for display in the map frame 1002 and/or the feature display frame 1006. The feature data matches one or more queries or is linked data from one or more queries. The feature data generated for display in the map frame 1002 includes geospatial data and/or CAM data. The feature data generated for display in the feature display frame generally includes CAM data or linked CAM data, including document data. Although, geospatial data is generated to the feature display frame 1006 in some instances.

Figure 11:
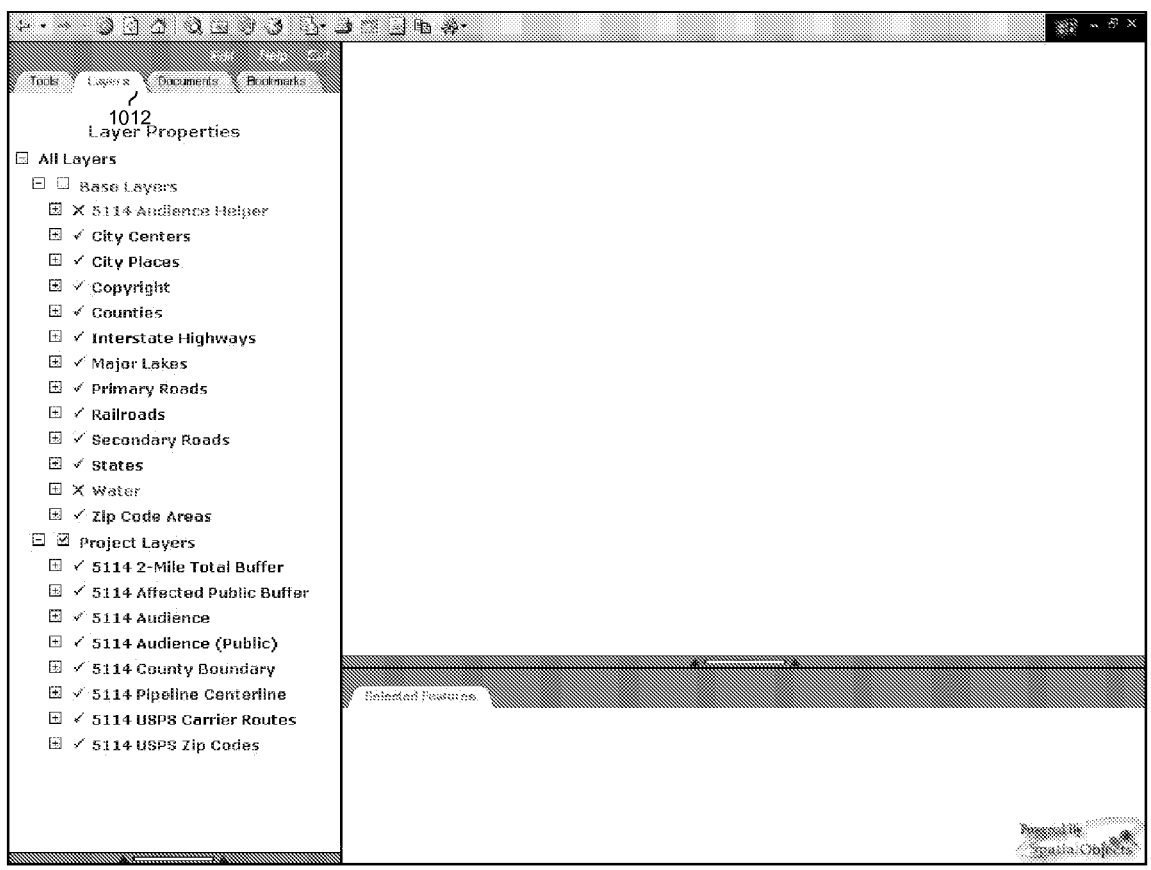

FIG. 11 depicts an exemplary embodiment of a layers utility 1012. When a user selects the layers utility 1012, the available base layers and project layers are generated for display. Base layers are geospatial layers and/or CAM data layers associated with and selectable from all projects, such as roads, highways, rivers, states, counties, cities, and places. Project layers are geospatial layers and CAM data layers associated with and selectable from a selected project for a selected CAP, such as pipeline centerline or other interest area, a project two mile buffer area, a project total buffer area, and a project audience. In one embodiment, each user has access to project layers based on the user's security profile.

Figure 12:
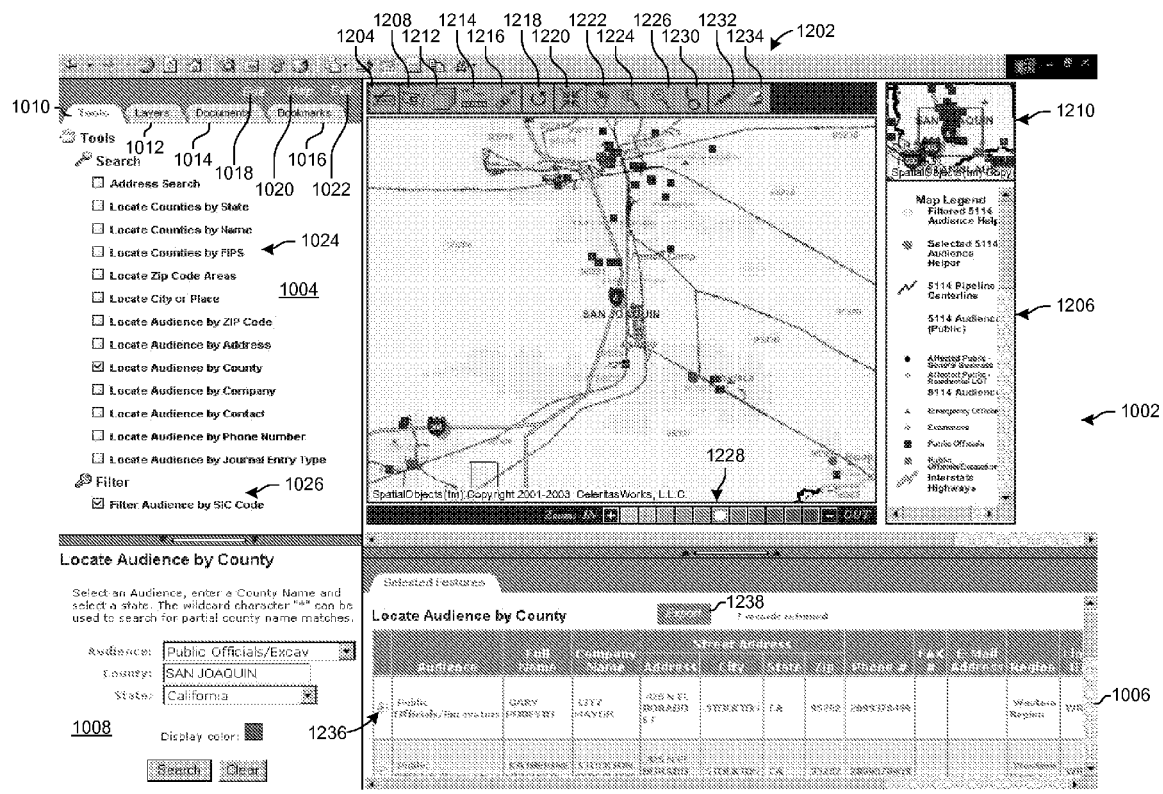

FIG. 12 depicts an exemplary embodiment of a user screen in which the tool input frame 1008 is not collapsed. In this embodiment, a locate audience by county search tool is selected, a filter audience by SIC code filter is selected, and the associated entries for the tool input frame 1008 are displayed. The user may enter search parameters of a search criteria for an audience type, a county name, and/or a state name. The user selects the display color used to identify feature data that matches the search criteria on a resulting map image. As used herein, search criteria includes query criteria entered by a user in the search entry boxes, drop down boxes, or other entry for a search tool and/or filter tool. Once the user enters the search parameters, the user may select the "search" button. The user may clear the search parameters by selecting the "clear" button.

The user screen of FIG. 12 also includes a command tool bar 1202. The command tool bar 1202 includes a legend toggle 1204 that enables a user to turn a legend 1206 on or off. The map legend 1206 identifies the data layers that currently are visible on the map image in the map frame 1002. The map legend 1206 also designates unique color identifiers, shade identifiers, pattern identifiers, and/or symbols for selected layers or features in some embodiments.

An overview map button 1208 enables a user to turn the overview map 1210 on or off. The overview map 1210 displays a smaller version of the map image from the map frame 1002. The overview map 1210 is zoomed out so that the user can visually identify the approximate location of the map image displayed in the map frame 1002 relative to other spatial features. The overview map 1210 also may be referred to as a thumbnail map.

A display layer list button 1212 enables a user to turn the layer list in the layers utility 1012 on or off. The set map units button 1214 enables a user to set the map units for the map displayed in the map frame 1002 to feet, miles, or meters. The measured distance button 1216 measures distances between two points on the map. The refresh map button 1218 requests the current map to be redisplayed. The center map button 1220 centers the map based on a point selected on the map.

A drag pan button 1222 enables a user to drag the map in the map frame 1002 in a selected direction, such as left, right, up, down, or diagonally, to scroll the visible map in the map frame in a desired direction. In one example, a user may use a mouse, a touch pad, or other pointer or input device to select the map, drag the map in a desired direction, and release the map upon reaching a desired location. The map then will regenerate with new geospatial data and feature data for the selected geographic area.

A zoom in button 1224 enables a user to zoom in at a selected point on the map for a selected zoom level and center the new map data at the selected point. A zoom out button 1226 enables a user to zoom out at a selected point on the map for a selected zoom level and center the new map data at the selected point.

A zoom scale 1228 enables a user to zoom the map image display area in or out at various zoom levels relative to the current map image display in the map frame 1002. The user can select a location on the zoom scale 1228 to zoom in or out.

A lasso button 1230 enables a user to mark a location on the map using a mouse, a touch pad, or other pointer or input device. In one embodiment, the lasso button 1230 enables a user to select an area using a circle or square. The selected area may be used for another operation, such as a zoom, identifying feature data within the selected lasso area for a query or report, or another operation.

A draw button 1232 performs an operation similar to the lasso. However, the draw button 1232 enables the user to draw an irregular shape area upon which further action will be taken. A print button 1234 enables a user to print the map frame and/or the feature data.

In the embodiment of FIG. 12, feature data matching the query is displayed in the feature display frame 1006, such as in a tabular form or another form. Additionally, a menu icon 1236 is displayed for each row of feature data. In this embodiment, the row of data with "public officials/excavators" and "Gary Podesto" is an example of a feature, and "full name," "company name," and "address" are examples of attributes. If the user selects the menu icon 1236, a features menu (see FIG. 13) is displayed to the user. In the embodiment of FIG. 12, each feature is displayed in a separate row, and each feature has an associated menu icon.

In this embodiment, the feature display frame 1006 also includes an export button 1238. When the export button 1238 is selected, the feature data displayed in the feature display frame 1006 is generated to a file having a selected file type, such as a spreadsheet, a word processing file, a PDF file, an image file, or another file type.

Figure 13:
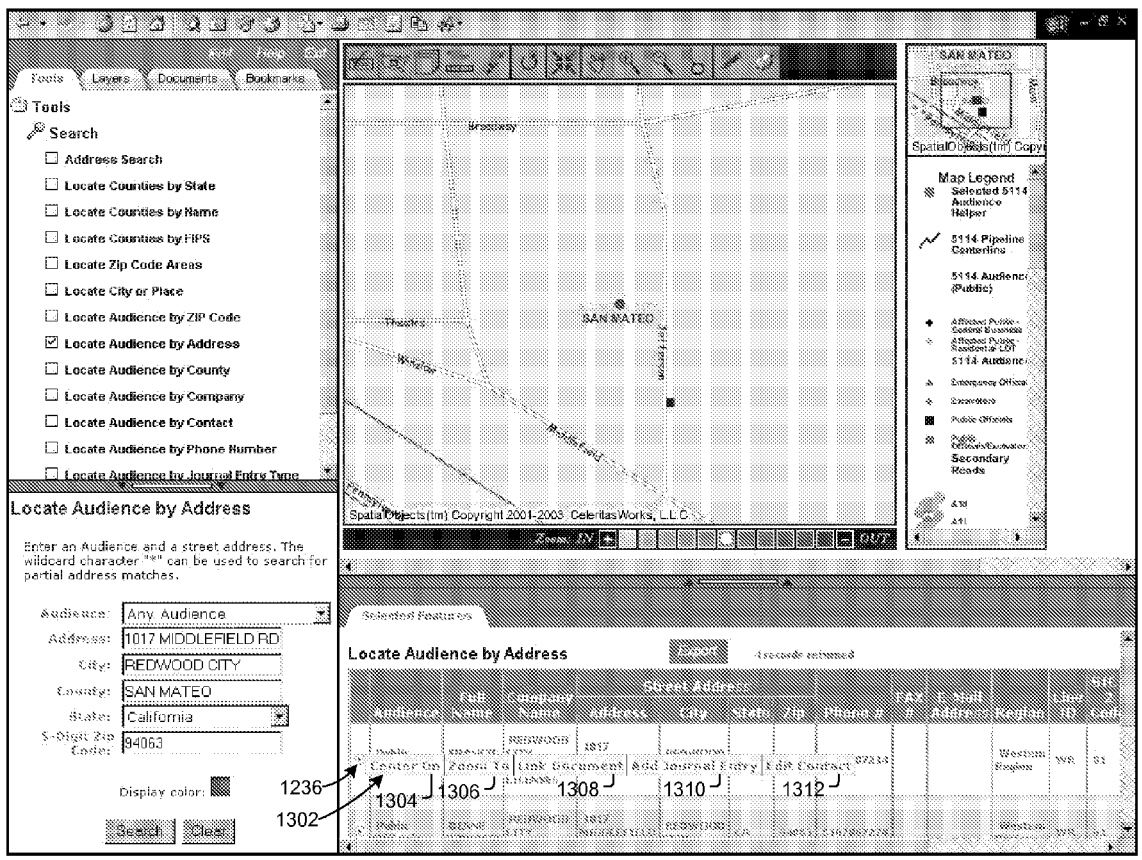

FIG. 13 depicts an exemplary embodiment of a features menu 1302 generated for display when the user selects the menu icon 1236, such as by placing a mouse or other pointer over the menu icon and/or selecting the entry. The features menu 1302 enables a user to perform selected functions on the feature data.

In the embodiment of FIG. 13, the features menu 1302 includes a center on option 1304, a zoom to option 1306, a link document utility 1308, an add journal entry utility 1310, and an edit contact utility 1312. With the center on option 1304, the user can center on the contact within the map. With the zoom to option 1306, the user can zoom the map into a close area around a contact's address or other feature data. With the link document utility 1308, a user can link a document to a contact, a journal entry, a CAP asset, or other feature data or otherwise manage document data. With the add journal entry utility 1310, a user can add, edit, or otherwise manage a journal entry for a contact, a transaction, an asset, or other feature data. With the edit contact utility 1312, a user can edit, add, or otherwise manage audience data for a contact.

Figure 14:
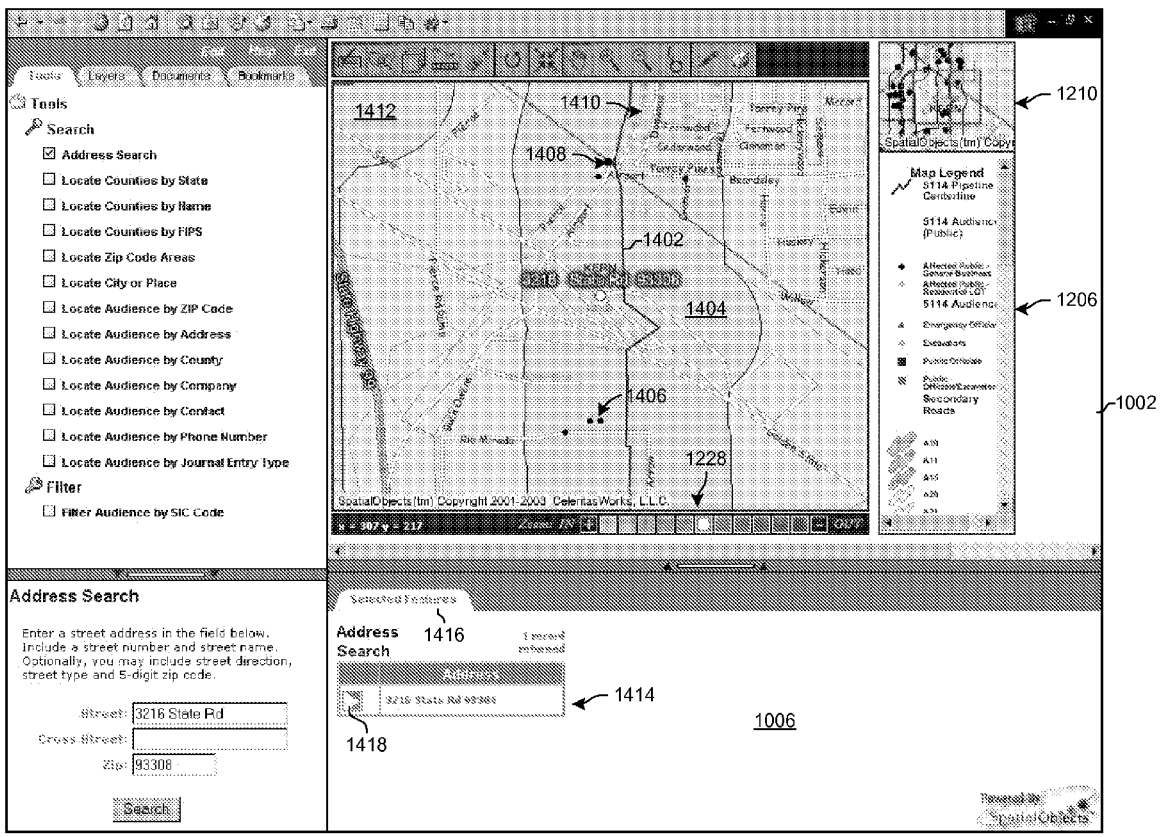

FIG. 14 depicts an exemplary embodiment of a user screen in which an address search tool is used. The address search enables a user to locate one or more desired audience records having a selected address. In the embodiment of FIG. 14, a user selects a search tool for an address search in the tools frame 1004, enters the search criteria in the tool input frame 1008, and selects the "search" button. After the user selects the search button, the spatial management system geocodes the address search criteria and locates the geocoded address.

If the address is located, the geospatial data and the feature data matching the search criteria are generated for display as a map in the map frame 1002. This matching feature data includes data from the disparate CAM datasets that were spatially linked to the spatial layers, and the geospatial data includes data within a selected range from the address entered as the search criteria.

In this example, the located address is highlighted and centered on the map. The geospatial data may be manipulated using the command toolbar 1202 or the zoom scale 1228. If the geocoded address is not located, an error message is displayed, and a new search criteria may be entered.

In the example of FIG. 14, the geospatial data on the map identifies, example, a geographic area, streets, a highway, and other geospatial data. The CAM feature data on the map identifies a centerline 1402 for a pipeline and a buffer area 1404 for the pipeline. The CAM feature data on the map also identifies audience members relative to the centerline 1402 and the buffer area 1404. The audience members include an affected public-general business audience member 1406, an excavator audience member 1408, and an affected public-residential lot 1410. Other audience members, including contacts, are identified in the map. The centerline 1402, the buffer area 1404, and the audience members 1406-1410 each are color coded, gray shaded, and/or identified by symbols. The map legend 1206 identifies the color, gray shade, and/or symbol corresponding to the feature data on the map.

The map also identifies a second buffer area 1412. The centerline for the second buffer area 1412 is not visible on the map in the map frame 1002. However, the centerline for the second buffer area 1412, the complete width of the second buffer area, and audience members relative to the second buffer area are identified in the thumbnail overview map 1210.

The feature data 1414 matching the search criteria query also is generated for display in the feature display frame 1006. The feature data 1414 is displayed in a selected features utility 1416. A menu icon 1418 may be selected to generate a features menu (not shown) or other data.

Figure 15:
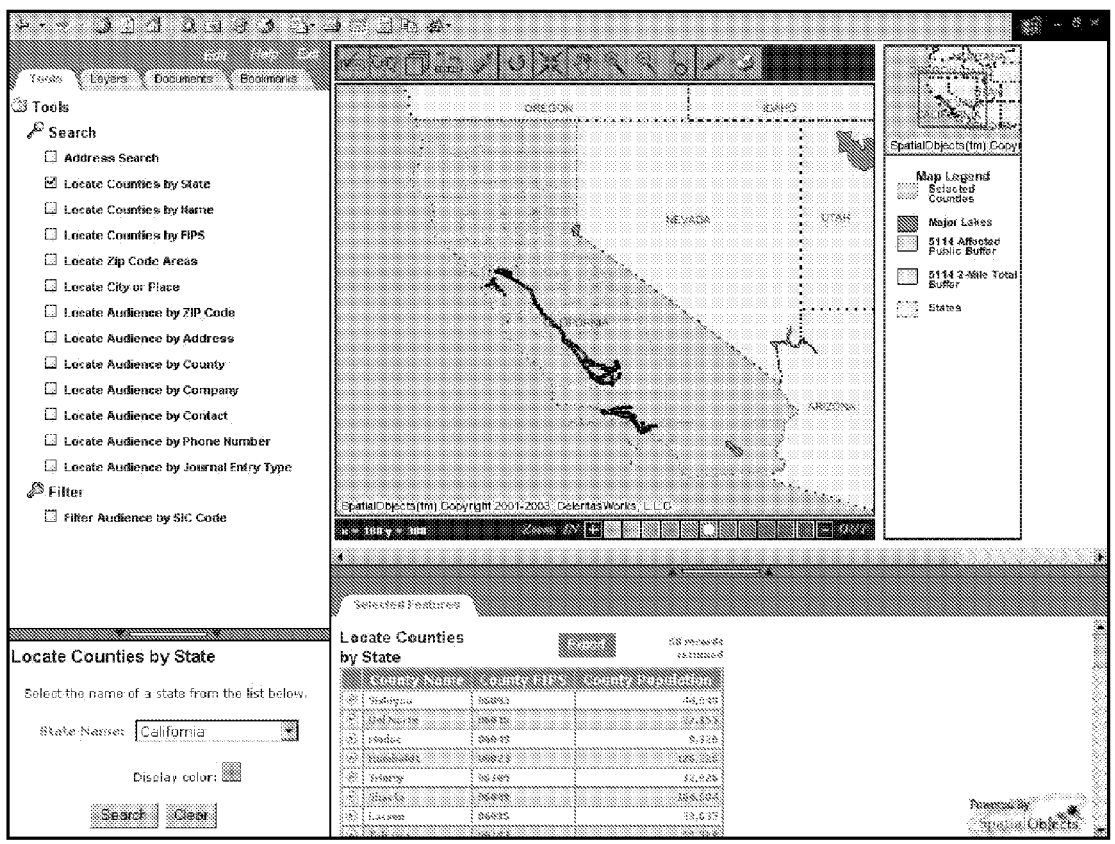

FIG. 15 depicts an exemplary embodiment of a search tool for locating a county by state name. The user selects the search tool to locate a county by state name, and selects the state from the drop down box in the tool input frame 1008. The display color used to identify the matching feature data on the map image may be selected in the tool input frame 1008. If the matching feature data is located, a map image with the spatial data and the feature data from the CAM datasets matching the search criteria is generated for display in the map frame 1002. The matching feature data includes data from the disparate CAM datasets that were spatially linked to the spatial layers.

In this example, the state is the search criteria, and it is centered and highlighted in the selected display color. The CAP assets in the selected search criteria are shown in the map image. In this example, multiple pipelines are shown as the CAP assets in the map image.

The feature data matching the selected search criteria are generated for display in the feature display frame 1006. In this example, all of the counties within the state of California are generated in a tabular form with the corresponding feature data attributes. In this example, the corresponding feature data attributes include a county name, a FIPS code, and population for each county. If the search is not successful, an error message is displayed, and a new search criteria may be entered.

Figure 16:
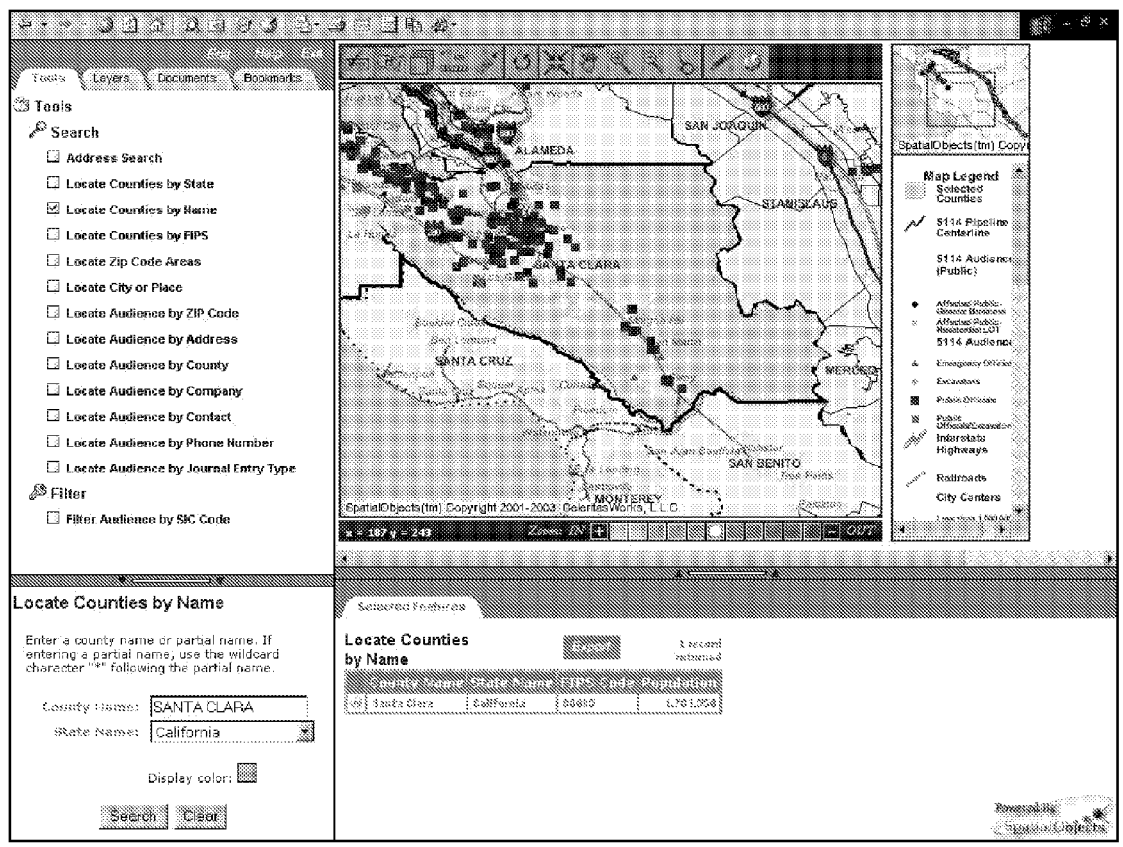

FIG. 16 depicts an exemplary embodiment of a search tool for locating a county by name. The user selects the search tool for the locate counties by name and enters the county name in the tool input frame 1008. The display color used to identify matching feature data on the map image also may be selected in the tool input frame 1008.

The user selects the search button to initiate the search. If the search is successful, a map image is generated for display with the county centered and highlighted in the map frame 1002. If the search is not successful, an error message is displayed, and a new search criteria may be entered.

Figure 17:
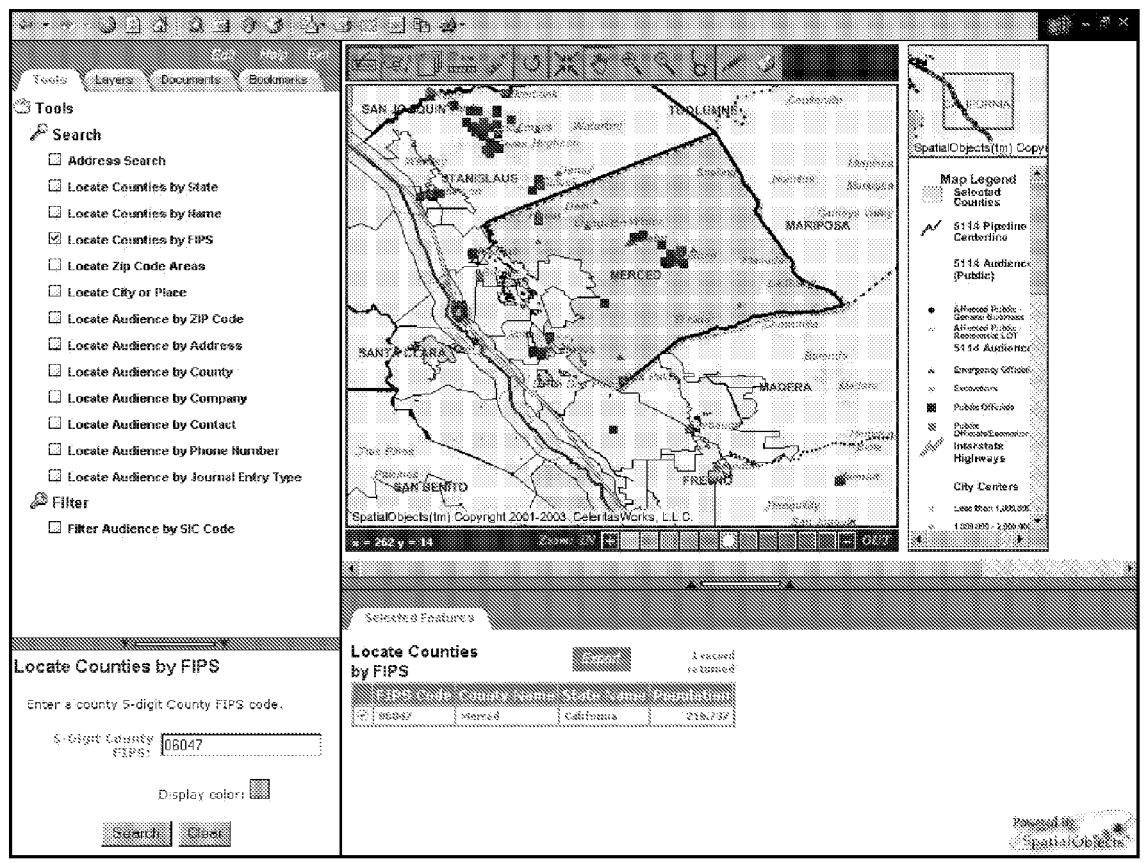

FIG. 17 depicts an exemplary embodiment of a search tool for locating counties by a FIPS code. The user selects the search tool for locating a county by FIPS code enters the five digit FIPS code in the tool input frame 1008. The display color identifying matching feature data on the map image also may be selected in the tool input frame 1008. If the FMS code is located, a map image is generated for display with the matching area centered and highlighted. If the FIPS code is not located, an error message is displayed, and a new search criteria maybe entered. The feature data corresponding to the FIPS code is generated for display in the feature display frame 1006.

Figure 18:
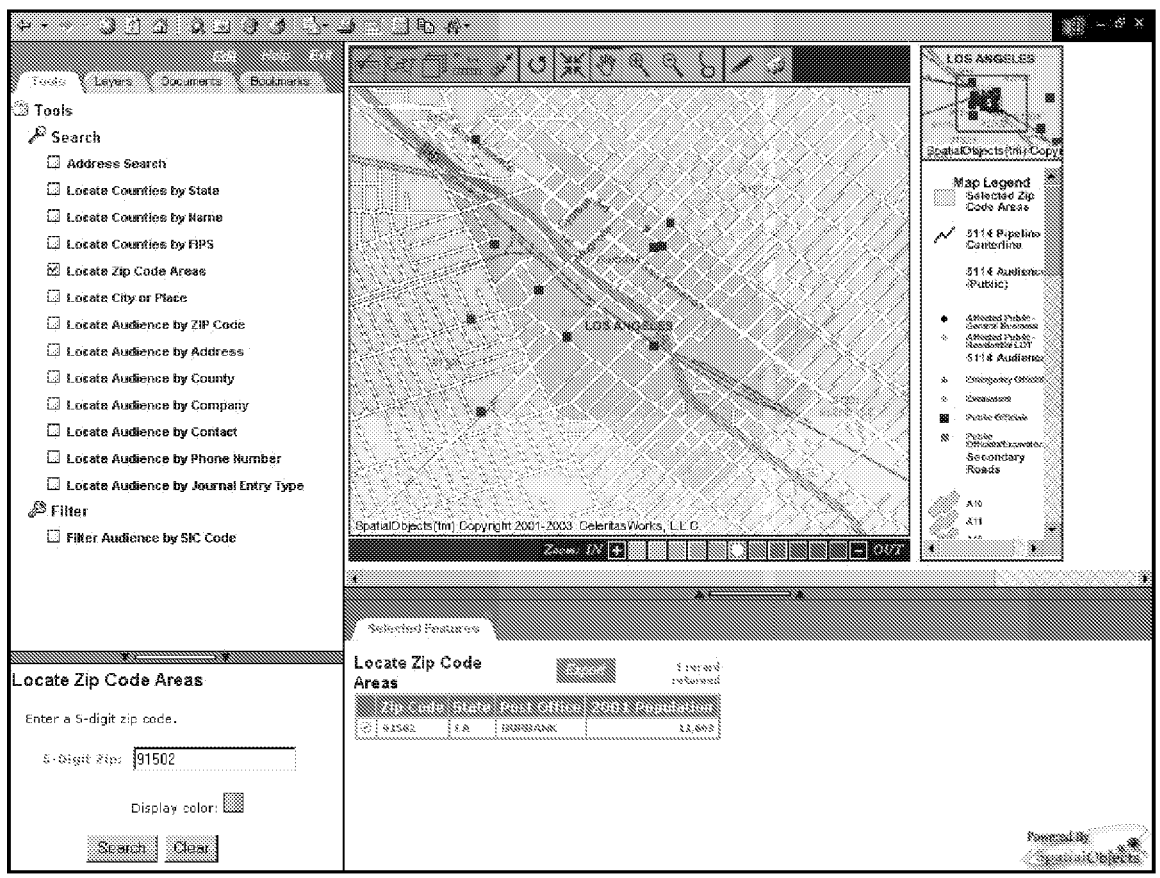

FIG. 18 depicts an exemplary embodiment of a search tool for locating a zip code area. The user selects the search tool for locating a zip code area and enters a zip code in the tool input frame 1008. The display color used to identify the matching feature data on the map image also may be selected in the tool input frame 1008. If the zip code is located, the map image is generated for display with the zip code area centered and highlighted. If the zip code is not located, an error message is displayed, and a new search criteria may be entered. The feature data corresponding to the zip code is generated for display in the feature display frame 1006.

Figure 19:
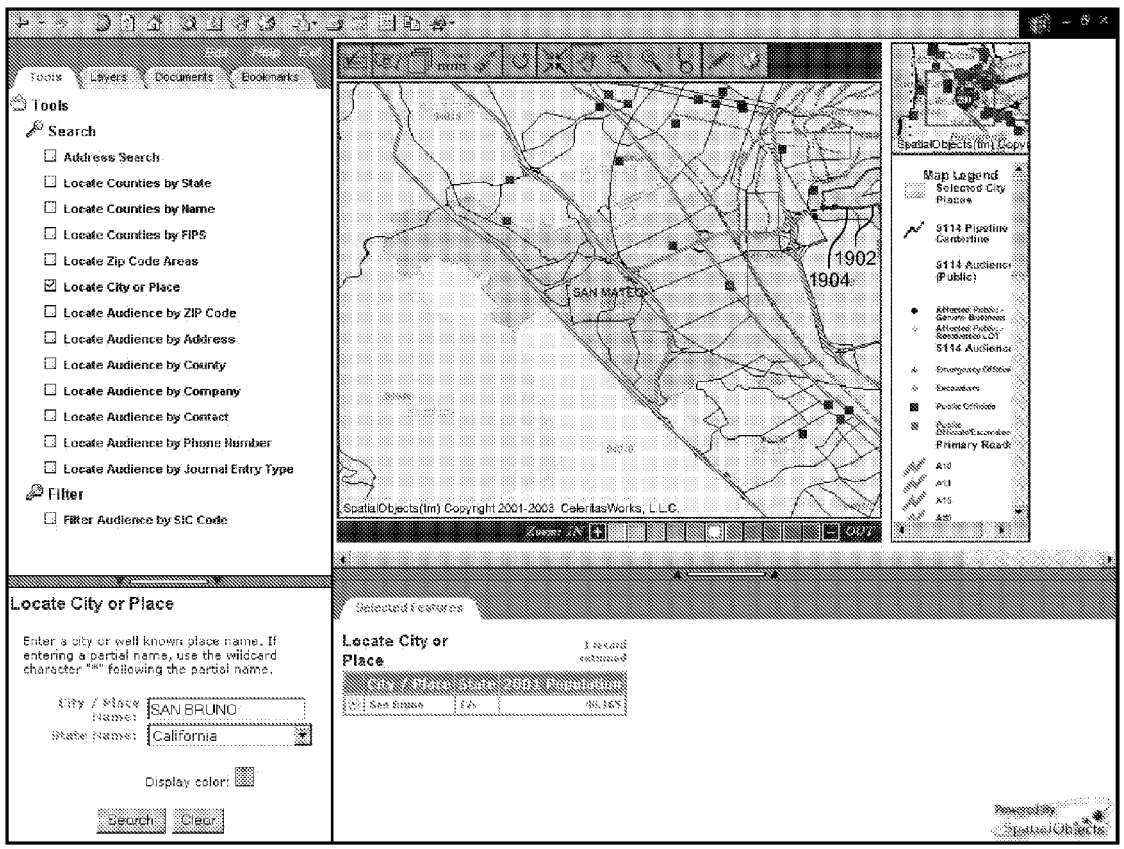

FIG. 19 depicts an exemplary embodiment of a search tool for locating a city or place. The user selects a search tool for locating a city or place and enters a city or place name and/or a state name in the tool input frame 1008. The display color identifying matching feature data on the map image also may be selected in the tool input frame 1008. If the search is successful, a map image is generated with the city or place centered and highlighted. If the city or place is not located, an error message is displayed, and a new search criteria may be entered.

In the example of FIG. 19, a pipeline centerline 1902 and its buffer area 1904 are identified as feature data on the map image. Multiple audience members also are identified on the map image as feature data, including public officials, emergency officials, and affected public-general business. Each of the audience members are identified by a different color code and/or shape. In the example of FIG. 19, each of the different audience members are identified by a unique (different) color and symbol.

The feature data corresponding to the search criteria is generated for display in the feature display frame 1006. In the example of FIG. 19, the search criteria was San Bruno, California, and the corresponding feature data includes the state name and the 2001 population.

Figure 20:
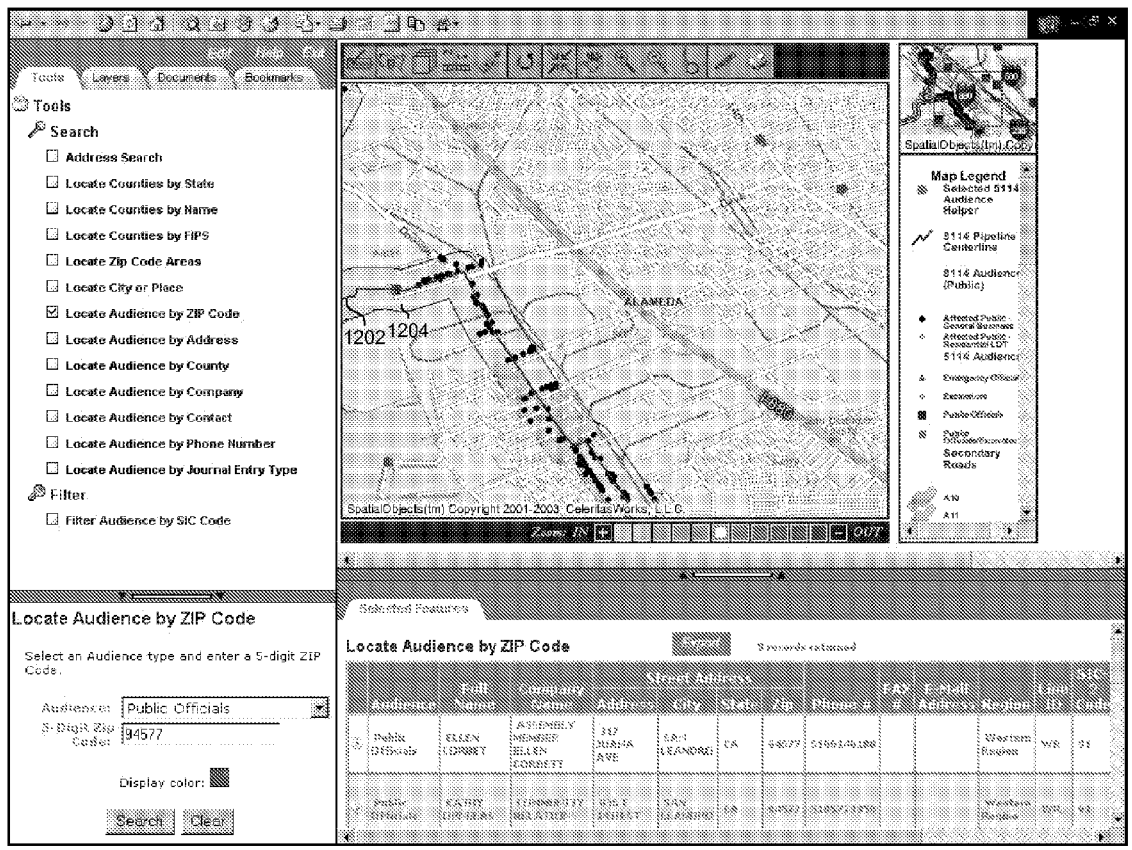

FIG. 20 depicts an exemplary embodiment of a search tool for locating an audience by zip code. The user selects the search tool for locate audience by zip code and enters an audience type and a zip code in the tool input frame 1008. The display color identifying matching feature data on the map image also may be selected in the tool input frame 1008. If the search is successful, a map image is generated, and the audience members matching the search criteria are highlighted on the map image. Other audience members not meeting the audience type search criteria but within a selected range of the zip code search criteria also are indicated on the map image. The map legend 1206 identifies the audience members meeting such criteria with a unique symbol and color. The other audience members within the range of the search area also are identified on the map legend 1206 by a unique color and symbol. In the example of FIG. 20, a pipeline centerline 1202 and a pipeline buffer area 1204 also are indicated on the map image.

The feature data matching the search criteria is generated for display in the feature display frame 1006. In the example of FIG. 20, the feature data includes audience records that meet the search criteria. If no records matching the search criteria are located, an error message is displayed, and a new search criteria may be entered in the tool input frame 1008.

Figure 21:
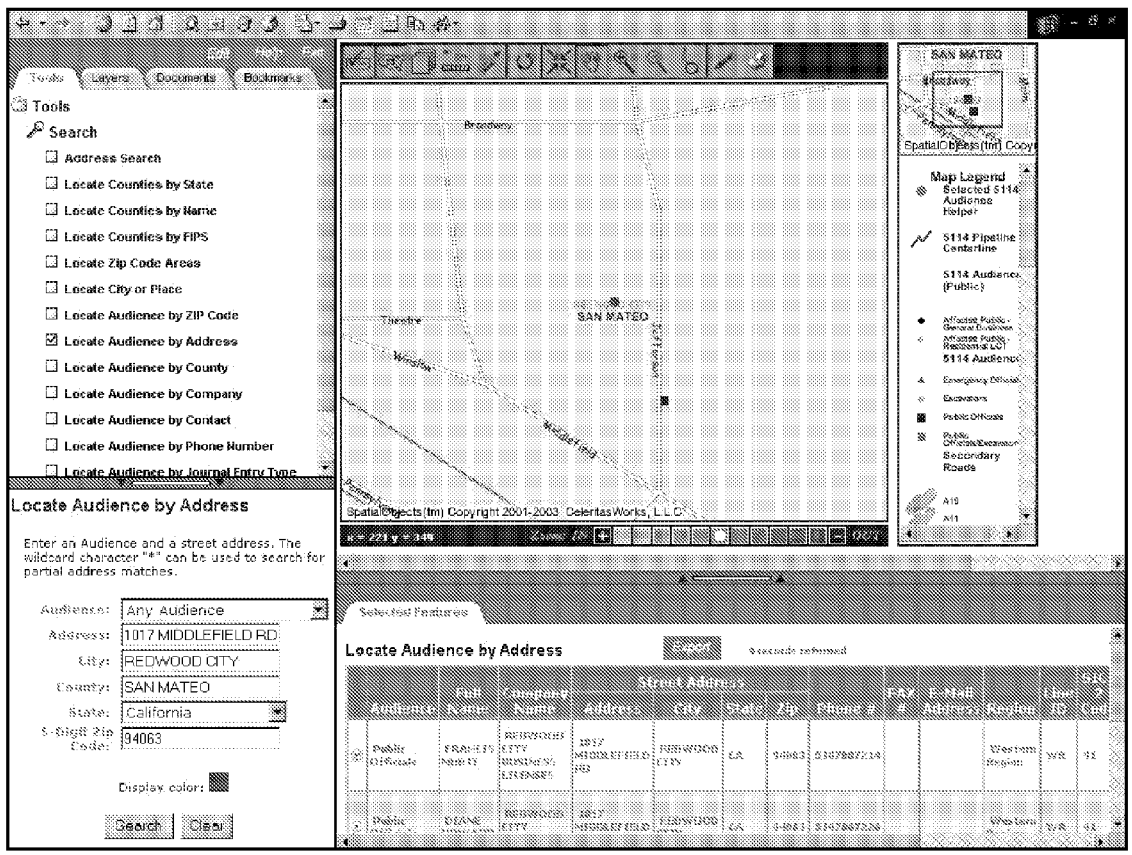

FIG. 21 depicts an exemplary embodiment of a search tool for locating an audience by address. The user selects the search tool to locate an audience by address, enters a street address, city, county, state, and/or zip code, and selects an audience type from the audience drop down list. The display color identifying matching feature data on the map image also may be selected in the tool input frame 1008. The user then selects the search button.

If the search is successful and feature data matching the search criteria is located, a map image is generated for display, and the feature data matching the search criteria are highlighted and centered. In this example, audience records are the feature data. The audience records that match the search criteria are designated by a unique symbol and/or color on the map image and the map legend. The other audience types and audience members each are designated by a different unique color and symbol.

The audience records that match the search criteria also are generated for display in the feature display frame 1006. If a match is not identified for the search criteria, an error message is displayed, and a new search criteria may be entered.

Figure 22:
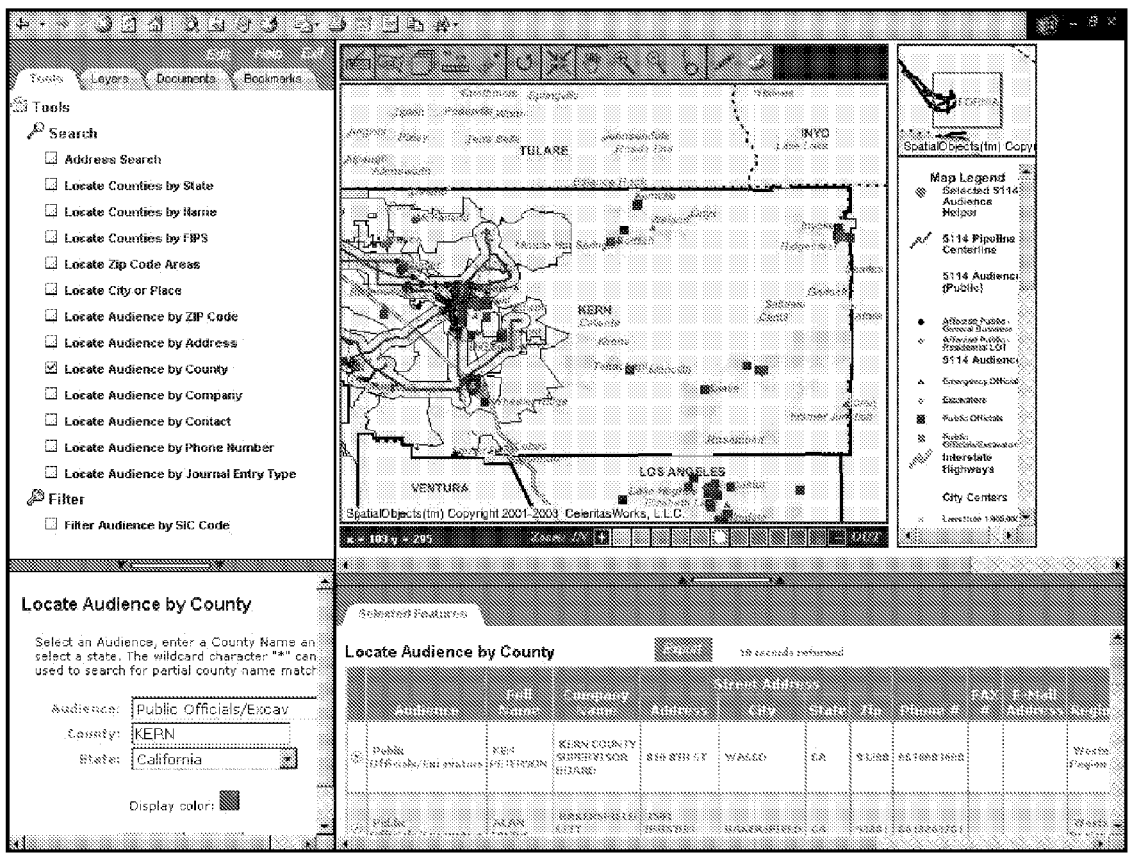

FIG. 22 depicts an exemplary embodiment of a search tool for locating an audience by county. The user selects the search tool for locate audience by county, enters a county name and state name, and selects an audience type from the drop down list. The display color identifying matching feature data on the map image also may be selected in the tool input frame 1008.

If a match is found for the search criteria, a map image is generated for display with the audience records highlighted. The display color for the resulting feature data is selected and identified in the tool input frame 1008. The feature data matching the search criteria is generated for display in the feature display frame 1006. If no feature data matching the search criteria is found, an error message is displayed, and a new search criteria may be entered.

Figure 23:
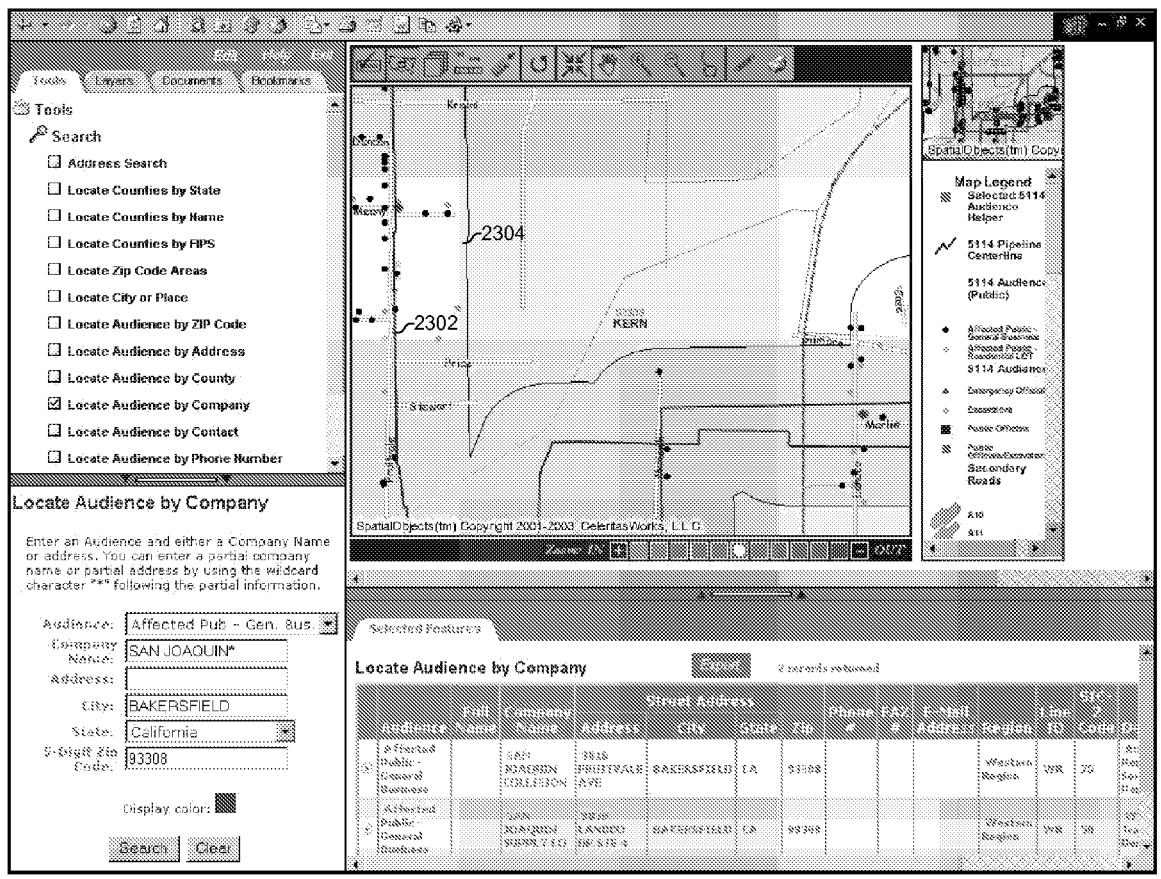

FIG. 23 depicts an exemplary embodiment of a search tool for locating an audience by company. The user selects a search tool for locating an audience by company. The user enters a company name and, if desirable, address information. The user selects an audience type from the audience drop down list. The display color identifying matching feature data on the map image also may be selected in the tool input frame 1008.

If feature data matching the search criteria is located, a map image is generated for display with the audience records highlighted based upon the selected display color. In the embodiment of FIG. 23, the audience members matching the search criteria are generated for display with a unique color and/or symbol. Additionally, a centerline 2302 and a buffer area 2304 are generated for display in the embodiment of FIG. 23. Other audience members that exist in the geographic area generated for display are indicated by other unique colors and/or symbols. As used herein, the term unique means different from the display color and/or symbol for other feature data, such as the feature data matching the search criteria.

The feature data matching the search criteria also is generated for display in the feature display frame 1006. This matching feature data includes data from the disparate CAM datasets that were spatially linked to the spatial layers. If feature data matching the search criteria is not located, an error message is generated, and a new search criteria may be entered.

Figure 24:
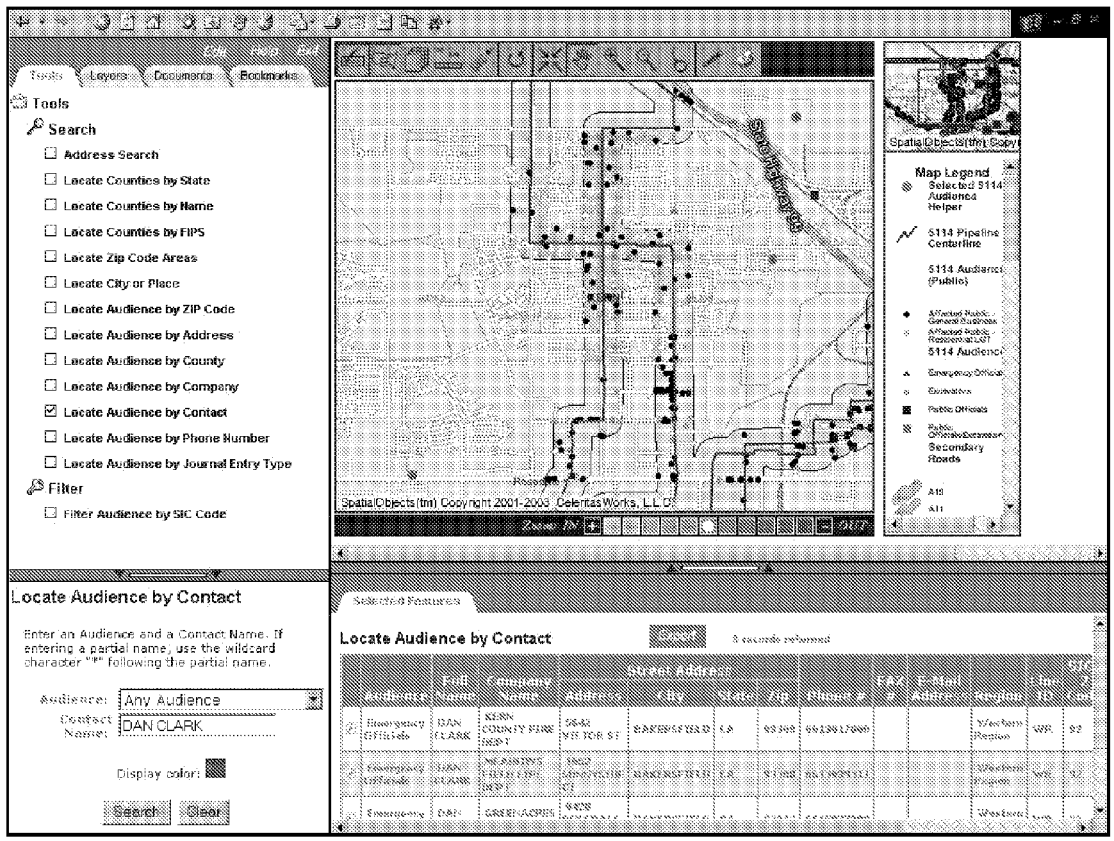

FIG. 24 depicts an exemplary embodiment of a search tool for locating an audience by contact name. A user selects a search tool for locating an audience by contact name, enters the contact name in the tool input frame 1008, selects the audience type from the audience type drop down list, and selects the search button. The display color identifying matching feature data on the map image also may be selected in the tool input frame 1008.

If feature data matching the search criteria is located, the feature data is generated to a map image with the matching audience records highlighted and centered based upon the selected display color. The audience members matching the search criteria are identified on the map image with the display color selected in the tool input frame 1008 and/or a selected symbol. If feature data matching the search criteria is not located, an error message is generated, and a new search criteria may be entered.

In the example of FIG. 24, multiple pipeline centerlines are depicted along with their corresponding buffer areas. Multiple different types of audience members also are shown within the buffer areas. Additional contacts are shown in the example of FIG. 24 in areas outside of, but in relation to, the buffer areas. These contacts also are identified by a selected color and/or symbol.

Feature data from the CAM datasets that match the search criteria are generated for display in the feature display frame 1006. If feature data matching the search criteria is not identified, an error message is generated for display, and a new search criteria may be entered.

Figure 25:
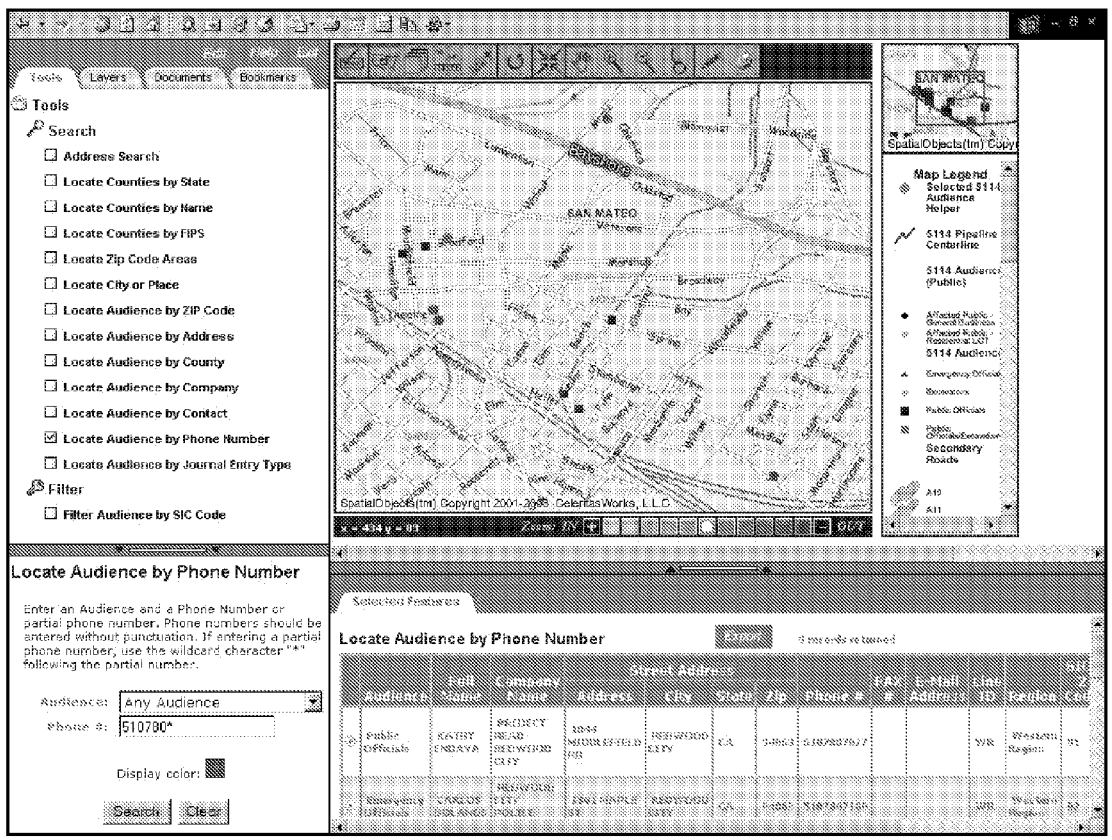

FIG. 25 depicts an exemplary embodiment of the search tool for locating an audience by a phone number. The user selects the search tool for locating an audience by a phone number, enters the phone number in the tool input frame 1008, selects the audience type from the audience drop down list, and selects the search button. The display color identifying matching feature data on the map image also may be selected in the tool input frame 1008.

If feature data matching the search criteria is located, a map image is generated with the audience records highlighted and centered based upon the selected display color in the tool input frame 1008. The matching feature data audience records are generated for display with the selected color and/or a unique symbol. Other feature data audience records are generated for display within a selected range of the geographic area identified by the search criteria, and those audience records are depicted using another color and/or symbol.

The feature data from the CAM datasets matching the search criteria is generated for display in the feature display frame 1006. If feature data matching the search criteria is not located, an error message is generated for display, and a new search criteria may be entered.

Figure 26:
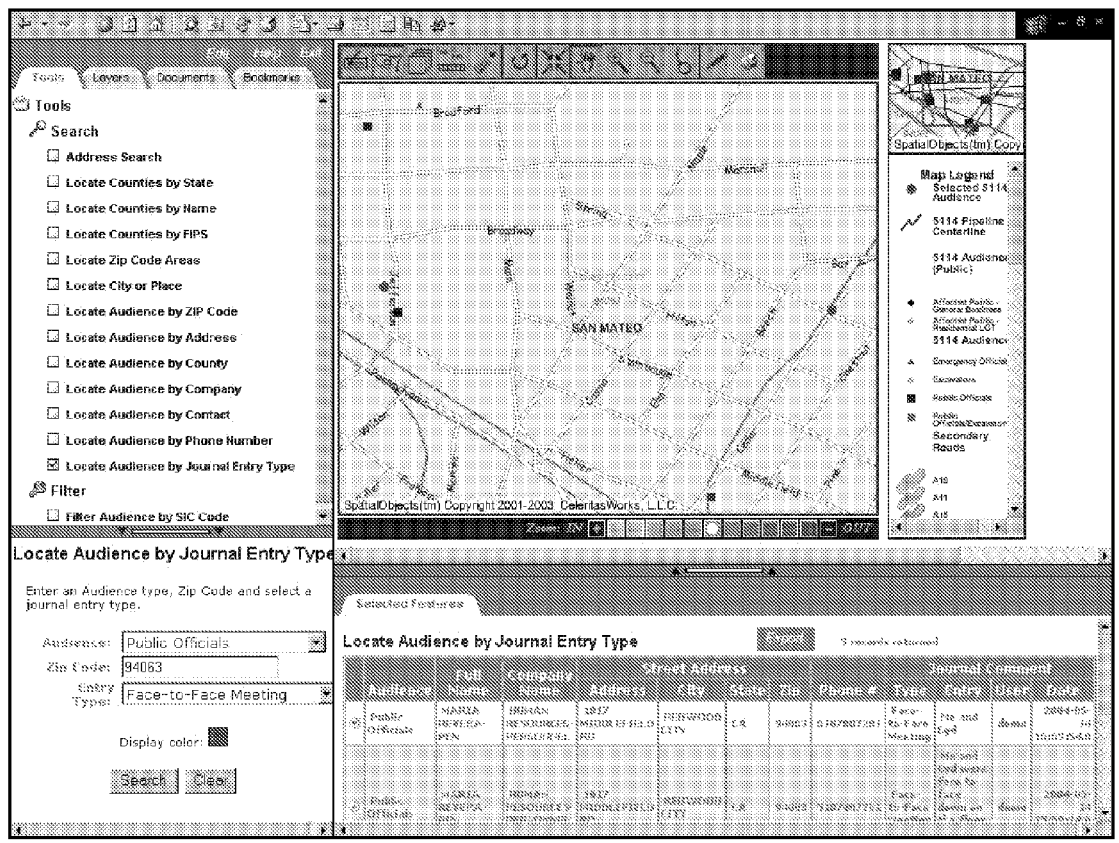

FIG. 26 depicts an exemplary embodiment of a search tool for locating an audience by a journal entry type. The user selects a search tool for locating the audience by a journal entry type and enters a zip code or other address information. The user enters the journal entry type or selects the journal entry type from the entry type drop down list, selects the audience type from the audience type drop down list, and selects the search button. The display color identifying matching feature data on the map image also may be selected in the tool input frame 1008. In other embodiments, the audience type selection is optional. In still other embodiments, other or different search fields may be used.

If feature data matching the search criteria is located, a map image is generated for display with the feature data audience records highlighted and centered based upon the selected display color in the tool input frame 1008. The audience members within the search criteria are depicted on the map image by point features with a unique color and/or symbol. The point features generated for display for the audience members in the example of FIG. 26 include contacts and other audience members. In this example, contacts include public officials, excavators, and emergency officials.

Feature data from the CAM datasets matching the search criteria also are generated for display in the feature display frame 1006. If feature data matching the search criteria is not located, an error message is generated for display, and a new search criteria may be entered.

Figure 27:
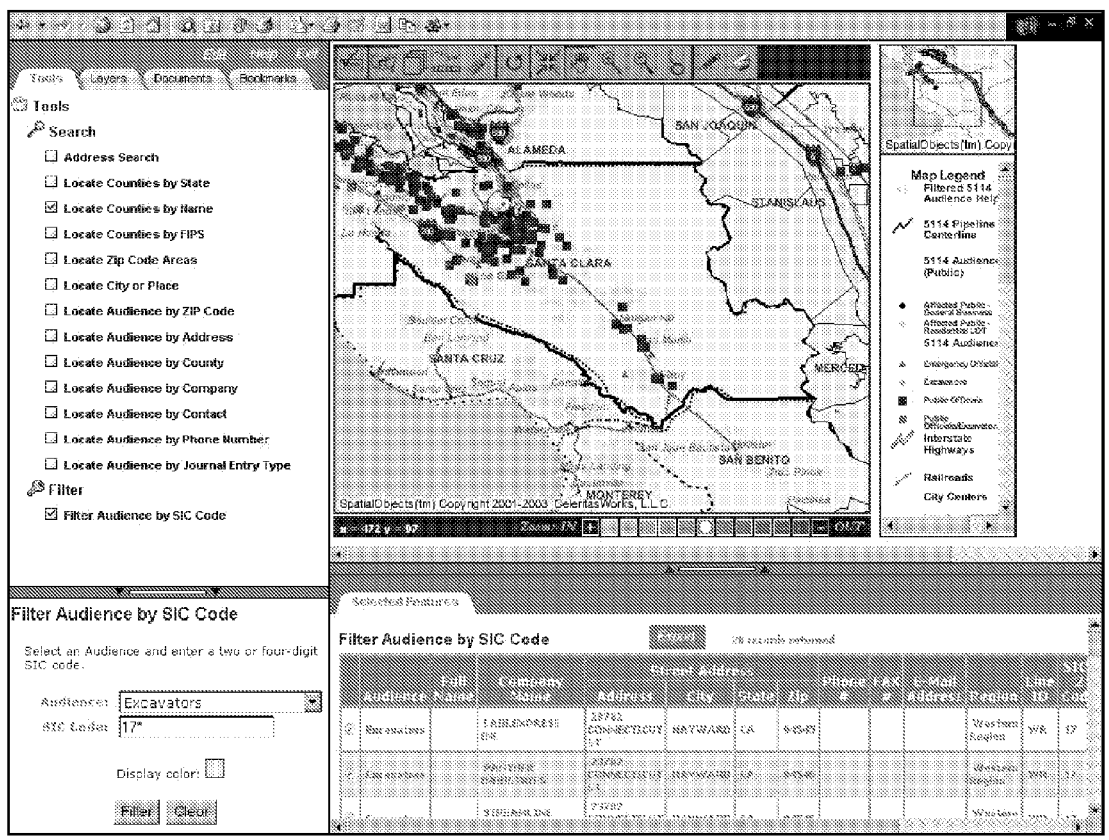

FIG. 27 depicts an exemplary embodiment of a filter tool for filtering an audience by SIC code. The user selects the filter tool for filtering an audience by SIC code. In this example, the user also selects the search tool for locating counties by name. The user enters the SIC code, including one or more characters and one or more wildcard characters, and selects the audience type from the audience type drop down list. The user also selects the display color that will be used to identify feature data matching the filter search criteria.

If feature data matching the search criteria is located, a map image is generated with the audience records highlighted based upon the selected display color in the tool input frame 1008. The audience members matching the search criteria are indicated with the selected display color and a unique symbol. Other audience members, including other contacts, are depicted within a range of the search criteria as point features with other colors and/or symbols.

Feature data from the CAM datasets matching the search criteria also is generated for display in the feature display frame 1006. If feature data matching the search criteria is not identified, an error message is generated for display, and a new search criteria may be entered.

Figure 28:
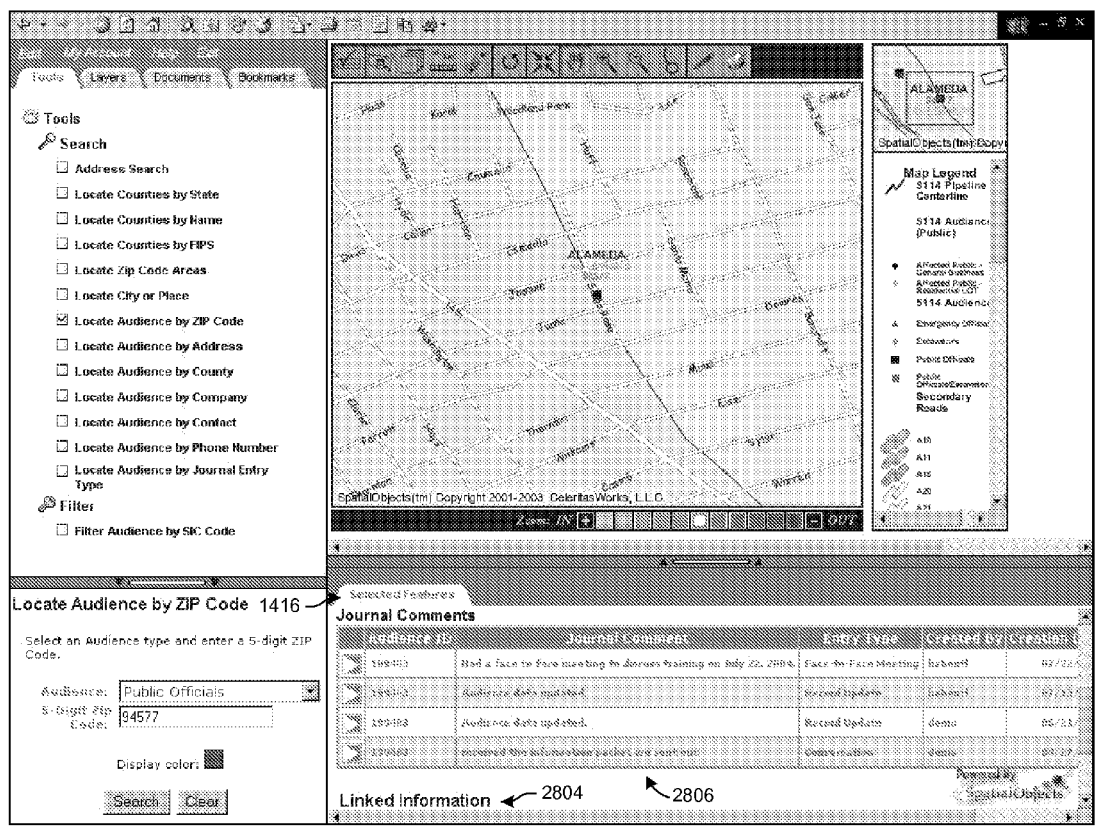
Figure 29:
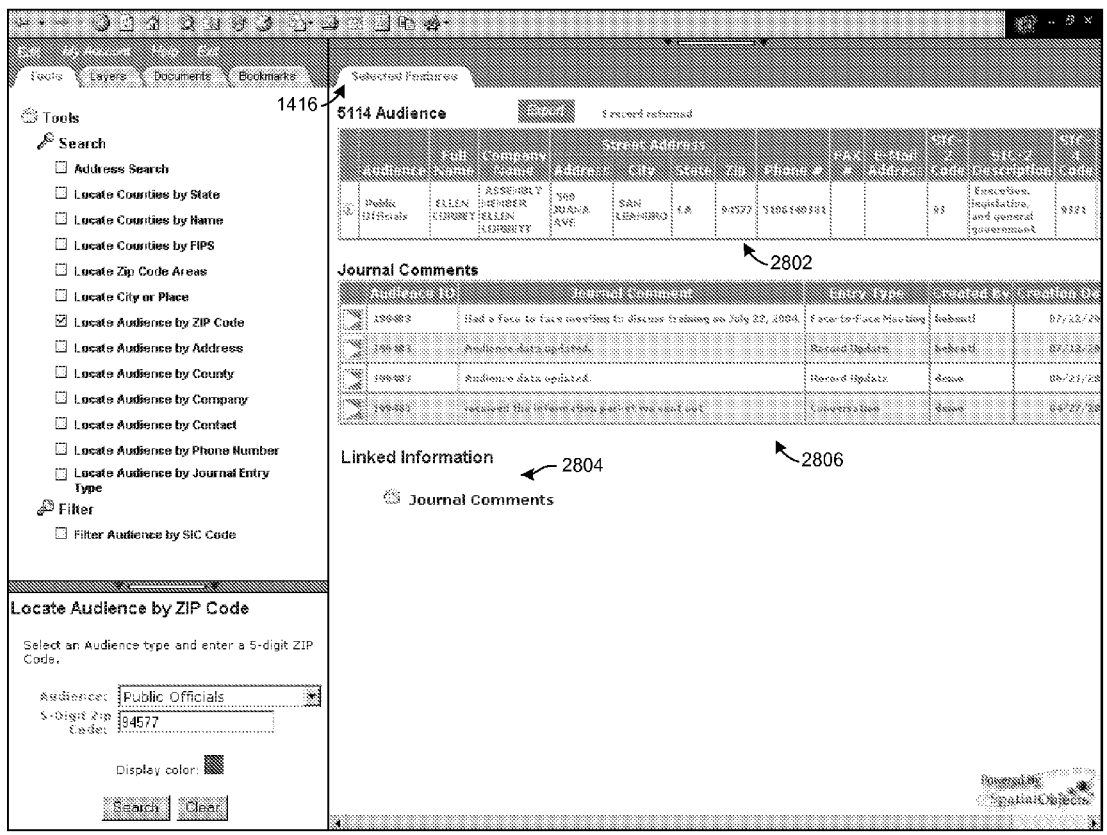

FIGS. 28 and 29 depict exemplary embodiments of linked features generated in the feature display frame 1006 in response to a search. The feature data 2802 corresponding to the search criteria is generated in the feature display frame 1006 in the selected features utility 1418. Linked information is generated for display in a linked feature reference list 2804 in the feature display frame 1006. The user may use the scroll bar to scroll down the linked feature reference list 2804, as depicted in FIG. 28. In the example of FIG. 28, the user scrolled down the linked feature reference list 2804 to review the journal entries 2806 corresponding to the feature data 2802 matching the search criteria. Alternately, the user may expand the selected features utility 1418 so that all feature data 2802, including linked features 2804, are fully displayed in the feature display frame 1006.

Figure 30:
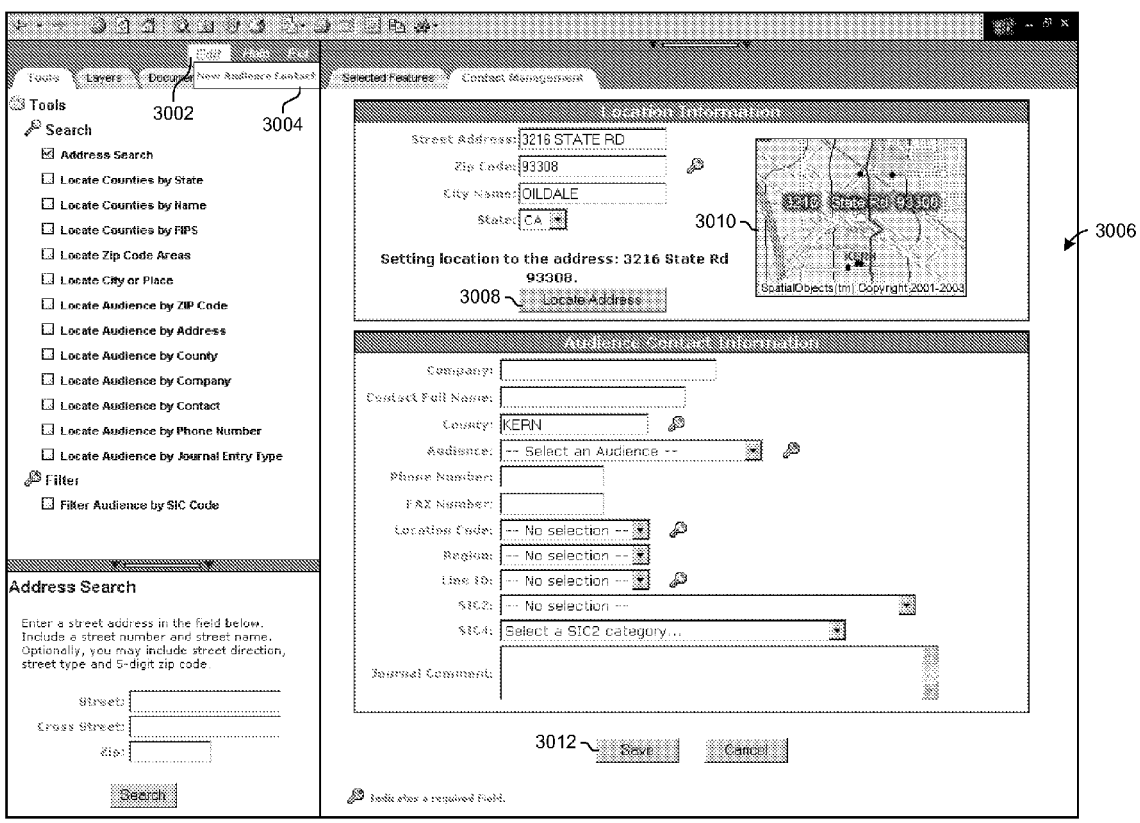

FIG. 30 depicts an exemplary embodiment of an audience management utility for adding a contact. The audience management utility may be generated, for example, by selecting the edit utility 3002. After the edit utility 3002 is selected, a new audience contact tab 3004 is generated. Upon selecting the new audience contact tab 3004, a contact management utility 3006 is generated.

In the embodiment of FIG. 30, the user enters the location information for the contact, including the street address, the zip code, the city, and the state. The user then selects the locate address button 3008. When the locate address button 3008 is selected, the spatial processing system 104 attempts to geocode the location information. If the location information is successfully geocoded, an overview map image 3010 is generated identifying the location of the contact as a point feature within the geographic area managed by the CAP. In one embodiment, other feature data, including interest area data and buffer area data, is generated in relation to the point feature for the location of the contact.

The user enters additional contact information. In the embodiment of FIG. 30, the user enters one or more of a company name, a full contact name, a county, an audience type, a phone number, a fax number, a location code, a region, a line identification (ID), a two digit SIC code, a four digit SIC code, and/or a journal comment. The user selects the save button 3012 to save the audience data to the data management system.

Figure 31:
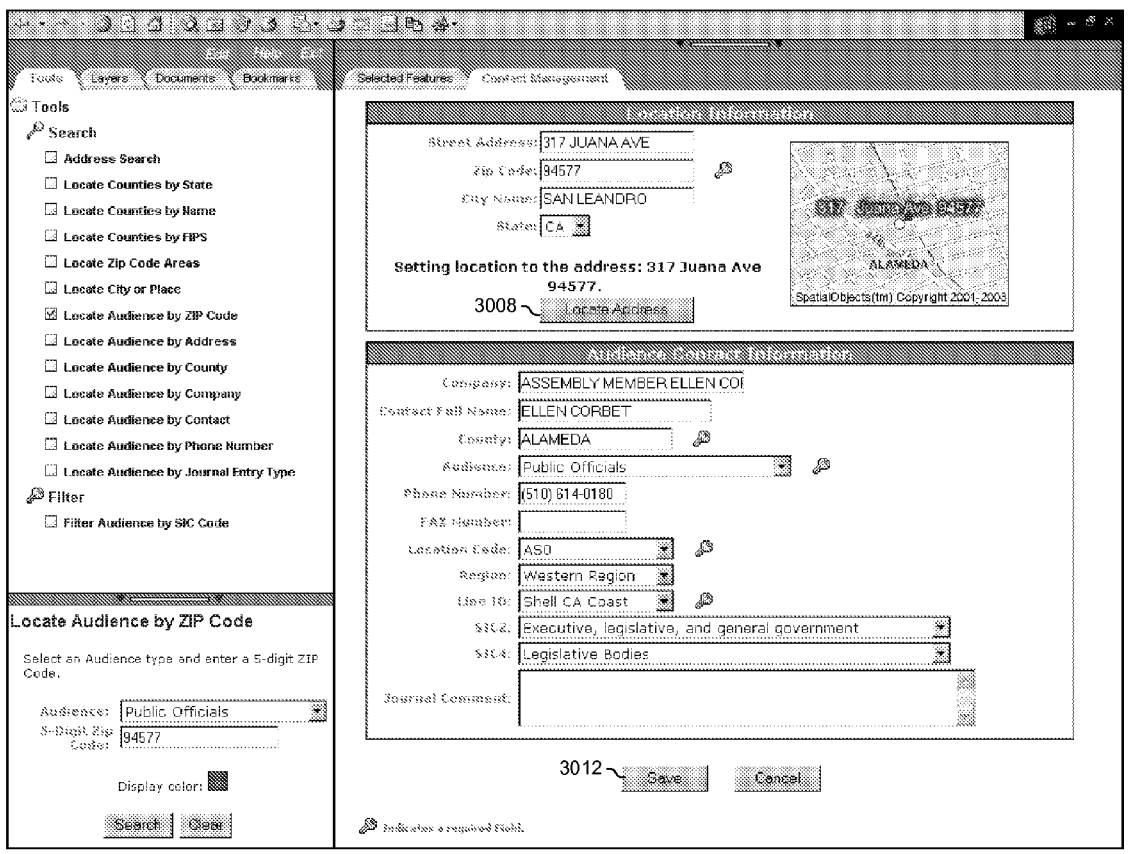

FIG. 31 depicts an exemplary embodiment of an audience management utility generated to a user to edit contact data. The edit audience management utility may be generated by selecting the edit contact utility 1312 (see FIG. 13) from the features menu 1302 or, in some embodiments, by selecting the edit utility 3002.

In the example of FIG. 31, the user selected the menu icon 1236 for audience feature data in the feature display frame 1006. The features menu 1302 was generated, and the user selected the edit contact utility 1312. In response, the contact information for that contact was generated for display.

The user may change any information in the audience management utility, including the location information or other information, and/or add a journal comment. If the location information is changed, the user selects the locate address button 3008, and the spatial management system 104 geocodes the modified location information. The information may be saved upon selecting the save button 3012.

Figure 32:
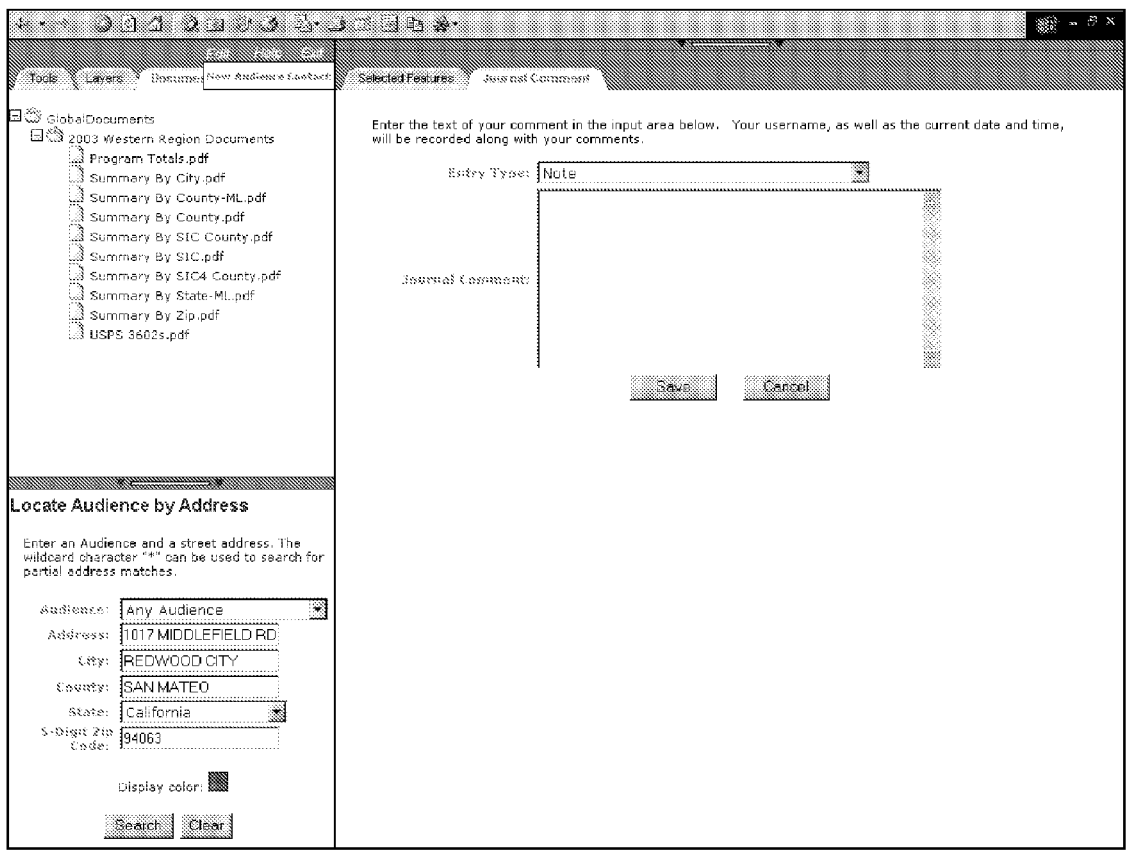

FIG. 32 depicts an exemplary embodiment of a journal entry utility. The journal entry utility may be generated by selecting the add journal entry utility 1310 from the features menu 1302 (see FIG. 13). In other embodiments, an add journal entry utility may be selected from the edit utility 3002. If the journal entry is generated by selecting the add journal entry utility 1310, the journal entry automatically is associated to the audience member from which the menu icon 1236 was selected to generate the features menu 1302.

The user enters the journal entry type or selects the journal entry type from a journal entry type drop down list. The user also enters a journal entry. In some embodiments, when the save button is selected, the user name, date, and time are automatically recorded with the journal entry.

Figure 33:
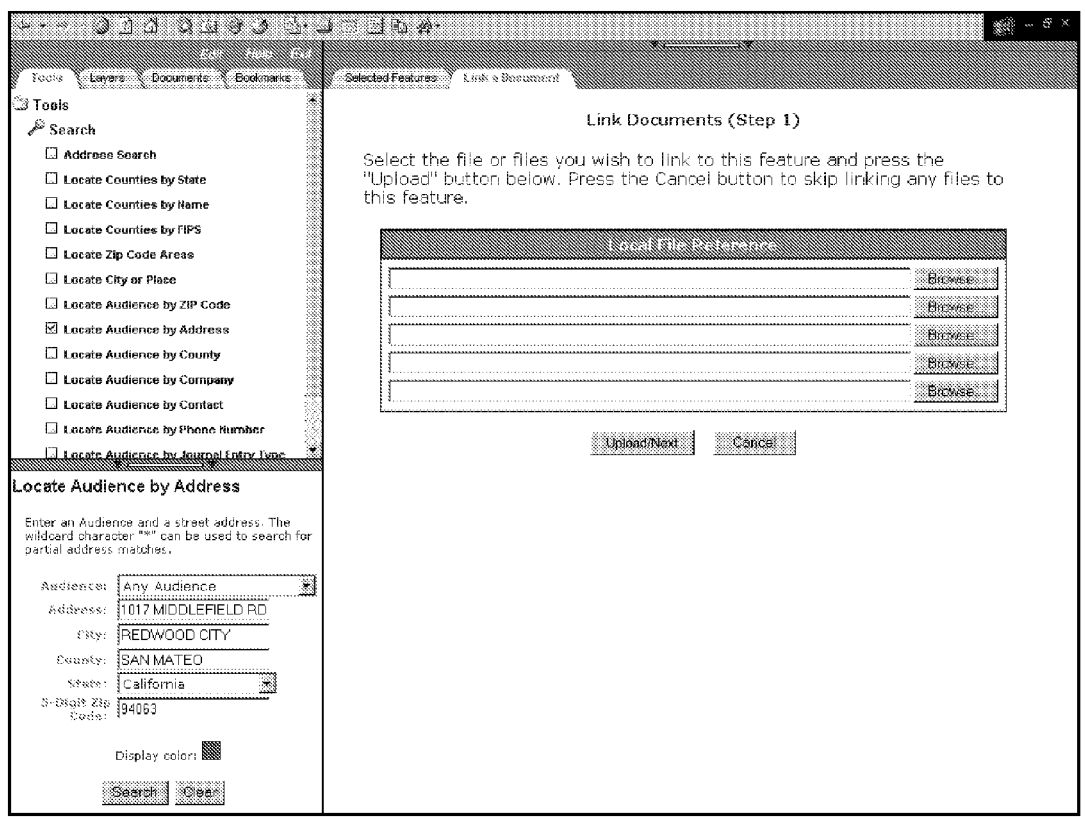

FIG. 33 depicts an exemplary embodiment of a link document utility. The link document utility may be generated by selecting the link document utility 1308 from the features menu 1302 (see FIG. 13).

The features menu 1302 was generated upon selection of a menu icon 1236 for feature data generated to the feature display frame 1006. Therefore, in this embodiment, the documents and/or other files and/or data linked using the link document utility of FIG. 33 automatically are linked to the selected feature from the feature display frame 1006.

The user selects one or more files that are to be linked to the selected feature data. The user may type a file path in the entry box or select a path using the browse button. After the user has selected all of the documents and other files that are to be linked to the selected feature data, the user selects the upload/next button to link the documents and/or files and/or data to the selected feature data.

Figure 34:
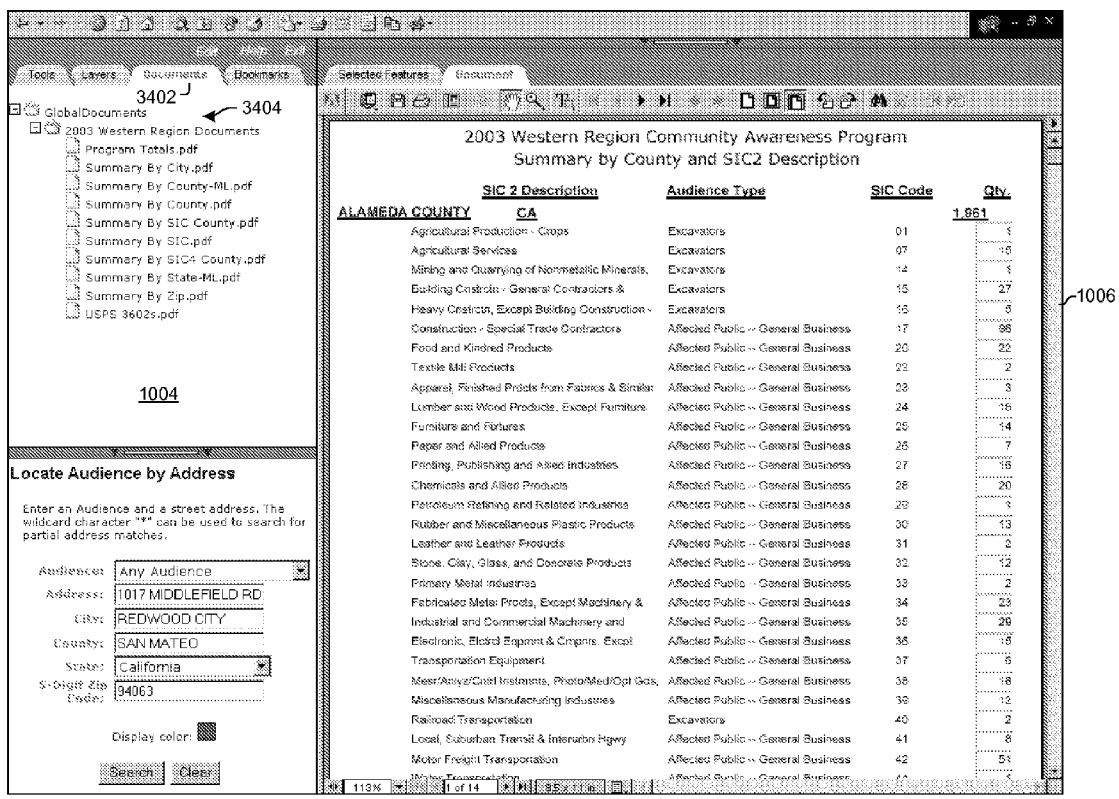

FIG. 34 depicts an exemplary embodiment of documents generated in the feature display frame 1006 when the documents utility 3402 is selected. The user may access current and historical documents for the CAP using the documents utility 3402.

When the documents utility 3402 is selected, a document menu 3406 is generated for display in the tool frame 1004 as a tree structure, a file structure, or another structure for each CAP project or subproject. When the user selects one of the document names displayed in the document menu 3406, the document is displayed in the feature display frame 1006. In the example of FIG. 34, the map frame 1002 is collapsed, and the feature display frame 1006 is expanded.

Figure 35:
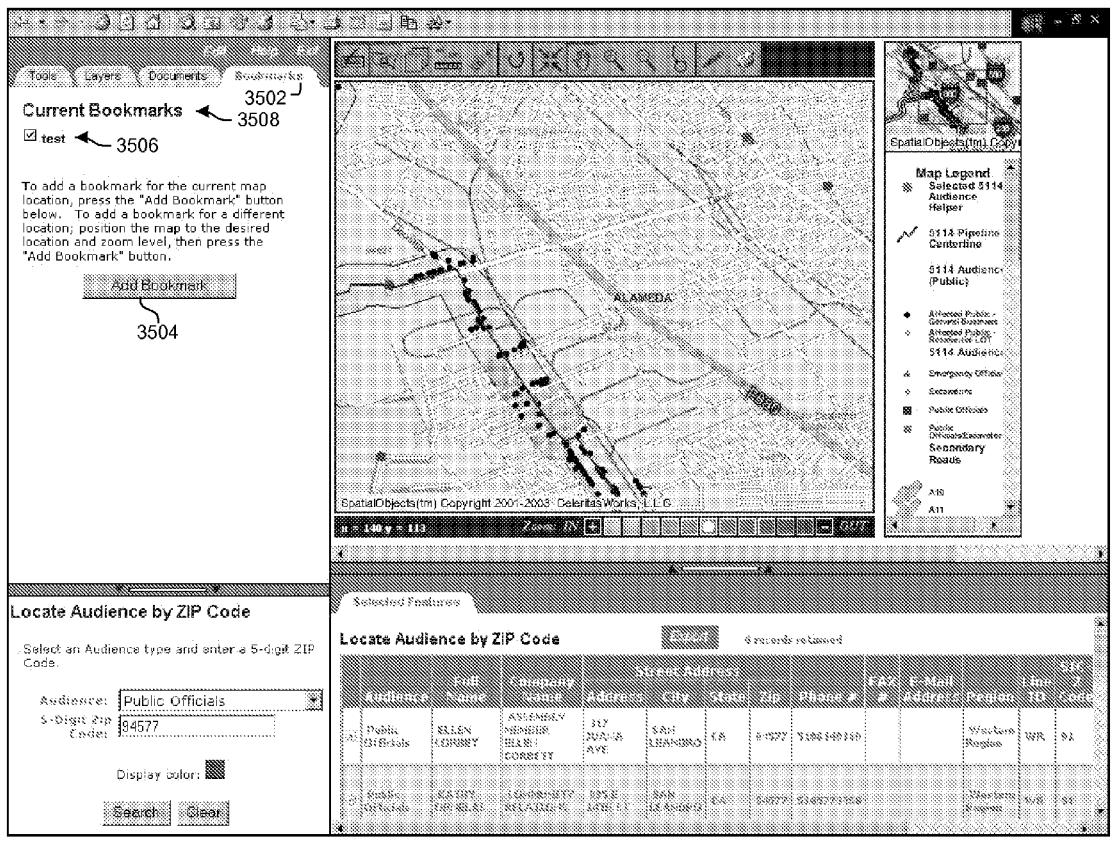

FIG. 35 depicts an exemplary embodiment of a bookmark utility. The bookmark utility 3502 enables a user to bookmark a map image location. The user selects the bookmark utility 3502 and selects the add bookmark button 3504. An entry box is generated that enables a user to enter a title for the bookmark. The user saves the title, and the map image location is saved. The current bookmark names 3506 are displayed below the title current bookmarks 3508. In the example of FIG. 35, "test" is a saved bookmark that may be selected by the user.

Figure 36:
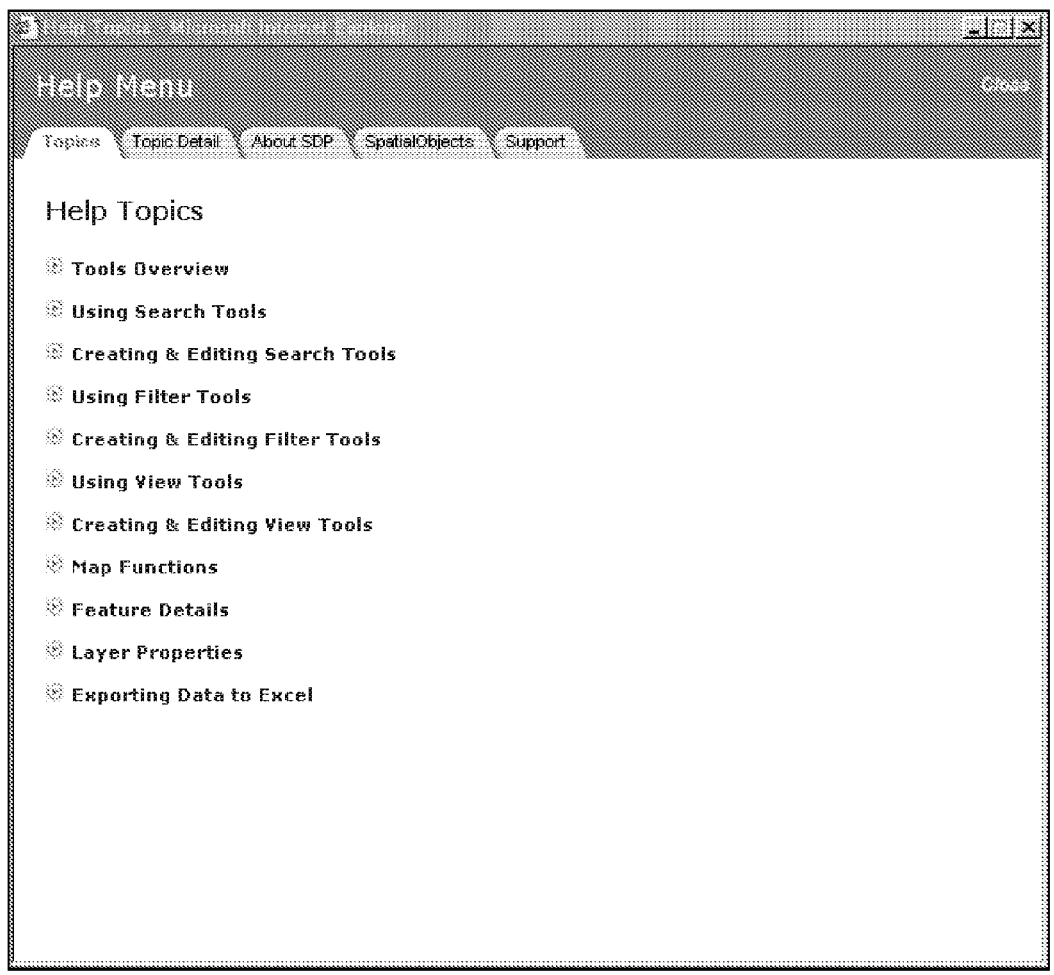

FIG. 36 depicts an exemplary embodiment of a help menu generated for display when the help utility is selected. The help menu may be displayed by topic, displayed for search entries, or in another manner.

FIGS. 37-69 depict examples in which a user interface is used perform various transactions, including adding and maintaining contact data, adding or updating one or more journal entries, and linking one or more documents to contact data. Other examples exist, and other actions may be performed.

FIGS. 37-43 depict an example in which the user interface is used to add contact data or to maintain contact data. In this example, once an initial or subsequent CAP communication has been completed, such as via mail, email, facsimile, phone calls, personal communication, or otherwise, a user may add and/or maintain information for one or more contacts using the CAM system. In this example, a user may add information for a new contact, such as if a new firehouse was built at a new location, and interactively geocode the location of the new contact for a map.

Figure 37:
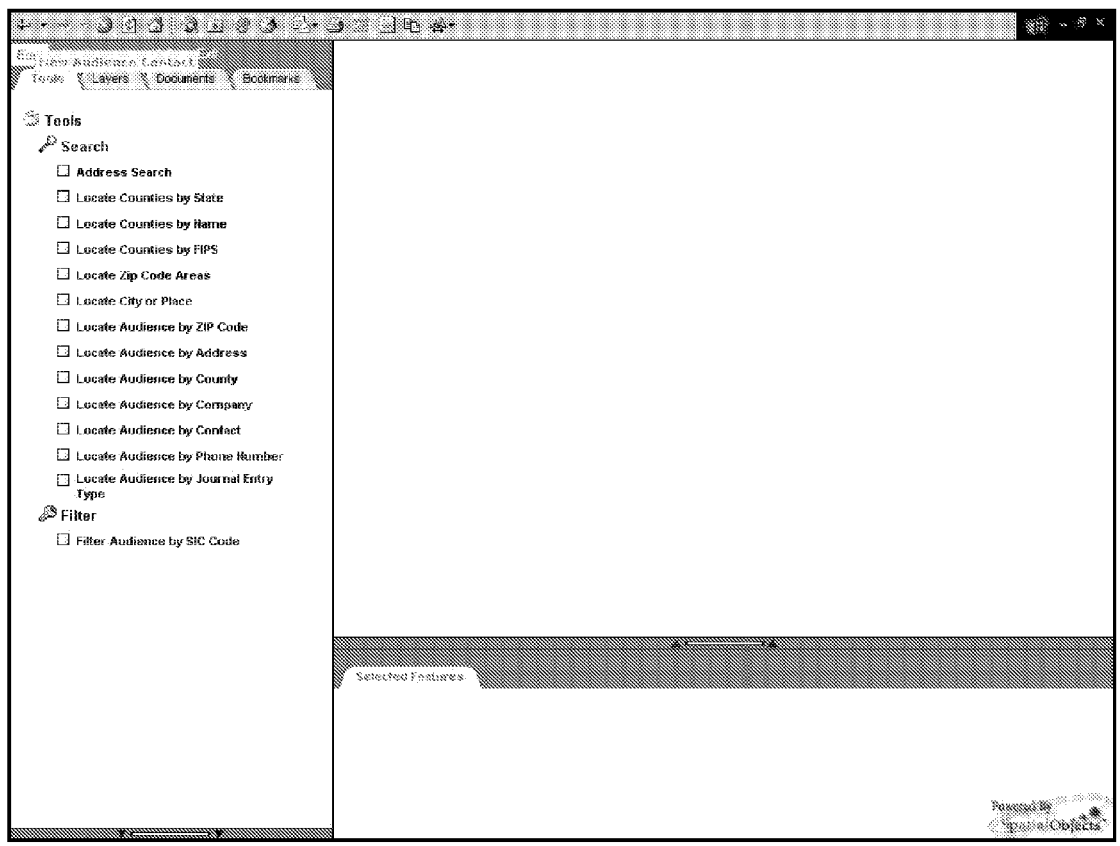
Figure 38:
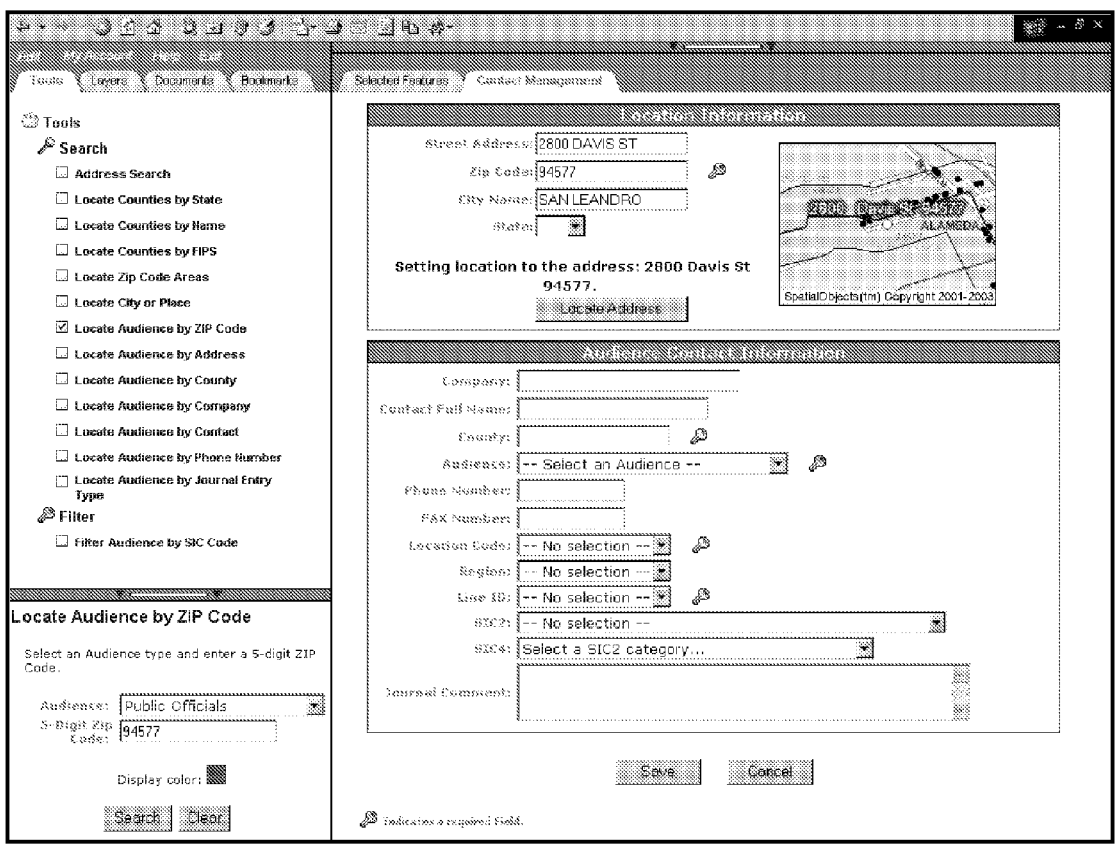
Figure 39:
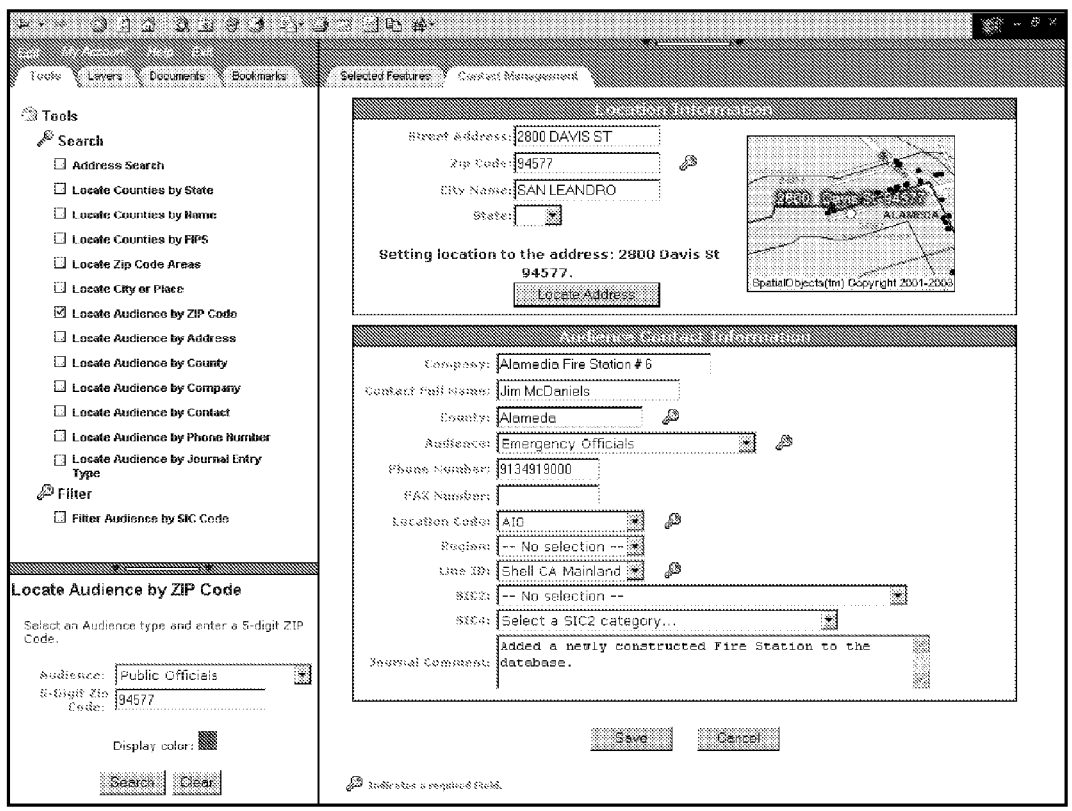
Figure 40:
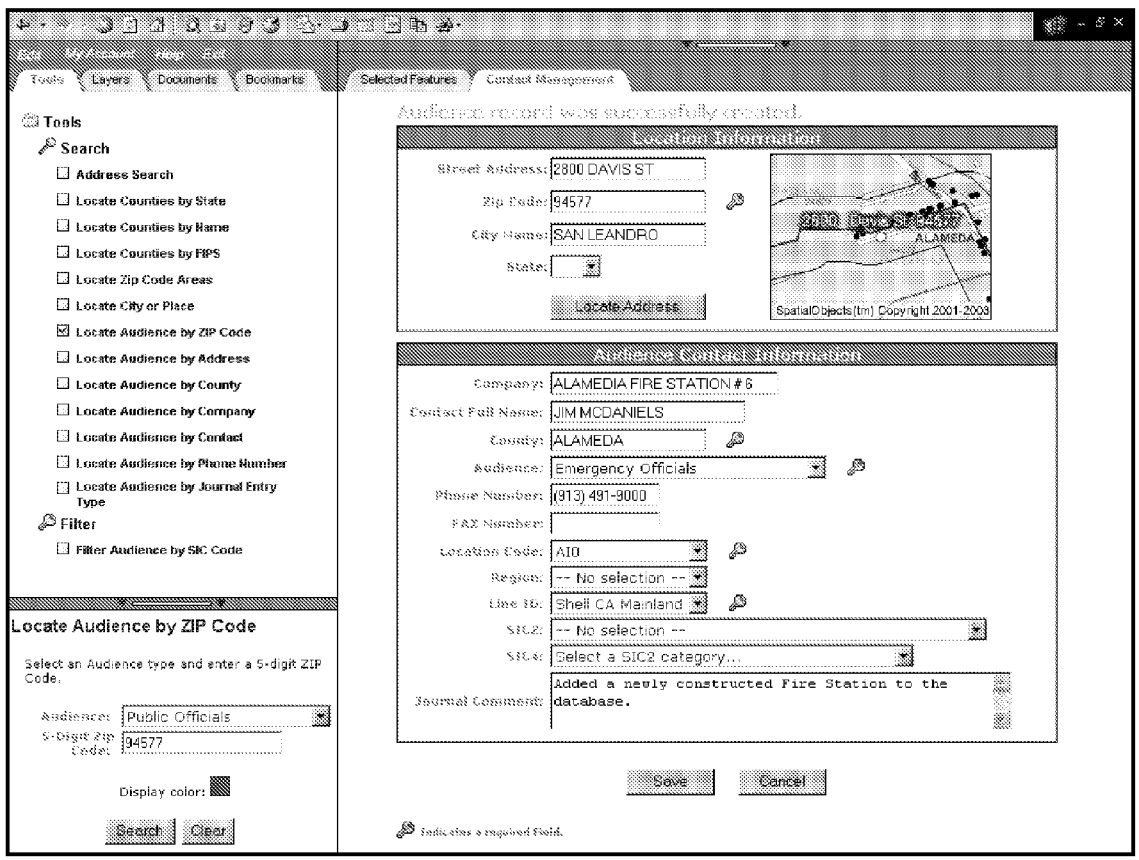

After the user logs in, the user selects the edit button and then the new audience contact button, as depicted in FIG. 37. A new audience contact data screen is generated to the user. The user enters the location information for the new contact and selects the locate address button as depicted in FIG. 38. Upon selection of the locate address button, the CAM system interactively geocodes the location information the user enters. The CAM system generates an overview map with the location of the new contact, as depicted in FIG. 38. The user enters the additional information for the new contact and selects the save button, as depicted in FIG. 39. The CAM system then saves the information for the new contact, including the geocode, as depicted in FIG. 40.

Figure 41:
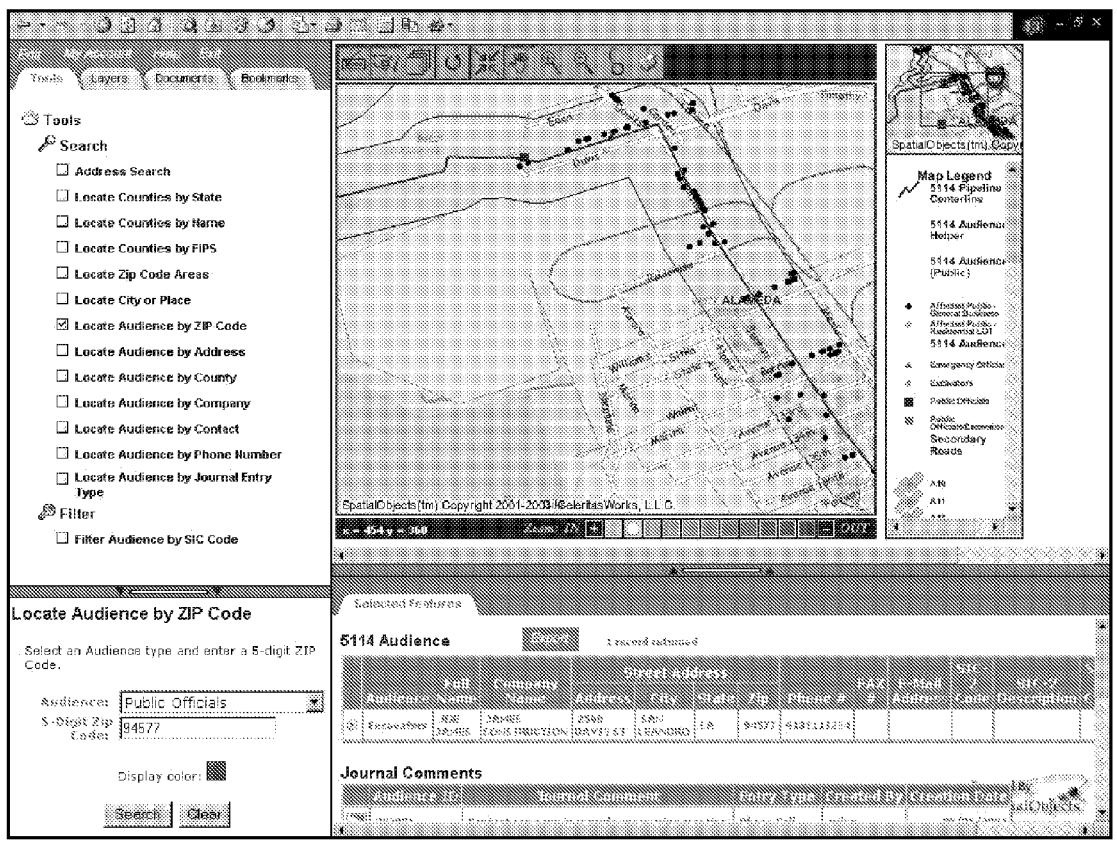
Figure 42:
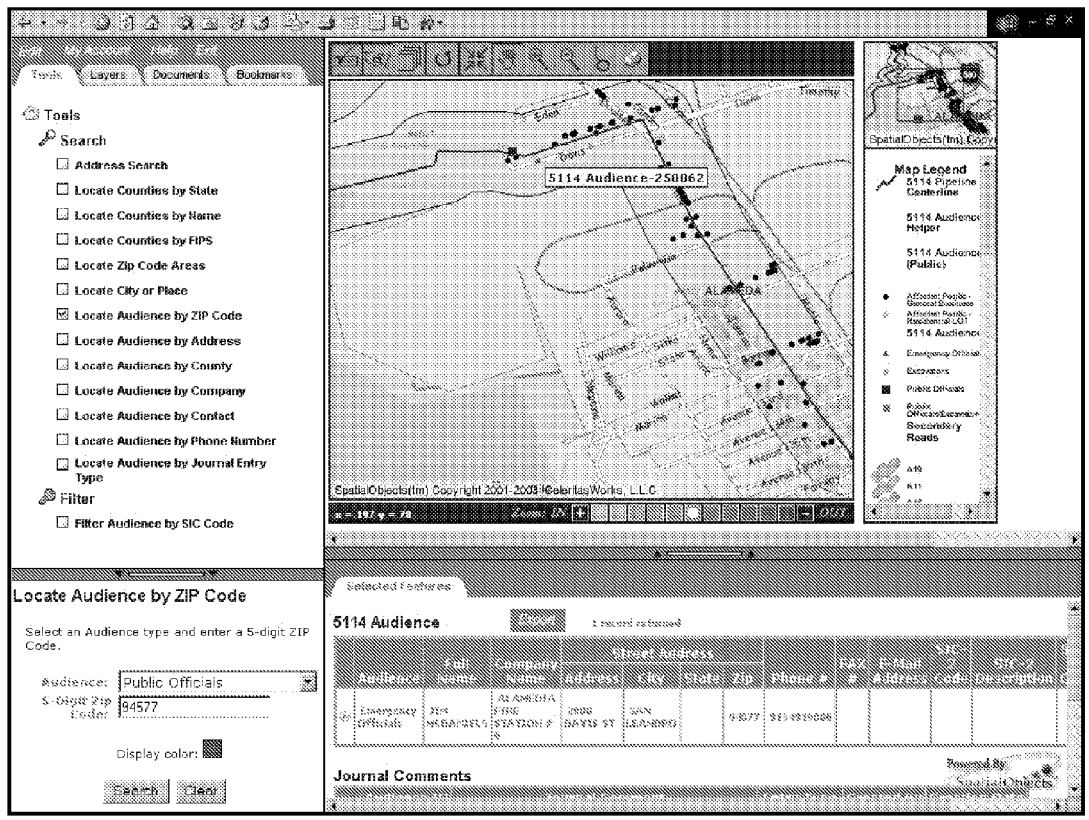

The contact management tab is then removed from the display by the CAM system, and the selected features tab is depicted in the feature display frame. The user may collapse the feature display frame, as depicted in FIG. 41. The user selects the refresh map button, and the new contact data is displayed on the map, as depicted in FIG. 42.

Figure 43:
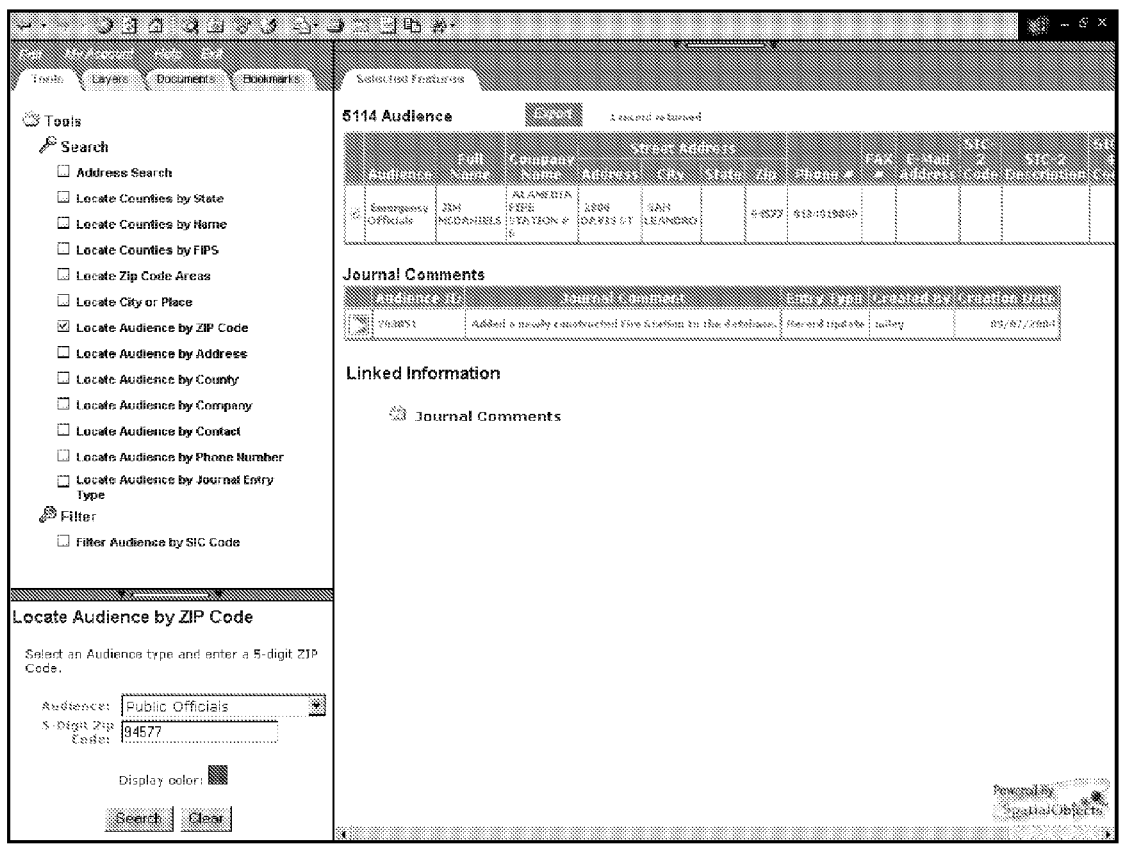

The user locates the pointer on the map over the point feature for the new contact and selects the point feature to verify the new contact data. The CAM system generates the contact data for the point feature in the feature display frame. The user expands the feature display frame and verifies the contact data for the newly added contact and the journal entries for the contact, as depicted in FIG. 43. In this example, a journal entry was added for the newly added contact. For an example of the steps for making a journal entry, see FIGS. 49-55.

FIGS. 44-48 depict an example in which a baseline CAP communication has been completed, such as by mail, email, phone calls, personal communication, or otherwise, and a user desires to maintain contact data in the CAM system. The user locates the pointer over a selected menu icon in the feature display frame, and a features menu is generated for display. The features menu includes a contact button that enables a user to edit and otherwise update information for a contact. When a user selects the contact button, a populated screen is generated for display for the selected contact. When the user has completed editing the contact data, the user selects the save button to save the entry in the CAM system.

Figure 44:
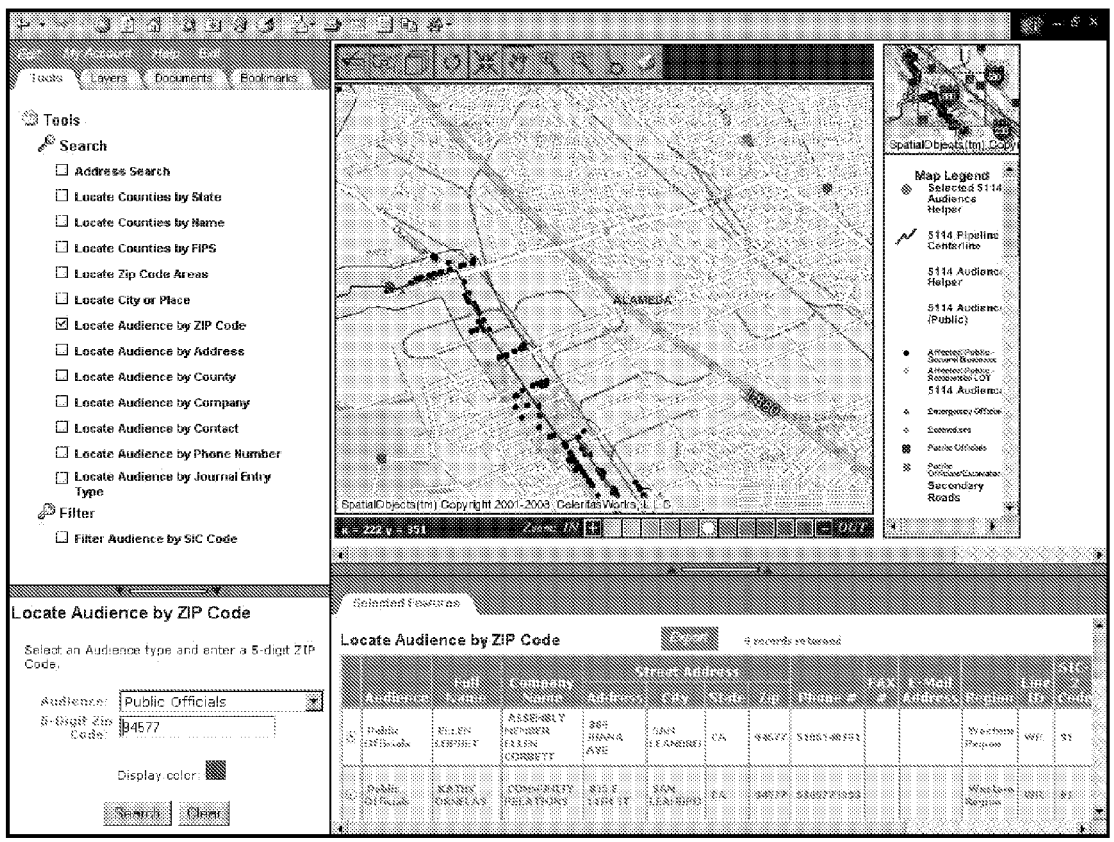
Figure 45:
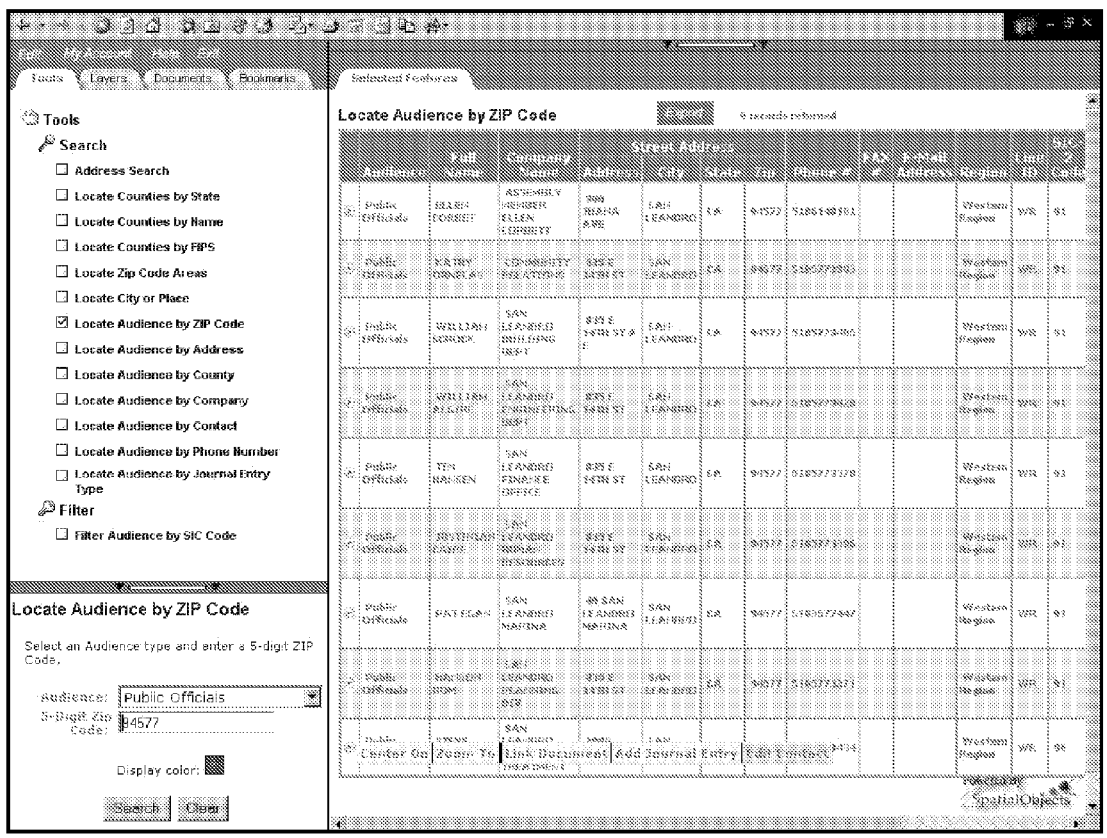

In the example of FIGS. 44-48, a user edits contact data after an initial baseline communication has been completed, such as by changing a public official's phone number. The user performs a search to locate the selected audience, as depicted in FIG. 44. The search results are generated for display in the feature display frame. The user expands the feature display frame and scrolls through the contact data in the feature display frame until the user locates the contact data that will be changed, as depicted in FIG. 45. The user selects the menu icon at the beginning of the contact data, also as depicted in FIG. 45. The user then selects the "edit contact" button from the features menu.

Figure 46:
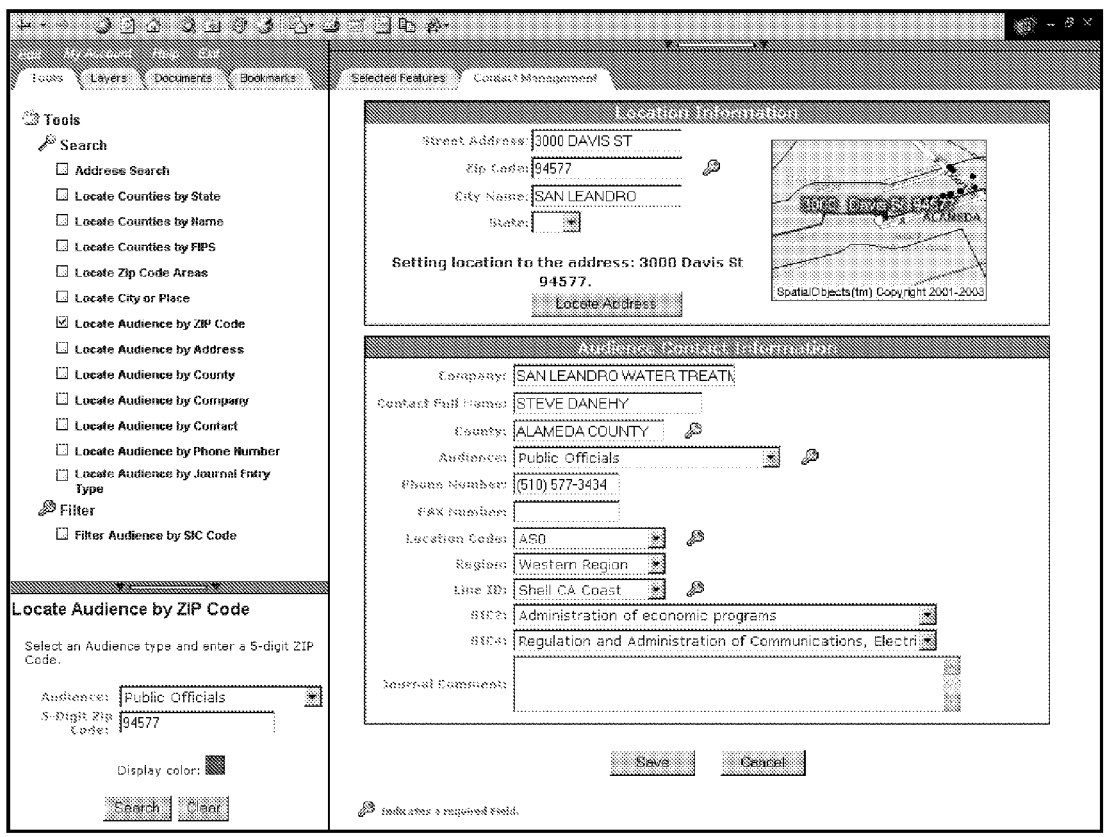
Figure 47:
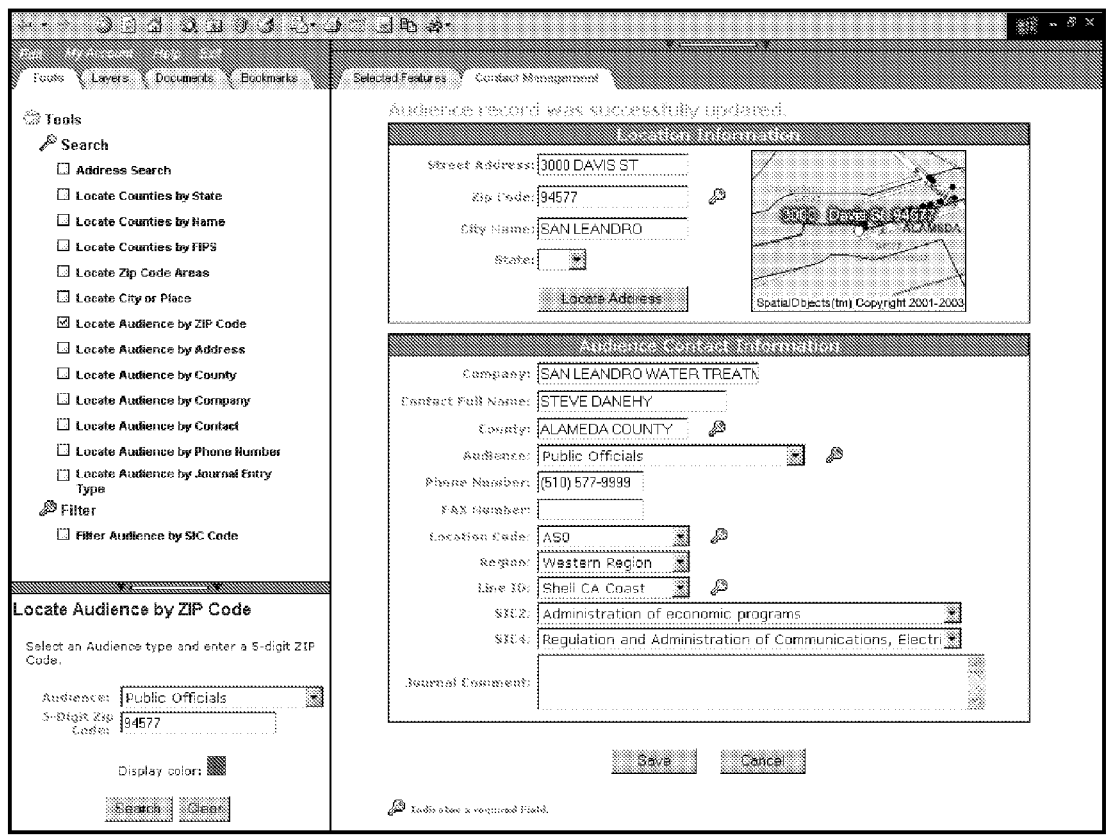
Figure 48:
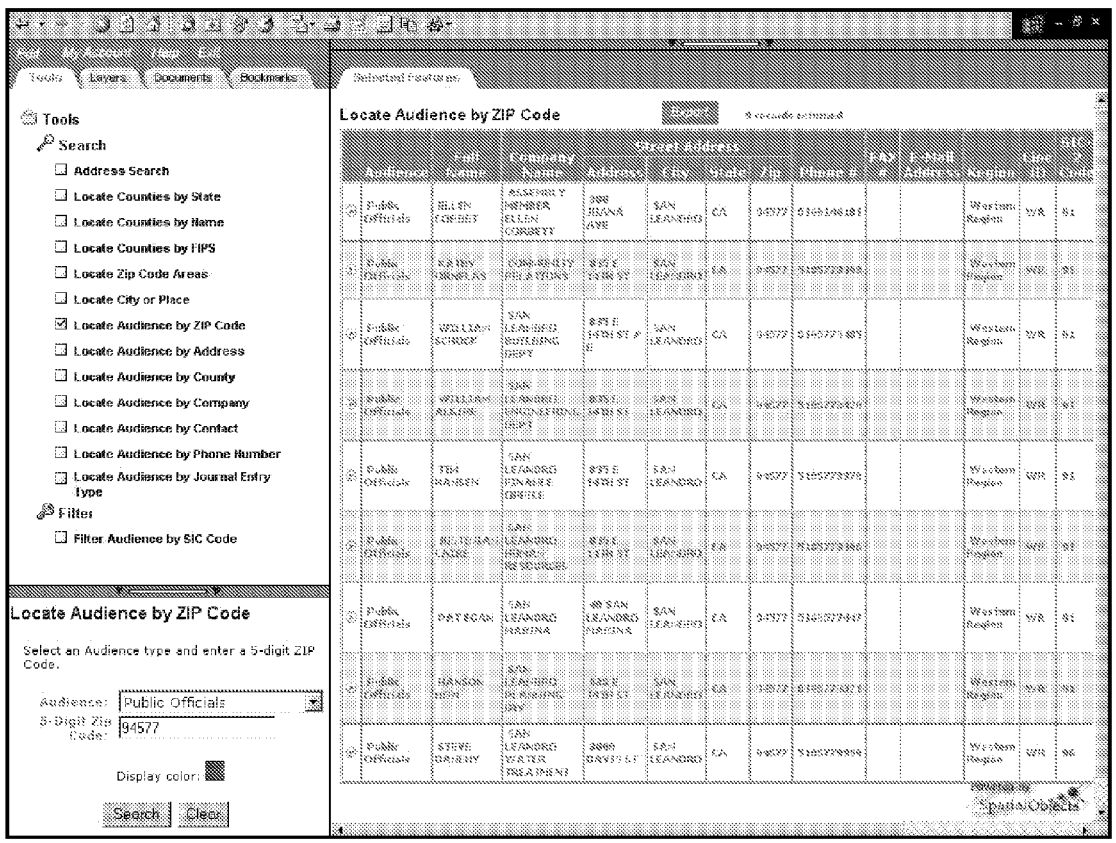

A screen is generated for display with populated information, as depicted in FIG. 46. The user edits the required information. If desirable, the user enters a journal comment. For example, the user may indicate that the phone number for the public official changed on a specific date. When the user has completed editing the selected fields of the contact data, the user selects the save button, and the audience record for the contact is updated, as depicted in FIG. 47. The user may then select the selected features tab to verify the edited contact data. The contact data for the edited contact, as well as the contact data matching the previous search criteria, are generated for display in the selected features tab, as depicted in FIG. 48.

FIGS. 49-55 depict an example in which a journal utility is used. For example, once a baseline CAP communication is completed, such as with mail, email, phone calls, personal communication, or otherwise, a user may enter one or more journal entries for one or more contacts.

By using the journal entries, a user can track and document each communication with a particular contact, such as each mailing, each email, each phone call, or other contact, or otherwise document each communication or other transaction with a contact. The user also can track and document each mailing or other communication for a particular CAP asset, a particular buffer area, a particular interest area, or another point of interest. The user can review the journal entries, along with the contact data, other CAM data, and linked documents, to easily determine its compliance with federal, state, and local regulations and maintain a comprehensive audit of all transactions.

Figure 49:
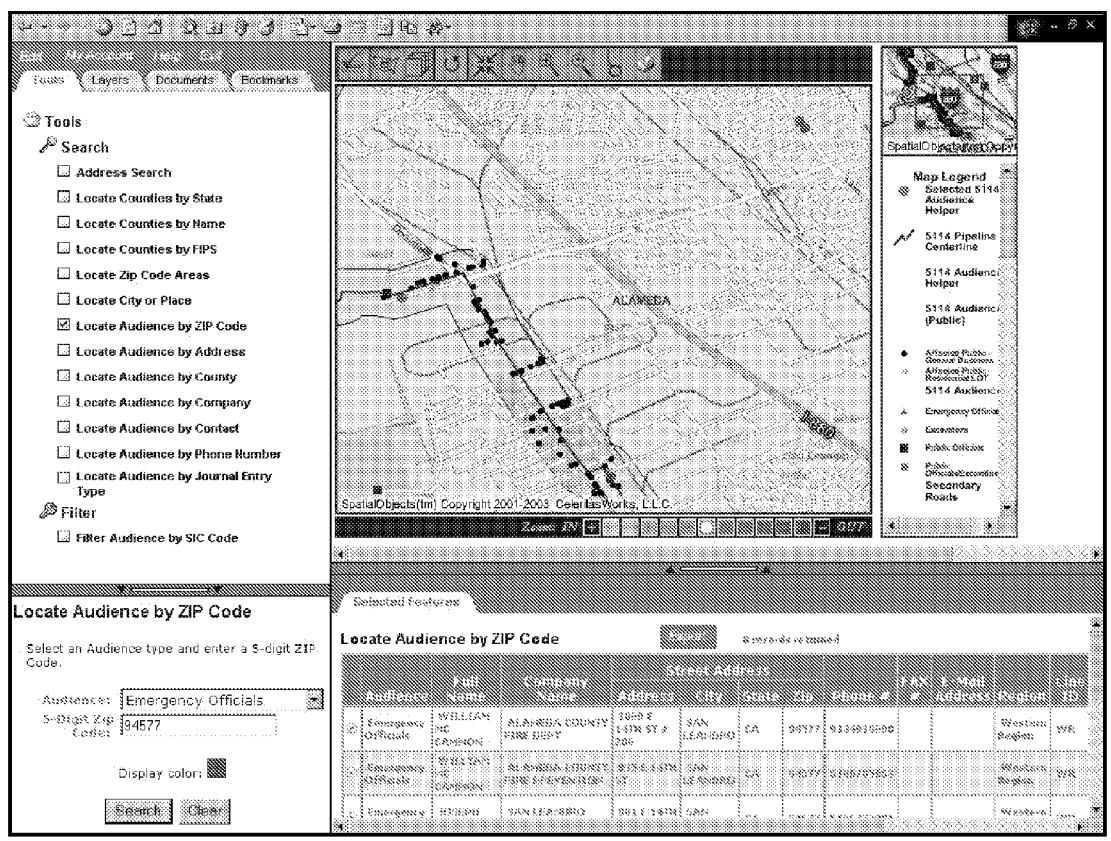
Figure 50:
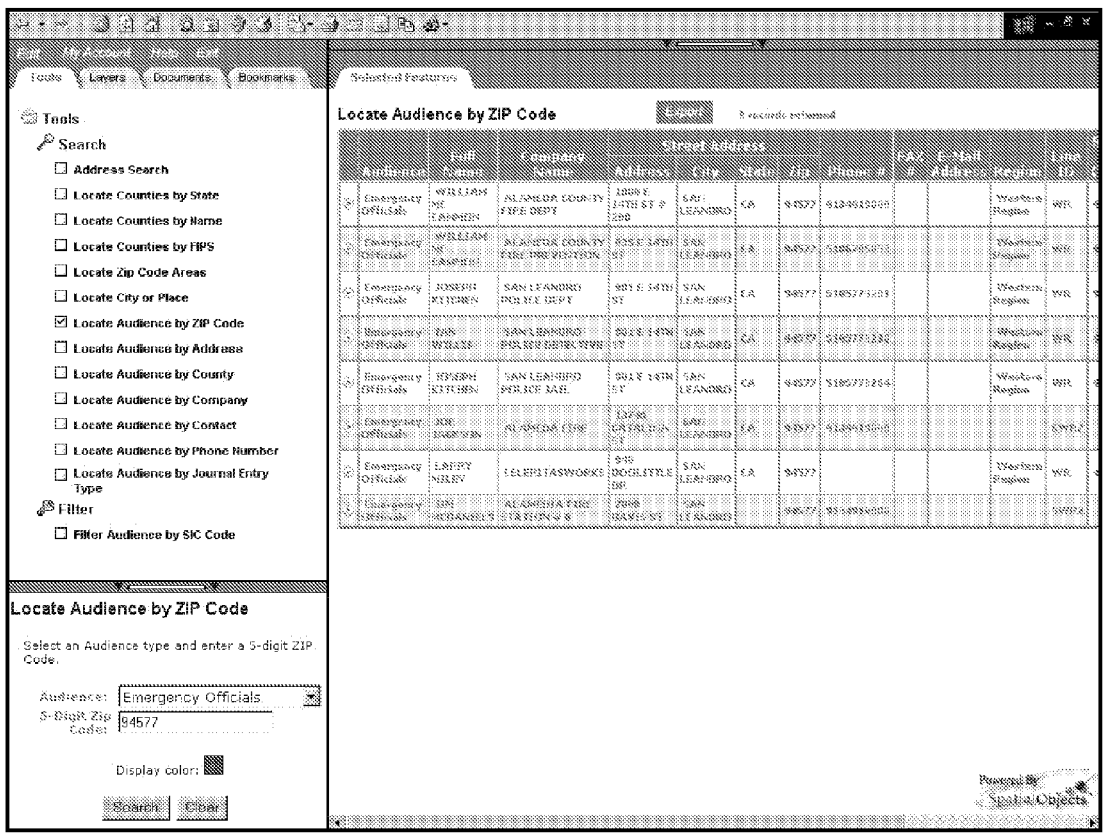
Figure 51:
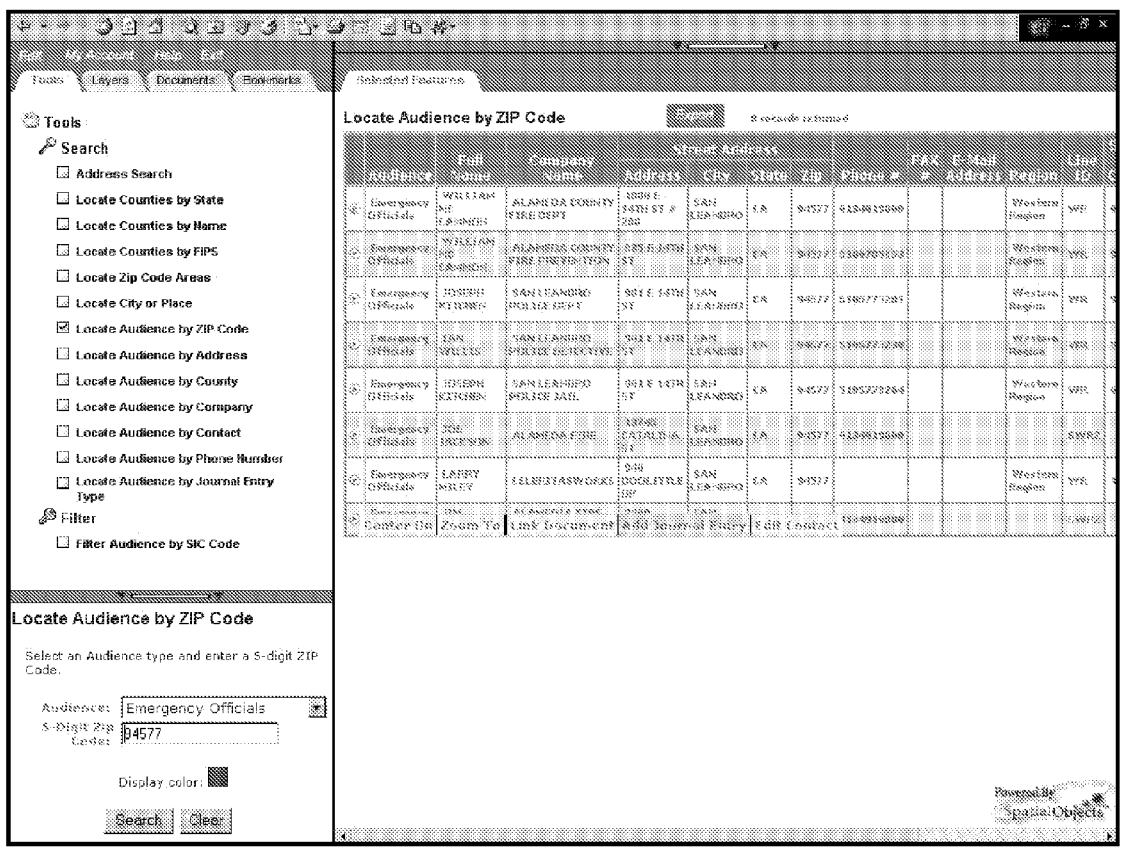
Figure 52:
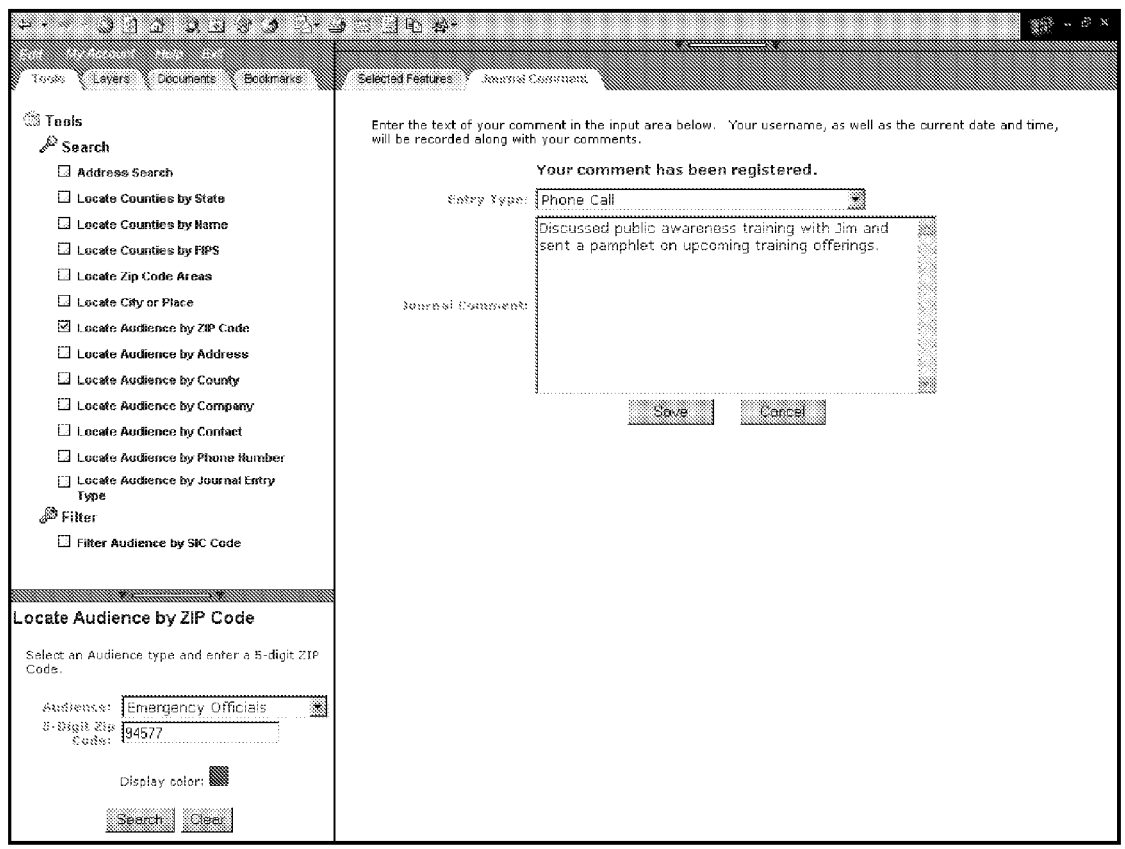

In the example of FIGS. 49-55, a user applies a journal entry to a contact after an initial baseline communication, such as when a telephone call is made to an emergency responder to discuss an upcoming training program. The user locates an audience by performing the desired search. The results of the search are generated in the feature display frame and the map frame, as depicted in FIG. 49. The user expands the feature display frame and scrolls through the contacts in the feature display frame until the selected contact is located, as depicted in FIG. 50. The user selects a menu icon at the beginning of the desired contact, resulting in the display of the features menu, as depicted in FIG. 51. The user selects the journal entry button from the features menu, and a journal entry screen is generated for display, as depicted in FIG. 52. The user enters the journal entry type, enters the journal entry, and selects the save button.

Figure 53:
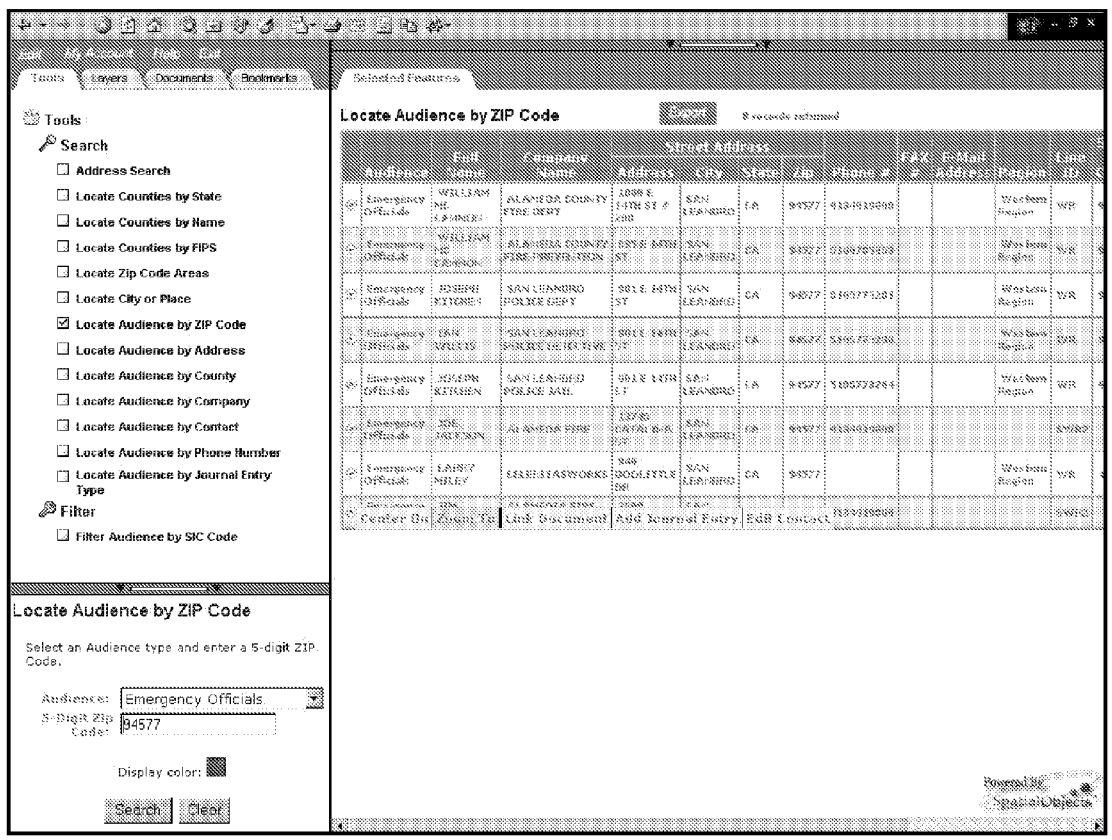
Figure 54:
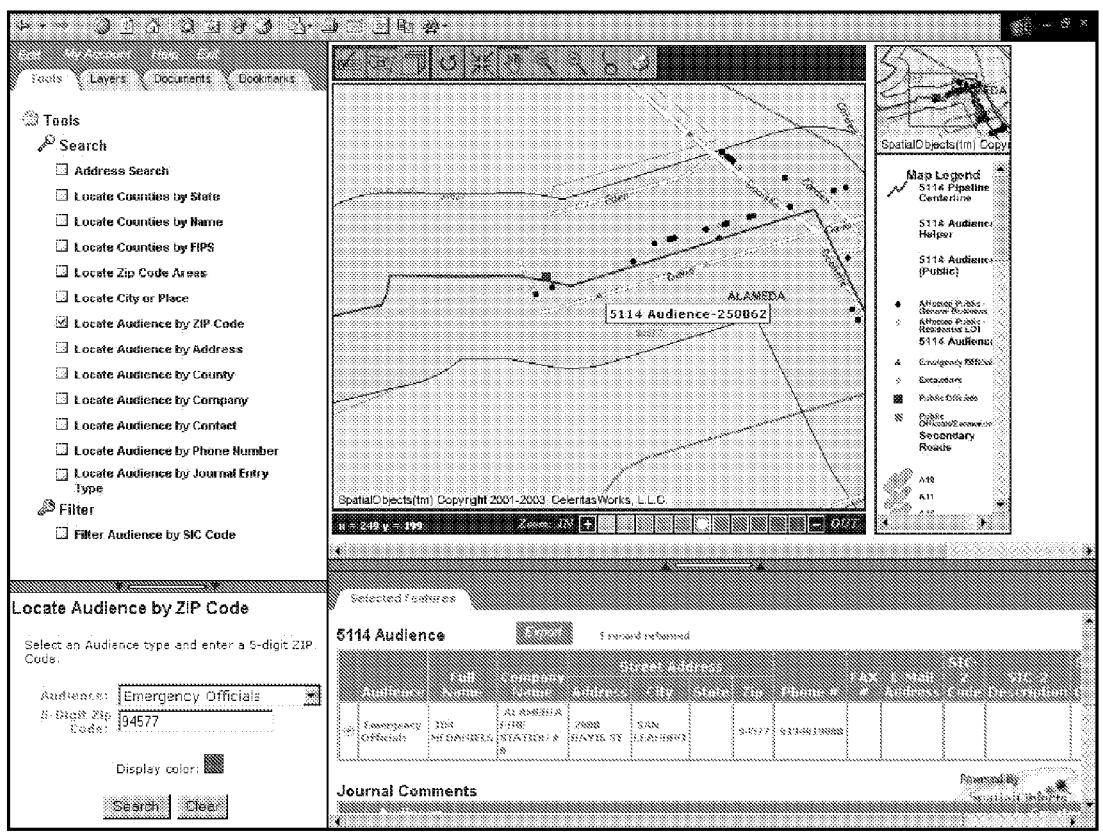
Figure 55:
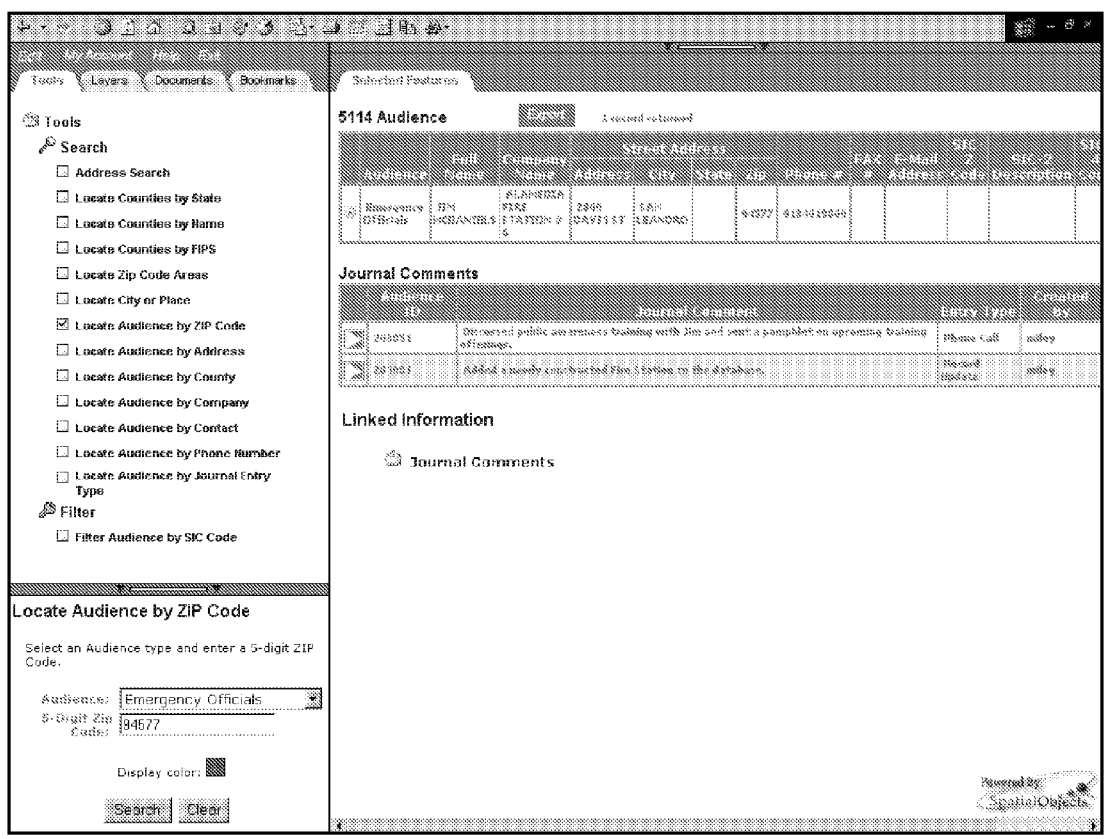

To confirm that the journal entry has been made or to review the contact data or all journal comments for the particular contact, the user may select the selected features tab in the feature display frame, as depicted in FIG. 53. The user selects the menu icon at the beginning of the contact that was just altered and selects the "zoom to" button. The selected contact is generated for display in the map frame with the surrounding geospatial data, as depicted in FIG. 54. The contact data for the selected contact is displayed in the feature display frame. Additionally, the user may locate the pointer over the desired contact in the map frame and select the contact from the map display. The contact data corresponding to the selected contact is generated for display in the feature display frame. The user may expand the feature display frame and review the contact data and the journal entries log for the selected contact, as depicted in FIG. 55. The journal entries log identifies the journal entries made for a selected contact, other audience member, CAP asset, transaction, or other CAM data.

FIGS. 56-66 depict an example in which documents are linked to existing contact data. For example, if a user discusses an upcoming training program with an emergency responder in a telephone call, and the user mails a training pamphlet for the training program to the emergency responder, the user may link the training pamphlet to the contact data for that contact.

Figure 56:
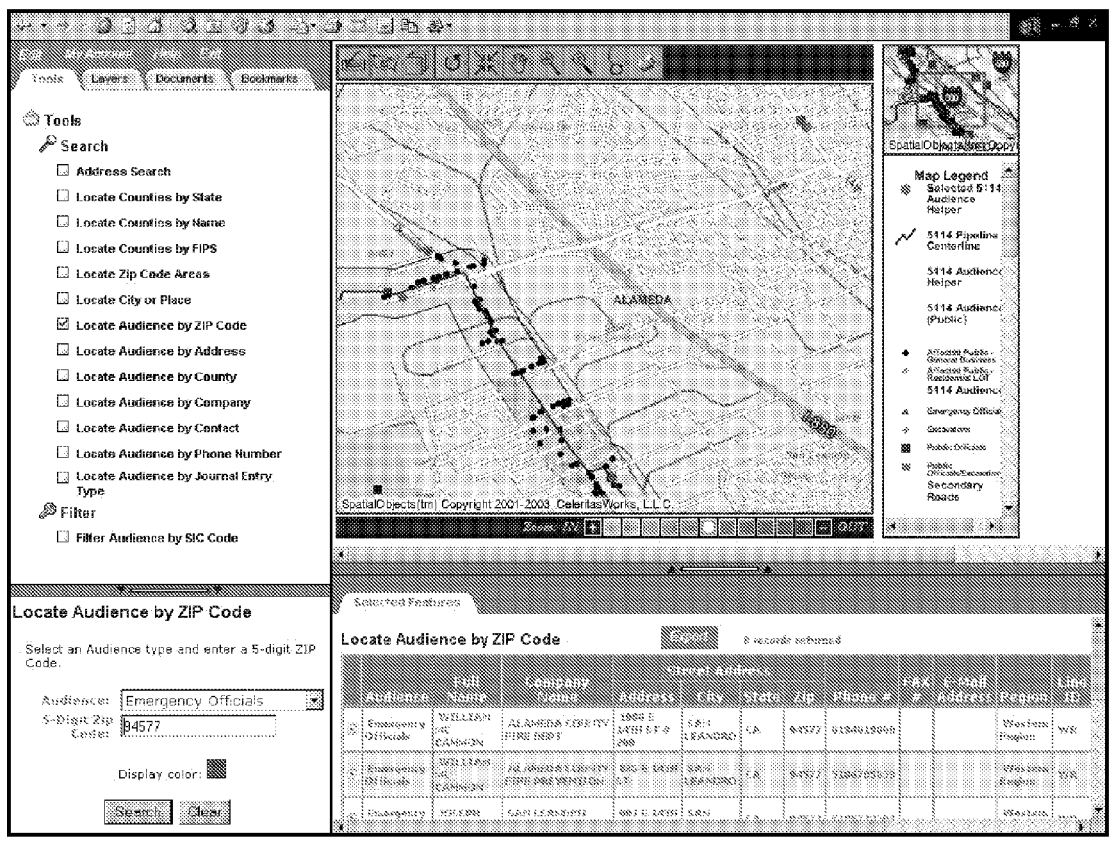
Figure 57:
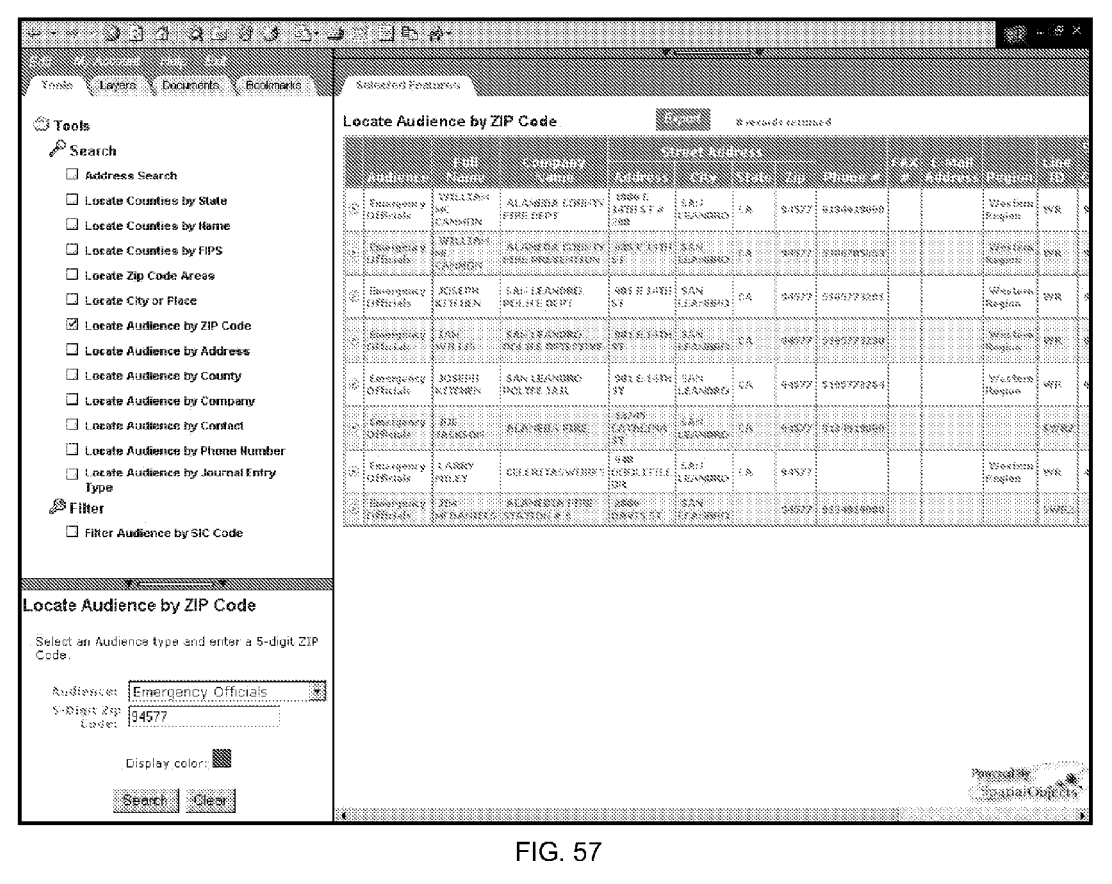
Figure 58:
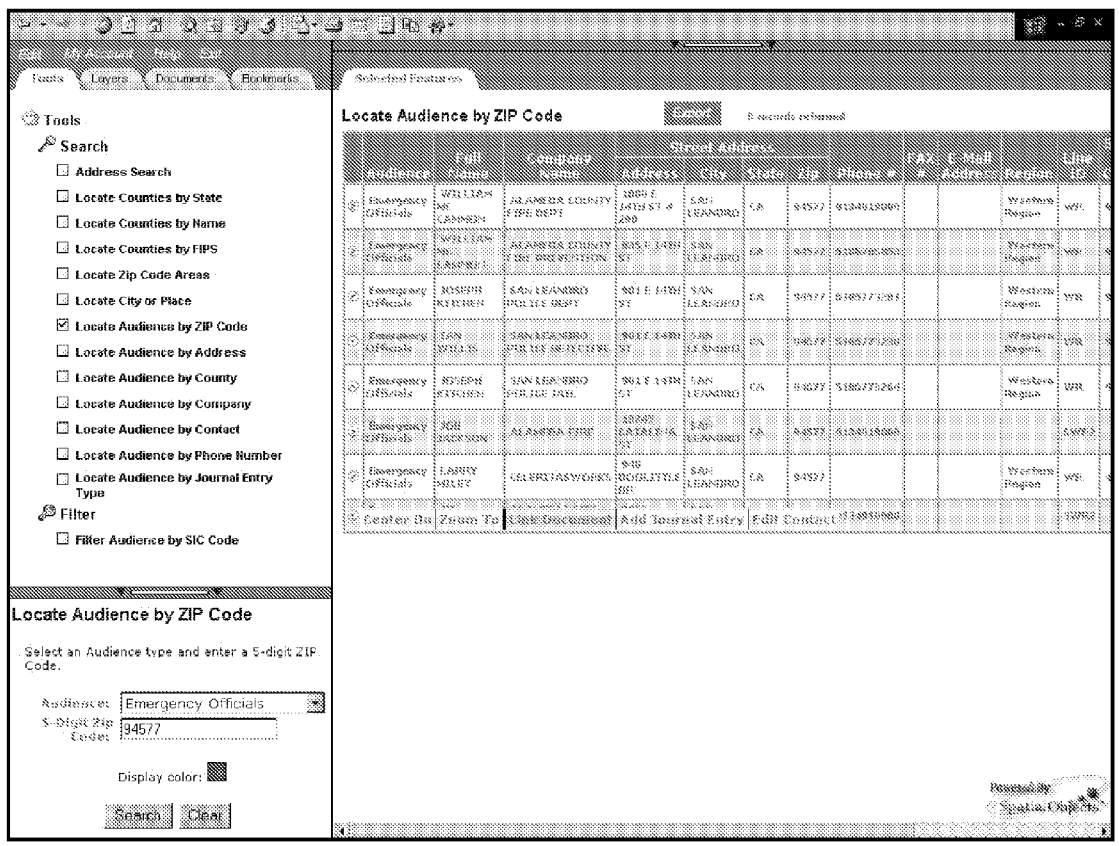

The user locates an audience by performing the desired search, as depicted in FIG. 56. A map corresponding to the geographic area within a selected range of the search is generated for display in the map frame, and the corresponding contact data is generated for display in the feature display frame. The user expands the feature display frame and scrolls through the contacts in the feature display frame until the selected contact is located, as depicted in FIG. 57. The user selects the menu icon at the beginning of the desired contact. The features menu then is generated for display, as depicted in FIG. 58.

Figure 59:
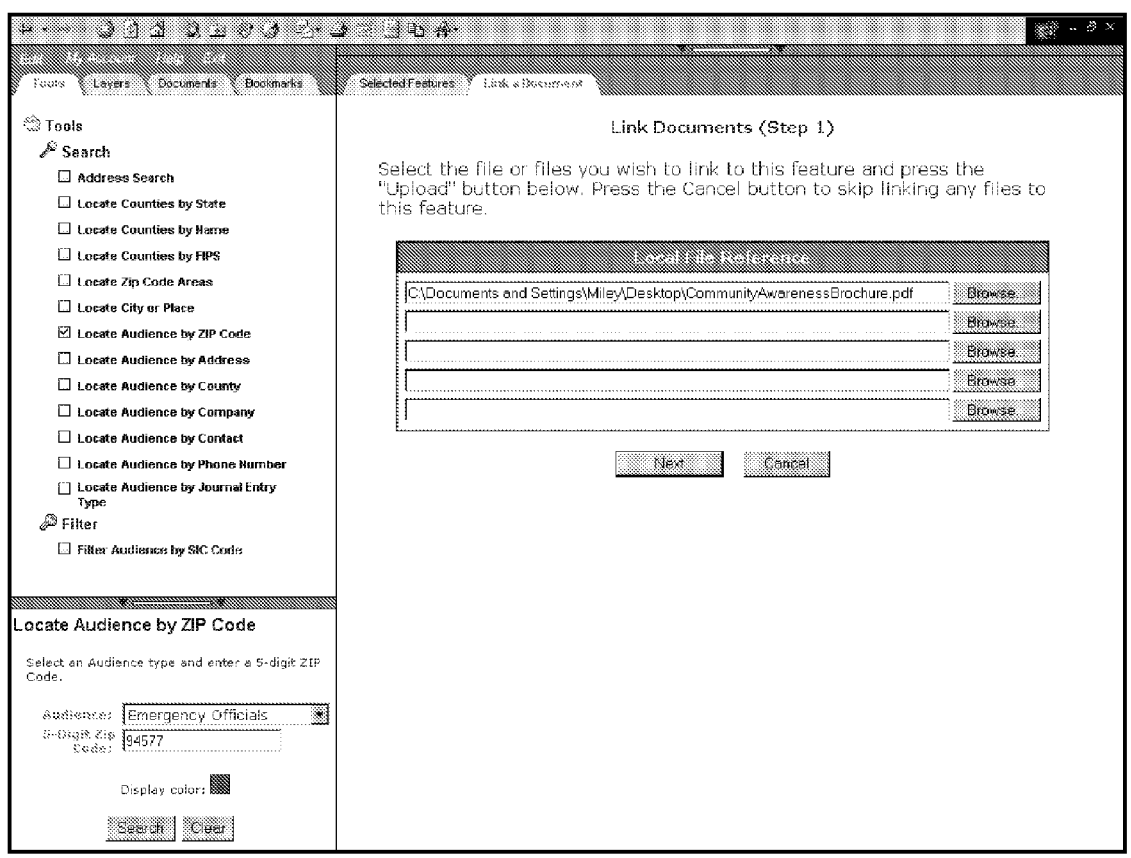
Figure 60:
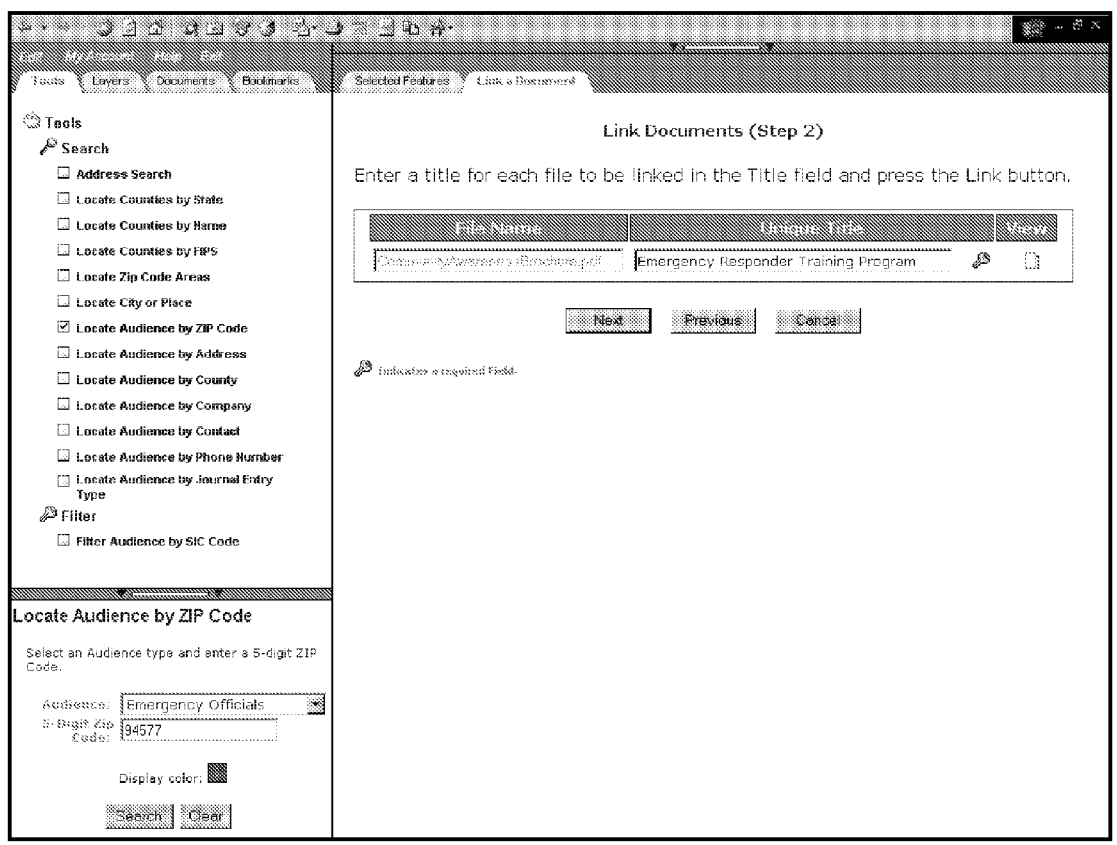
Figure 61:
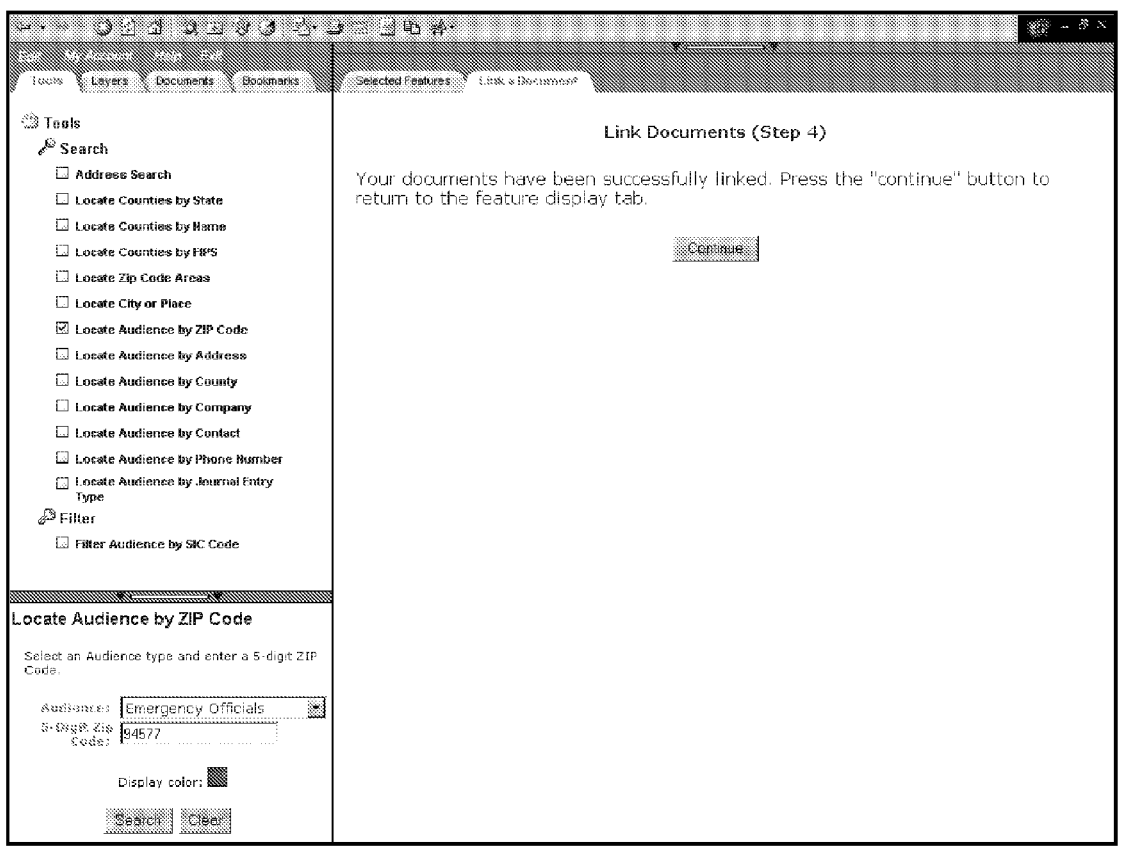

The user selects the link document button, and a link document screen is generated for display, as depicted in FIG. 59. If the user knows the path for the document, the user may enter the path. Otherwise, the user may select the browse button and search for the document that is to be linked to the contact data. Once the file has been selected, the user enters a title for the document to be linked, as depicted in FIG. 60. After the user selects the next button, the CAM system links the document to the selected contact data and confirms that the document has successfully been linked, as depicted in FIG. 61.

Figure 62:
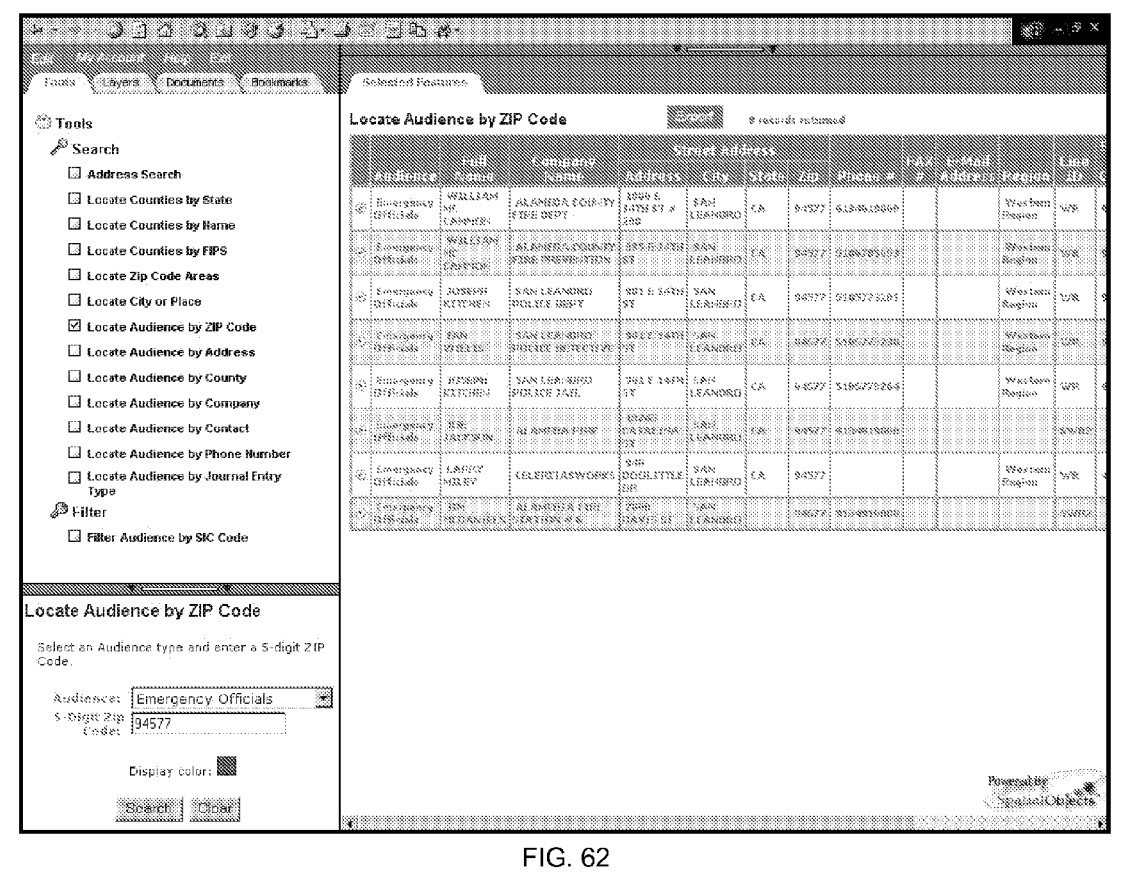
Figure 63:
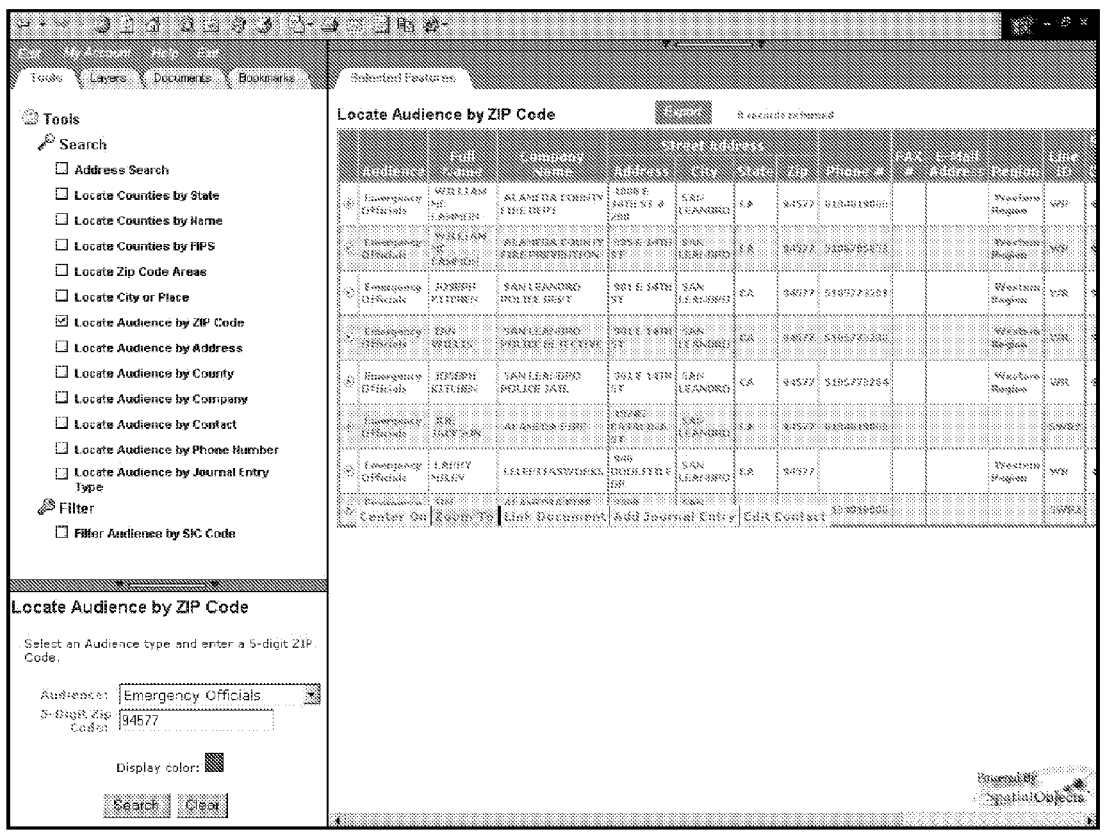
Figure 64:
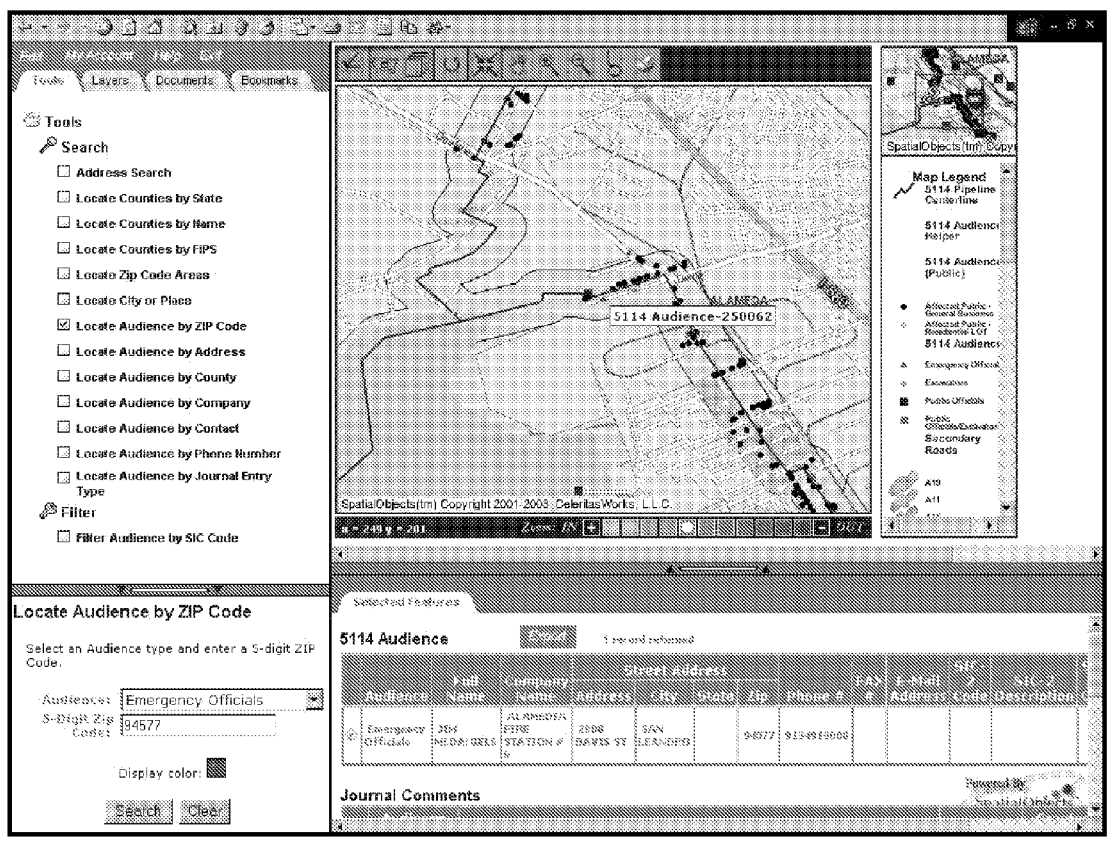
Figure 65:
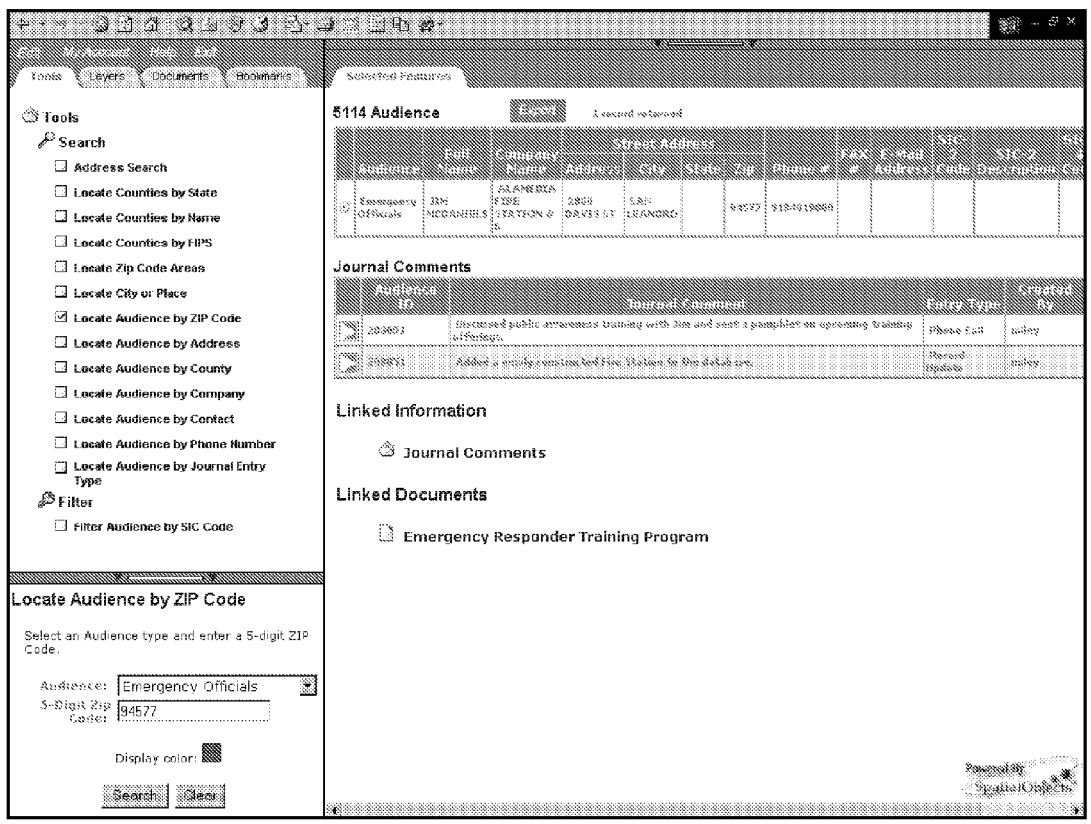
Figure 66:
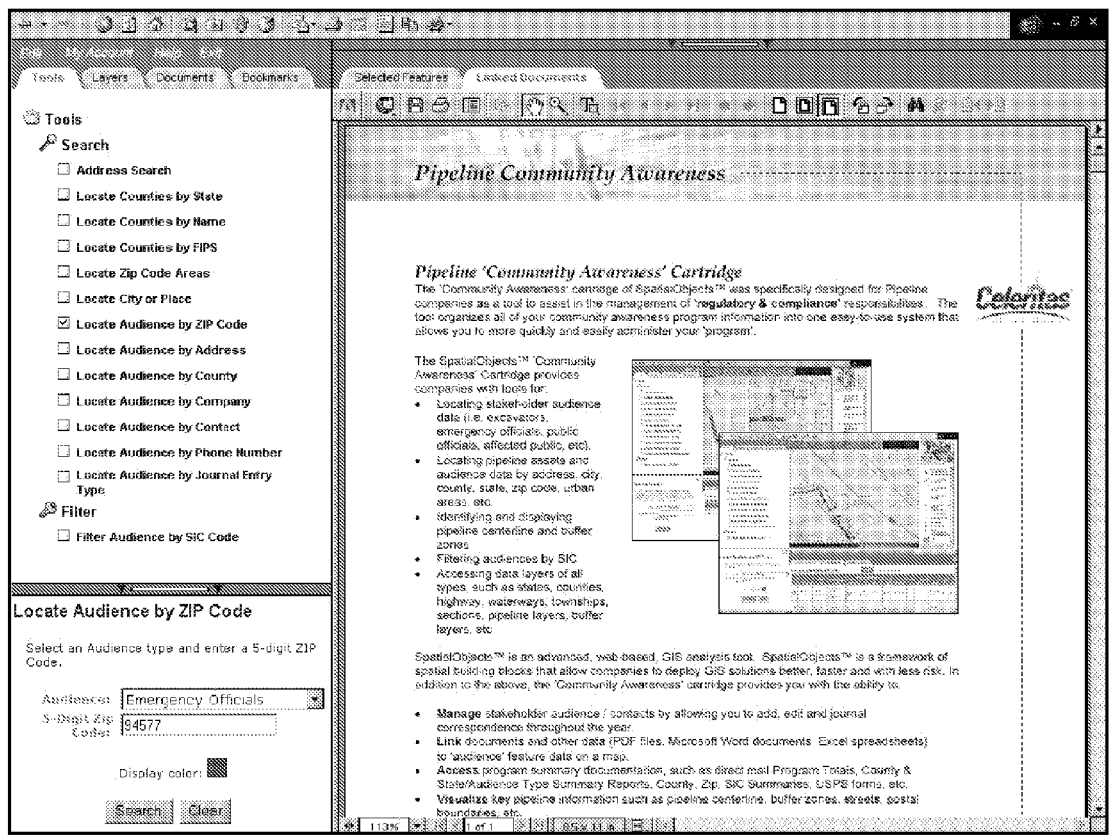

If the user would like to confirm that the document has been linked to the contact data, the user may select the selected features tab of the feature display frame, as depicted in FIG. 62. The user selects the menu icon at the beginning of the contact data that has been altered, and the features menu is generated for display, as depicted in FIG. 63. The user selects the "zoom to" button. In response, a map is generated to the map frame identifying the point feature for the contact and the surrounding area within a selected range, as depicted in FIG. 64. Contact data matching the point feature is generated for display in the feature display frame. The user expands the feature display frame, as depicted in FIG. 65. The contact data, the journal entries associated with the contact data, linked information, and linked documents all are depicted in the feature display frame. The user can select the document from the linked documents list to generate the document for display, as depicted in FIG. 66.

Figure 67:
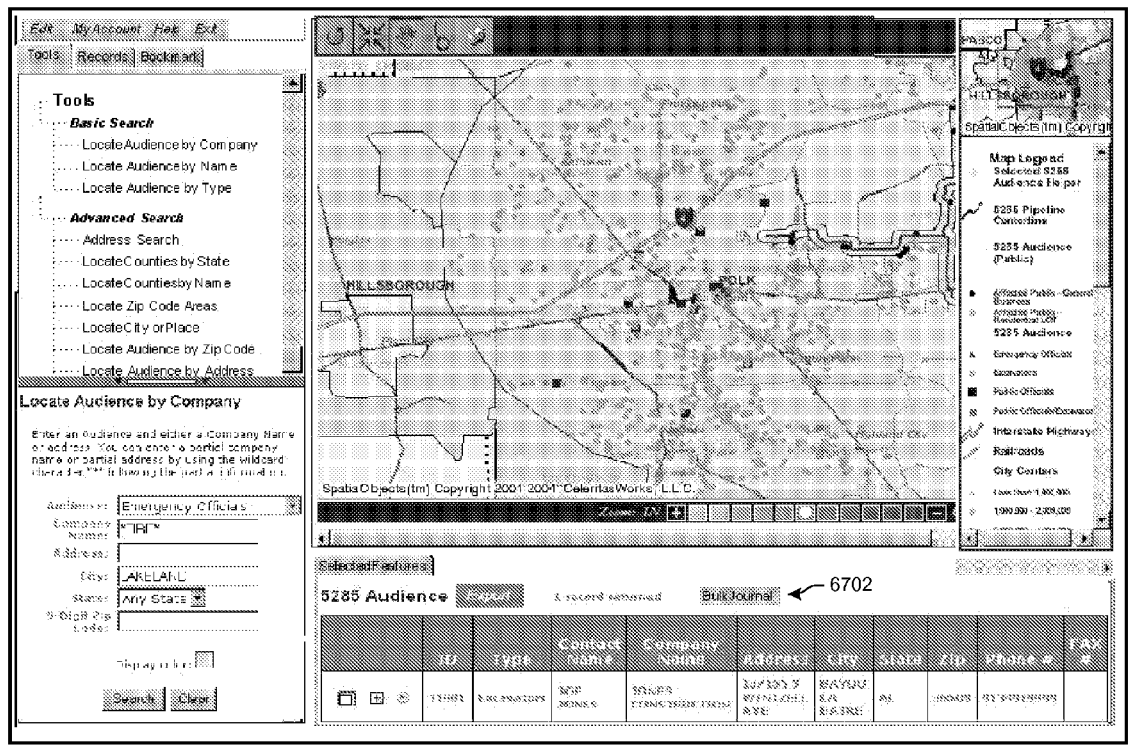
Figure 68:
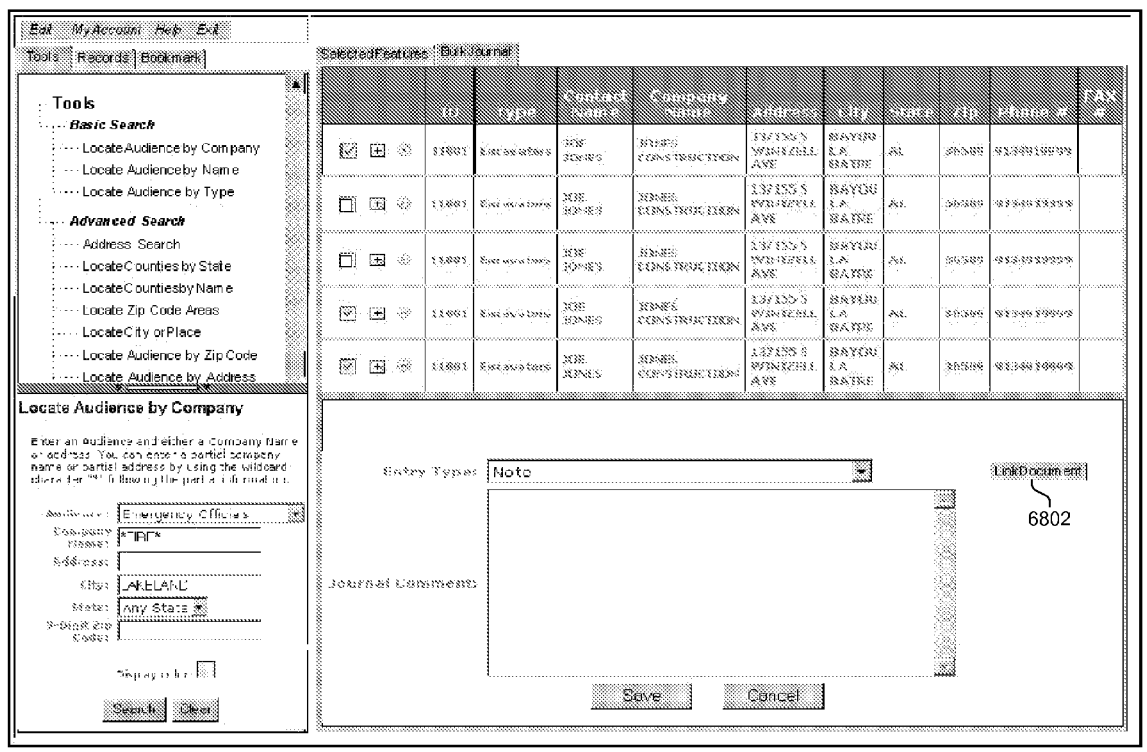
Figure 69:
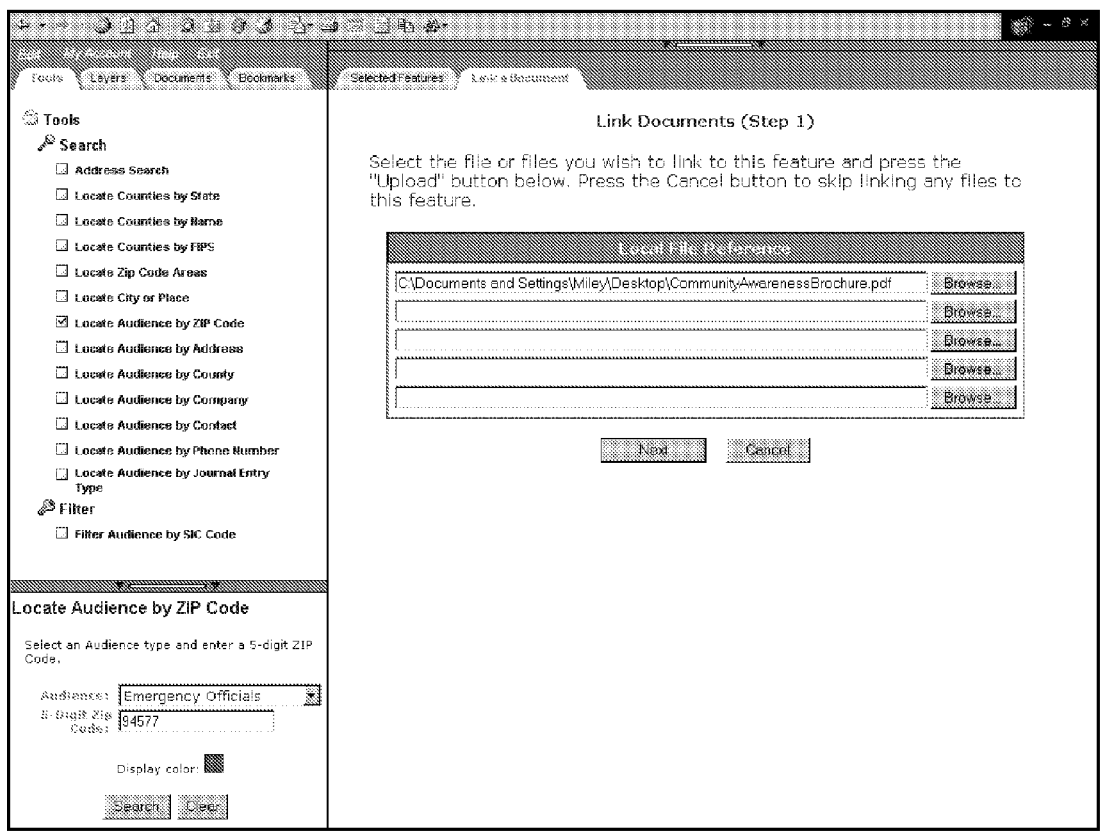

FIGS. 67-69 depict an example of adding a journal comment to multiple contacts simultaneously. For example, after a baseline communication is made to a group of contacts, a supplemental communication may be made to the same or a different group of contacts. In one example, a pipeline company is refurbishing a segment of a pipeline in a certain county and notifies stakeholders for that county of the work about to be performed. The pipeline company transmits a supplemental communication to the affected stakeholders and identifies the supplemental communication in a journal entry for each of the stakeholders.

The user locates the desired audience by performing a desired query. In this example, a "bulk journal" button 6702 is presented to the user in the feature display frame, as depicted in FIG. 67. The user confirms the contacts to be selected for the bulk journal by selecting a checkbox at the beginning of each row of contact data, as depicted in FIG. 68. The user enters the journal entry type and the journal entry and selects the save button. The user also may link the document transmitted in the communication by selecting the link document button 6802. The user locates the file for the document using the browser, as depicted in FIG. 69. The user enters the document title and saves the file name and document title (as shown in FIGS. 60 and 61).

Those skilled in the art will appreciate that variations from the specific embodiments disclosed above are contemplated by the invention. The invention should not be restricted to the above embodiments, but should be measured by the following claims.

What is claimed is:

1. A system for managing community awareness data for a pipeline community awareness program (CAP), the pipeline CAP providing information associated with at least one pipeline asset for the pipeline CAP to at least one contact for the pipeline CAP, the system comprising:
   at least one processor;
   a data management system executing on the at least one processor comprising:
      community awareness management (CAM) data, the CAM data comprising pipeline asset data for at least one pipeline asset and audience data for the at least one contact for the pipeline CAP to which at least some of the information associated with the at least one pipeline asset is provided; and
      geospatial data for an area for the pipeline CAP;
   a spatial management system executing on the at least one processor, generating at least one query for the CAM data and the geospatial data to the data management system, receiving selected CAM data and selected geospatial data from the data management system in response to the at least one query, and generating map data based on the selected geospatial data and at least some selected CAM data, the map data identifying at least a pipeline CAP area portion, the at least one contact within the pipeline CAP area portion to which the at least some information associated with the at least one pipeline asset is provided, and at least one member of a group consisting of at least one pipeline asset portion within the pipeline CAP area portion, at least one interest area portion for the at least one pipeline asset within the pipeline CAP area portion, and at least one buffer area portion for the at least one pipeline asset;

a program management system executing on the at least one processor receiving an input, initiating the at least one query to the spatial management system based on the input, receiving the map data and the selected CAM data from the spatial management system, and generating at least one result of the query, the at least one result comprising the map data and the selected CAM data, the selected CAM data comprising at least one second member of a second group consisting of at least some of the pipeline asset data for the at least one pipeline asset and at least some of the audience data for the at least one contact to which the at least some information associated with the at least one pipeline asset is provided;

an audience management system configured to manage the audience data for the at least one contact; and a user interface receiving the input, transmitting the input to the program management system, receiving the at least one result from the program management system, and generating the at least one result for display.

2. The system of claim 1 wherein the audience management system enables audience data entry comprising at least one third member of a third group consisting of entering new audience data for a new contact entry and editing the audience data.

3. A system for managing community awareness data, the system comprising:

at least one processor;

a data management system executing on the at least one processor to manage data in memory comprising:

community awareness management (CAM) data for a pipeline community awareness program (CAP), the pipeline CAP providing information associated with at least one pipeline asset for at least one audience member for the pipeline CAP, the CAM data comprising audience for the at least one audience member and pipeline asset data for the at least one pipeline asset; and geospatial data for an area associated with the pipeline CAP;

a spatial management system executing on the at least one processor, receiving at least some selected CAM data, generating at least one query of the geospatial data to the data management system, receiving selected geospatial data from the data management system in response to the at least one query, and generating map data based on the selected geospatial data and the at least some selected CAM data, the map data identifying at least a portion of the area associated with the pipeline CAP, the at least one audience member within the pipeline CAP area portion for which the information associated with the at least one pipeline asset is provided, and at least one member of a group consisting of at least one pipeline asset portion within the pipeline CAP area portion;

a program management system executing on the at least one processor, accepting an input, initiating at least one second query corresponding to the input to the data management system and receiving selected CAM data in response thereto, transmitting the at least some selected CAM data to the spatial management system, initiating the at least one query corresponding to the input to the spatial management system, and receiving the map data from the spatial management system, the selected CAM data comprising at least one second member of a second group consisting of at least some of the audience data for the at least one audience member for which the information associated with the at least one pipeline asset is provided and at least some of the pipeline asset data for the at least one pipeline asset;

an audience management system managing audience data for the at least one audience member; and a user interface receiving the input, transmitting the input to the program management system, receiving the selected CAM data and the map data from the program management system, and generating the selected CAM data and the map data for display.

4. The system of claim 3 wherein the audience management system enables audience data entry comprising at least one third member of a third group consisting of entering the audience data for a new audience entry and editing the audience data.

* * * * *